United States Patent
Zhu et al.

(10) Patent No.: US 9,637,115 B2
(45) Date of Patent: May 2, 2017

(54) CONTROL SYSTEMS AND METHODS FOR TRANSMISSION OF HYBRID POWER VEHICLE

(71) Applicant: SAIC Motor Corporation Limited, Shanghai (CN)

(72) Inventors: Jun Zhu, Shanghai (CN); Hongxiang Leng, Shanghai (CN); Chengjie Ma, Shanghai (CN); Jun Sun, Shanghai (CN); Jian Wang, Shanghai (CN); Zhengmin Gu, Shanghai (CN)

(73) Assignee: SAIC Motor Corporation Limited, Shanghai (CN)

( * ) Notice: Subject to any disclaimer, the term of this patent is extended or adjusted under 35 U.S.C. 154(b) by 208 days.

(21) Appl. No.: 14/752,374

(22) Filed: Jun. 26, 2015

(65) Prior Publication Data
US 2016/0137188 A1    May 19, 2016

(30) Foreign Application Priority Data
Nov. 18, 2014    (CN) .......................... 2014 1 0657355

(51) Int. Cl.
*B60W 20/30*    (2016.01)
*B60K 6/365*    (2007.10)
(Continued)

(52) U.S. Cl.
CPC ............. *B60W 20/30* (2013.01); *B60K 6/365* (2013.01); *B60K 6/387* (2013.01); *B60K 6/48* (2013.01);
(Continued)

(58) Field of Classification Search
None
See application file for complete search history.

(56) References Cited

U.S. PATENT DOCUMENTS

| 4,584,892 A | 4/1986 | Hiraiwa et al. |
| 5,106,352 A | 4/1992 | Lepelletier |

(Continued)

FOREIGN PATENT DOCUMENTS

| CN | 101875298 A | 11/2010 |
| CN | 102490585 A | 6/2012 |

(Continued)

OTHER PUBLICATIONS

U.S. Appl. No. 14/948,034, filed Nov. 20, 2015, inventors: Jun Zhu, Chengjie Ma, Zhengmin Gu, Xiajun Ye, Pengjun Zhang, Peng Zhang, and Jing Gu.

(Continued)

*Primary Examiner* — Justin Holmes
(74) *Attorney, Agent, or Firm* — McDonnell Boehnen Hulbert & Berghoff LLP

(57) ABSTRACT

A transmission control system for a hybrid-power driving system includes at least a gear shifting actuation module to control engagement of specific gearwheels and a clutch actuation module to control a clutch that couples an engine to the transmission. Gear shifts are required for each of the engine and the electric motor in the hybrid-power driving system. The control system minimizes power loss when a gear shift is occurring for the engine or the electric motor. By selectively controlling the clutch and engagement of specific gearwheels, power loss associated with a gear shift for one of these power sources can be directly offset by using the other power source.

36 Claims, 27 Drawing Sheets

(51) Int. Cl.

| | | |
|---|---|---|
| *B60K 6/387* | (2007.10) | |
| *B60K 6/48* | (2007.10) | |
| *B60K 6/547* | (2007.10) | |
| *B60W 10/113* | (2012.01) | |
| *B60W 10/02* | (2006.01) | |
| *B60W 10/06* | (2006.01) | |
| *B60W 10/08* | (2006.01) | |
| *B60W 20/00* | (2016.01) | |
| *F16H 3/091* | (2006.01) | |
| *F16H 3/08* | (2006.01) | |

(52) U.S. Cl.
CPC ............ *B60K 6/547* (2013.01); *B60W 10/02* (2013.01); *B60W 10/06* (2013.01); *B60W 10/08* (2013.01); *B60W 10/113* (2013.01); *B60W 20/00* (2013.01); *F16H 3/091* (2013.01); *B60K 2006/4816* (2013.01); *B60K 2006/4841* (2013.01); *B60W 2710/021* (2013.01); *B60W 2710/0666* (2013.01); *B60W 2710/083* (2013.01); *B60W 2710/1005* (2013.01); *B60Y 2200/92* (2013.01); *F16H 2003/0807* (2013.01); *F16H 2003/0822* (2013.01); *F16H 2003/0826* (2013.01); *F16H 2200/0052* (2013.01); *Y02T 10/6221* (2013.01); *Y02T 10/6256* (2013.01); *Y10S 903/911* (2013.01); *Y10S 903/914* (2013.01); *Y10S 903/919* (2013.01); *Y10S 903/946* (2013.01)

(56) References Cited

U.S. PATENT DOCUMENTS

| | | |
|---|---|---|
| 5,425,283 A | 6/1995 | Wehking |
| 5,558,595 A | 9/1996 | Schmidt et al. |
| 5,789,823 A | 8/1998 | Sherman |
| 6,019,697 A | 2/2000 | Colletti |
| 6,592,484 B1 | 7/2003 | Tsai et al. |
| 6,886,424 B2 | 5/2005 | Janson et al. |
| 7,597,020 B2 | 10/2009 | Baldwin |
| 7,611,433 B2 | 11/2009 | Forsyth |
| 7,895,910 B2 | 3/2011 | Caenazzo et al. |
| 8,109,167 B2 | 2/2012 | Mohlin |
| 8,116,951 B2 | 2/2012 | Holmes |
| 8,333,126 B2 | 12/2012 | Enstroem et al. |
| 8,444,519 B2 | 5/2013 | Borntraeger et al. |
| 8,549,959 B2 | 10/2013 | Kasuya et al. |
| 8,672,109 B2 | 3/2014 | Quartier et al. |
| 8,672,803 B2 | 3/2014 | Tamba et al. |
| 8,677,847 B2 | 3/2014 | Diani et al. |
| 8,689,655 B2 | 4/2014 | Diani et al. |
| 8,714,287 B2 | 5/2014 | Kim et al. |
| 8,727,939 B2 | 5/2014 | Chen et al. |
| 8,763,485 B2 | 7/2014 | Thomas |
| 8,771,136 B2 | 7/2014 | Miller et al. |
| 8,784,249 B2 | 7/2014 | Motodohl et al. |
| 9,358,873 B2 | 6/2016 | Moore et al. |
| 2001/0051556 A1 | 12/2001 | Takenaka |
| 2002/0177504 A1* | 11/2002 | Pels ............ B60K 6/36 477/3 |
| 2003/0045389 A1* | 3/2003 | Kima ............ B60K 6/365 475/5 |
| 2004/0251064 A1 | 12/2004 | Imai |
| 2004/0251862 A1 | 12/2004 | Imai |
| 2009/0176617 A1* | 7/2009 | Dilzer ............ B60K 6/40 477/5 |
| 2009/0199666 A1 | 8/2009 | Yang et al. |
| 2010/0125022 A1* | 5/2010 | Mittelberger ............ B60K 6/36 477/5 |
| 2010/0262322 A1* | 10/2010 | Yokouchi ............ B60K 6/26 701/22 |
| 2010/0276218 A1 | 11/2010 | Thompson et al. |
| 2010/0311540 A1 | 12/2010 | Hellenbroich |
| 2011/0239820 A1 | 10/2011 | Shibahata |
| 2012/0104904 A1 | 5/2012 | Abiko et al. |
| 2012/0234133 A1 | 9/2012 | Ikegami et al. |
| 2013/0091984 A1 | 4/2013 | Pesola et al. |
| 2013/0112041 A1 | 5/2013 | Tamai et al. |
| 2013/0184111 A1 | 7/2013 | Tsuchida et al. |
| 2014/0011631 A1 | 1/2014 | Cimatti |
| 2014/0135162 A1 | 5/2014 | Wittkopp et al. |
| 2014/0283647 A1 | 9/2014 | Blessing et al. |
| 2014/0373675 A1 | 12/2014 | Kaltenbach et al. |
| 2016/0009269 A1 | 1/2016 | Zhou et al. |
| 2016/0137045 A1 | 5/2016 | Zhu et al. |
| 2016/0137048 A1 | 5/2016 | Zhu et al. |
| 2016/0137049 A1 | 5/2016 | Zhu et al. |
| 2016/0137189 A1 | 5/2016 | Zhu et al. |

FOREIGN PATENT DOCUMENTS

| | | |
|---|---|---|
| CN | 103072474 A | 5/2013 |
| CN | 103332100 A | 10/2013 |
| CN | 103552461 A | 2/2014 |
| EP | 1690723 A2 | 8/2006 |
| JP | 2009107626 A | 5/2009 |
| WO | 2008/138387 A1 | 11/2008 |

OTHER PUBLICATIONS

U.S. Appl. No. 14/947,979, filed Nov. 20, 2015, inventors: Hongxiang Leng, Wen Li, Jun Sun, Xinhua Jiang, Feifei Zhang, Sidong Luo, and Hailong Ge.

Ioan-Adrian Viorel; et al.; Integrated Starter-Generators for Automotive Applications, Acta Electrotehnica, vol. 45, No. 3, Sep. 2004, pp. 255-260.

Nate Martinez, Motor Trend Canada, First Drive: 2012 Infiniti M35 Hybrid—Fashionably Late: Infinity Finally RSVPs for Upscale Hybrid Party, Aug. 4, 2010, 18 pages.

Iskra Avtoelektrika d.d.; Integrated Starter Motor Generators; Mar. 2008, 8 pages.

* cited by examiner (a)

(b)

Connected gears are combinable

CONTROL SYSTEMS AND METHODS FOR TRANSMISSION OF HYBRID POWER VEHICLE

BACKGROUND

Unless otherwise indicated herein, the elements described in this section, the technical field, and the background art are not prior art to the claims and are not admitted to be prior art by inclusion in this section.

CROSS REFERENCE TO RELATED APPLICATIONS

This application claims the benefit of priority to Chinese Patent Application No. 201410657355.8, filed Nov. 18, 2014, the contents of which are incorporated entirely herein by reference.

TECHNICAL FIELD

This application relates to a vehicle hybrid-power driving system. In particular, vehicle hybrid-power driving systems described in this application can include at least one control system that coordinates the transmission of power from an internal combustion engine and an electric motor.

BACKGROUND ART

As the pollution of the environment, the demand and cost for petroleum, and the requirements for vehicle emission equipment all increase, hybrid-power vehicles have received greater consideration by manufacturers and consumers. Typically, hybrid-power vehicles employ an internal combustion engine (ICE) and an electric motor (EM) for power. By using an EM for some of its power, such hybrid-power vehicles do not require as much carbon-based fuel as vehicles that rely solely on an ICE. As a result, hybrid-power vehicles produce lower carbon emissions and are less costly to operate. The transmission control systems in current hybrid-power vehicles, however, are generally developed by modifying traditional transmission control systems. These modified systems are not suitable for achieving various transmission functions required specifically by hybrid-power vehicles. In particular, these modified systems are not suitable for electrically controlled hybrid-power transmissions of the single-clutch and single-motor type.

OVERVIEW

This application describes several example embodiments, at least some of which pertain to a hybrid-power driving system (HPDS) and components thereof, including, but not limited to, a transmission control system that coordinates the transmission of power from an internal combustion engine (ICE) and an electric motor (EM).

For example, the transmission control system includes at least a gear shifting actuation module to control engagement of specific gearwheels and a clutch actuation module to control a clutch that couples the ICE to the transmission. During operation of the HPDS, gear shifts occur for each of the ICE and the EM. The transmission control system minimizes power loss when a gear shift occurs for the ICE or the EM. Through a process that selectively controls the clutch and engagement of specific gearwheels, power loss associated with a gear shift for one of these power sources (e.g., the ICE) can be directly offset by using the other power source (e.g., the EM). As such, the gear shifting process is more direct and stable when compared with the clutch-to-clutch gear shifting process of traditional transmissions, and thus the quality of gear shifting of the example embodiments is better than that of traditional transmissions.

Furthermore, through another process that also selectively controls the clutch and engagement of specific gearwheels, the transmission control system can start the ICE when the vehicle is initially powered by the electric motor alone. Starting the internal combustion engine in this case switches the vehicle from a pure motor driving mode (PMDM) to a hybrid driving mode (HDM). Additionally, the transmission control system can start the ICE when the vehicle is in a parked state to put the vehicle in a battery charging mode for the EM.

According to an example embodiment, a HPDS includes a transmission. The transmission includes a plurality of shafts, including an input shaft, a motor shaft, and an output shaft. The input shaft is coupled to a clutch, the clutch being configured to selectively engage an ICE to couple the input shaft to the ICE, the ICE being configured to generate an engine torque transferrable to the input shaft via the clutch. The motor shaft is coupled to an EM, the EM being configured to generate a motor torque transferrable to the motor shaft. The output shaft delivers an output torque from the transmission. The transmission also includes a plurality of gearwheels configured to provide a plurality of combinations of an engine torque transmission path and a motor torque transmission path, one of the combinations being active and including an active engine torque transmission path to transfer the engine torque from the input shaft to the output shaft for the output torque and an active motor torque transmission path to transfer the motor torque from the motor shaft to the output shaft for the output torque. Additionally, the transmission includes a plurality of synchronizers disposed on the plurality of shafts and operable to engage a first set of selected gearwheels, wherein for the first set of selected gearwheels, the active engine torque transmission path is a first engine torque transmission path and the active motor torque transmission path is a first motor torque transmission path. The HPDS also includes a transmission control system. The transmission control system includes a clutch actuation module configured to control the clutch. The transmission control system also includes a gear shifting actuation module configured to move at least one of the plurality of synchronizers to cause the plurality of synchronizers to engage a second set of selected gearwheels instead of the first set of selected gearwheels, wherein by engaging the second set of selected gearwheels, either: (i) the active engine torque transmission path is modified to a second engine torque transmission path, and the active motor torque transmission path remains unmodified, or (ii) the active engine torque transmission path remains unmodified, and the active motor torque transmission path is modified to a second motor torque transmission path.

According to another example embodiment, a HPDS includes a transmission. The transmission includes a plurality of shafts, including an input shaft, a motor shaft, and an output shaft. The input shaft is coupled to a clutch, the clutch being configured to selectively engage an ICE to couple the input shaft to the ICE, the ICE being configured to generate an engine torque transferrable to the input shaft via the clutch. The motor shaft is coupled to an EM, the EM being configured to generate a motor torque transferrable to the motor shaft. The output shaft delivers an output torque from the transmission. The transmission also includes a plurality of gearwheels configured to provide a plurality of torque transmission paths, one of the torque transmission paths being active to transfer the engine torque and the motor torque to the output shaft to provide the output torque. Additionally, the transmission includes a plurality of synchronizers disposed on the plurality of shafts and operable to engage a first set of selected gearwheels, wherein according to the first set of selected gearwheels, the active torque transmission path is a first torque transmission path. The HPDS also includes a transmission control system. The transmission control system includes a clutch actuation module configured to control the clutch. The transmission control system also includes a gear shifting actuation module configured to move at least one of the plurality of synchronizers to cause the plurality of synchronizers to engage a second set of selected gearwheels instead of the first set of selected gearwheels and to modify the active torque transmission path to a second torque transmission path, wherein either: (i) the transmission control system causes the EM to increase the motor torque to compensate for any loss of engine torque at the output shaft when the active torque transmission path is modified to the second torque transmission path, or (ii) the transmission control system causes the engine to increase the engine torque to compensate for any loss of motor torque at the output shaft when the active torque transmission path is modified to the second torque transmission path.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

This description describes several example embodiments. The example embodiments relate to a hybrid-power driving system (HPDS) and components thereof. The HPDS, for example, can be employed by a vehicle, such as an automobile or a truck. Aspects of the example embodiments, however, can be alternatively applied to other types of driving systems and/or other types of vehicles.

The HPDS in the example embodiments can selectively operate in: (i) a pure engine driving mode (PEDM) relying primarily on power from an internal combustion engine (ICE) alone; (ii) a pure motor driving mode (PMDM) relying primarily on power from an electric motor (EM) alone; and (iii) a hybrid-power driving mode (HDM) running both the ICE and the EM simultaneously. In particular, the HPDS includes a transmission control system that controls aspects of power transmission from the ICE and the EM. For example, the transmission control system can minimize power loss when a gear shift occurs for the ICE or the EM. In addition, the transmission control system can start the ICE when the vehicle is in PMDM, in order to switch to HDM. Furthermore, the transmission control system can start the ICE when the vehicle is in a parked state to put the vehicle in a battery charging mode for the EM.

II. Example Hybrid-Power Driving System

Figure 1:
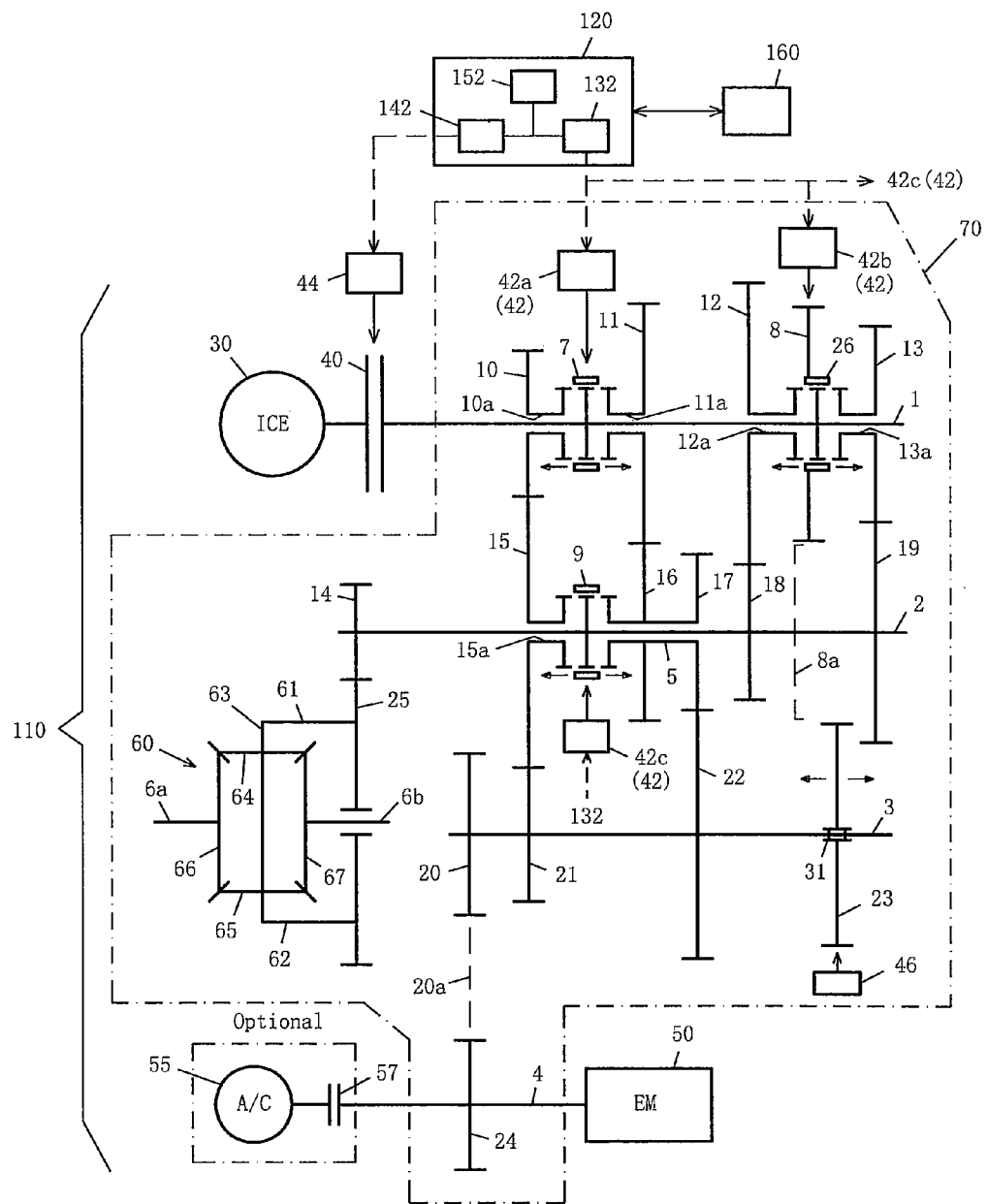
FIG. 1 illustrates a structure of a hybrid-power driving system (HPDS) in accordance with the example embodiments.

FIG. 1 is a schematic view of a HPDS 110 in accordance with multiple example embodiments. The HPDS 110 includes an ICE 30, an EM 50, a transmission 70, and a transmission control system 120. The transmission 70 delivers power from the ICE 30 and/or the EM 50 to drive a vehicle. In the example embodiments, the transmission 70 may be electrically controlled. Meanwhile, the transmission control system 120 includes modules that control different aspects of the transmission 70.

The ICE 30 and the EM 50 can each output power. The power (P) output by the ICE 30 can be calculated using the relationship $T_{ICE} \times W_{ICE}$, where $T_{ICE}$ equals the torque at the flywheel of the engine and $W_{ICE}$ equals a rotational speed of the flywheel. The power (P) output by the EM 50 can be calculated using the relationship $T_{EM} \times W_{EM}$, where $T_{EM}$ equals the torque of a rotor within the EM 50 and $W_{EM}$ equals a rotational speed of the rotor.

The transmission 70 includes an input shaft 1, an output shaft 2, an intermediate shaft 3, a motor shaft 4, and an intermediate shaft 5 (collectively referred to herein as the "five transmission shafts"). The intermediate shaft 5 can include a hollow portion such that the intermediate shaft 5 can be slid onto the output shaft 2. The intermediate shaft 5 can be referred to as a "gear-set shaft," a "hollow shaft," or a "sleeve." The transmission 70 can include sleeves (i.e., hollow shafts) 10a, 11a, 12a, 13a, and 15a. Sleeves 10a, 11a, 12a, and 13a are carried by the input shaft 1. Sleeves 5 and 15a are carried by the output shaft 2. The power output by the ICE 30 can be transferred to a clutch 40 and to the shafts of the transmission 70, and, in turn, to wheels of the vehicle. The power output by the EM 50 can be output to the shafts of the transmission 70 and, in turn, to the wheels of the vehicle. Since the power transmitted by the transmission 70 includes a torque aspect, the transmission of power can also be referred to as the transmission of torque, and a power transmission path can also be referred to as a torque transmission path.

Each of the five transmission shafts can be mounted to, or at least partially within, a transmission case at locations that allow for gearwheels (or gears) on those transmission shafts to mesh with at least one other gearwheel. Each of the gearwheels described herein can comprise a spur gearwheel, a helical gearwheel (e.g., a helical cylindrical gearwheel), or the like, but is not so limited.

Each of the five transmission shafts can be spatially arranged parallel with each other. The transmission case can form or include a gearbox within which gearwheels of the transmission 70 and at least a portion of the five transmission shafts are located. The EM 50 or a portion thereof can be located within the transmission case. Alternatively, the EM 50 can be located outside of the transmission case.

The transmission 70 includes multiple driving gearwheels that each drive at least one other gearwheel or cause at least one other gearwheel or transmission component to turn. In addition, the transmission 70 includes multiple driven gearwheels. Each driven gearwheel can be driven by a driving gearwheel or by a transmission shaft. One or more of the driving gearwheels described herein can act as a driven gearwheel for at least some of the power transmission paths.

A gearwheel that is rotatably carried by a shaft is carried by the shaft and can rotate about the shaft (e.g., the gearwheel and the shaft are rotatable with respect to each other) when the gearwheel is not synchronized with the shaft. When the rotatably carried gearwheel is synchronized with the shaft by a synchronizer, the gearwheel is not rotatable around the shaft as the gearwheel and shaft are rotatable together.

In some instances, a gearwheel is fixedly carried by a shaft. A fixedly-carried gearwheel and the shaft which carries the gearwheel rotate together. In some instances, a gearwheel is slidably carried on a shaft. A slidably-carried gearwheel can slide axially in two opposing directions along the shaft that carries the gearwheel.

As shown in FIG. 1, the input shaft 1 is coupled to the ICE 30 via the clutch 40. For example, the clutch 40 can include a pressure plate assembly, a throw-out bearing, a throw-out fork, and a clutch disk to engage a flywheel of the ICE 30, but the clutch 40 is not so limited. The clutch 40 can have a disengaged state in which the ICE 30 is completely disengaged from the clutch 40 and thus decoupled from the input shaft 1. The clutch 40 can have a fully engaged state in which the ICE 30 (e.g., the flywheel) is fully engaged with the clutch 40 (e.g., via the clutch disk) and thus fully coupled to the input shaft 1. In this fully engaged state, the largest possible amount of torque between the ICE 30 and the clutch 40 can be transferred. The clutch 40, however, can also have other engaged states where the ICE 30 is less than fully connected to the clutch 40. For example, the clutch disk may be applied to the flywheel with less pressure so that slip may occur between the clutch disk and the flywheel resulting in the transfer of less torque. A greater amount of engagement between the clutch 40 and the ICE 30 allows greater torque to be transferred. As such, the clutch 40 can be controlled to allow varying amounts of torque between the ICE 30 and the input shaft 1. The torque experienced and provided by the clutch 40, regardless of the source of the torque, may be referred to as clutch torque.

The transmission 70 includes a clutch actuation system 44 that causes the clutch 40 to transition between varying states of engagement/disengagement. In some embodiments, the clutch actuation system 44 may be a hydraulic system that includes solenoid valves that actuate the clutch components. In other embodiments, the clutch actuation system 44 is a motorized system that includes a clutch motor to actuate the clutch components. In yet other embodiments, the clutch actuation system 44 may be an electro-hydraulic or other type of system.

The transmission 70 also includes a driving gearwheel 10, a synchronizer 7, a driving gearwheel 11, a driving gearwheel 12, a synchronizer 26, and a driving gearwheel 13 disposed on the input shaft 1. Each of the driving gearwheel 10, the driving gearwheel 11, the driving gearwheel 12, and the driving gearwheel 13 is configured for engagement with the input shaft 1 by the synchronizer 7 or 26 and is rotatably carried by the input shaft 1 or is rotatably carried by the sleeves 10a, 11a, 12a, and 13a, respectively. Any gearwheel or synchronizer disposed on a given shaft is carried by the given shaft and is supported by the given shaft. As described further below, the driving gearwheel 10 can act as a second-speed-ratio driving gearwheel. The driving gearwheel 13 can act as a third-speed-ratio driving gearwheel. The driving gearwheel 11 can act as a fourth-speed-ratio driving gearwheel. The driving gearwheel 12 can act as a fifth-speed-ratio driving gearwheel. The synchronizer 26 includes a driving gearwheel 8 to provide a reverse speed ratio, as described further below. The driving gearwheel 8 can be disposed on a sliding sleeve of the synchronizer 26, but is not so limited. As such, the driving gearwheel 8 can act as a reverse-gear driving gearwheel.

A synchronizer in the example embodiments can include a hub, a synchronizer sleeve, and two blocker rings, but is not so limited. A synchronizer can be configured as a block synchronizer, a cone synchronizer, a pin synchronizer, but is not so limited. Each synchronizer described herein can be moved axially along a shaft on which the synchronizer is disposed. Axial movement of the synchronizer along a shaft and towards a gearwheel adjacent to the synchronizer allows the gearwheel and the shaft to be synchronized. When synchronized with a shaft by a synchronizer, a gearwheel can rotate in the same direction and same speed as the shaft. Meanwhile, axial movement of the synchronizer along a shaft and away from an adjacent gearwheel allows the gearwheel and the shaft to be unsynchronized. When the gearwheel and the shaft are unsynchronized by such movement of the synchronizer, the gearwheel can rotate independently of the shaft. In alternative embodiments, instead of using a single synchronizer to engage more than one gearwheel to a shaft, each gearwheel may be synchronized with the shaft with a dedicated synchronizer.

The transmission 70 includes a gear shifting actuation system 42 that includes movement components that move respective synchronizers axially along their shafts and maintain the respective synchronizers in the desired positions. Each movement component, for example, may include a shift fork that moves a respective synchronizer. In some embodiments, the gear shifting system 42 may be a hydraulic system that includes solenoid valves that actuate the movement components (e.g., shift forks). In other embodiments, the gear shifting system 42 may be a motorized system including a gear shifting motor that actuates the movement components (e.g., shift forks). In yet other embodiments, the gear shifting system 42 may be an electro-hydraulic or other type of system.

As FIG. 1 illustrates, the synchronizer 7 can be moved axially along the input shaft 1 by the movement component 42a of the gear shifting actuation mechanism 42. The synchronizer 7 can have (i) a first engaged position in which the synchronizer 7 keeps the driving gearwheel 10, but not the driving gearwheel 11, synchronized with the input shaft 1, (ii) a second engaged position in which the synchronizer 7 keeps the driving gearwheel 11, but not the driving gearwheel 10, synchronized with the input shaft 1, and (iii) a neutral position in which neither the driving gearwheel 10 nor the driving gearwheel 11 is synchronized with the input shaft 1. The synchronizer 7 can be moved axially along the input shaft 1 away from an adjacent gearwheel and into its neutral position so that the gearwheel is not synchronized with the input shaft 1. Because the synchronizer 7 alternately engages the driving gearwheel 10 and the driving gearwheel 11, the synchronizer 7 is also known as a second-and-fourth-speed-ratio synchronizer.

Similarly, the synchronizer 26 can also be moved axially along the input shaft 1 by a movement component 42b of the gear shifting actuation system 42. The synchronizer 26 can have (i) a first engaged position in which the synchronizer 26 keeps the driving gearwheel 12, but not the driving gearwheel 13, synchronized with the input shaft 1, (ii) a second engaged position in which the synchronizer 26 keeps the driving gearwheel 13, but not the driving gearwheel 12, synchronized with the input shaft 1, and (iii) a neutral position in which neither the driving gearwheel 12 nor the driving gearwheel 13 is synchronized with the input shaft 1. The synchronizer 26 can be moved axially along the input shaft 1 away from an adjacent gearwheel and into its neutral position so that the gearwheel is not synchronized with the input shaft 1. When the synchronizer 26 is in its neutral position, driving gearwheel 8 can be employed by the transmission 70 to provide a reverse speed ratio.

The transmission 70 also includes a speed-reducing gearwheel 14, a driven gearwheel 15, a synchronizer 9, the intermediate shaft 5, a driven gearwheel 18 and a driven gearwheel 19 disposed on the output shaft 2. Additionally, the transmission 70 includes a driven gearwheel 16 and a driven gearwheel 17 disposed on the intermediate shaft 5. As described further below, the driven gearwheel 15 can act as a second-speed-ratio driven gearwheel. The driven gearwheel 19 can act as a third-speed-ratio driven gearwheel. The driven gearwheel 16 can act as a fourth-speed-ratio driven gearwheel. The driven gearwheel 18 can act as a fifth-speed-ratio driven gearwheel.

The synchronizer 9 can be moved axially along the output shaft 2 by a movement component 42c of the gear shifting actuation system 42. The synchronizer 9 can have (i) a first engaged position in which the synchronizer 9 keeps the driven gearwheel 15, but not the gearwheel 16, synchronized with the output shaft 2, (ii) a second engaged position in which the synchronizer 9 keeps the driving gearwheel 16, but not the driving gearwheel 15, synchronized with the output shaft 2, and (iii) a neutral position in which neither of the driven gearwheel 15 and the gearwheel 16 is synchronized with the output shaft 2. The synchronizer 9 can be moved axially along the output shaft 2 and away from an adjacent gearwheel and into its neutral position so that the gearwheel is not synchronized with the output shaft 2. In the second engaged position, the synchronizer 9 may directly engage the gearwheel 16, or the synchronizer 9 may directly engage the intermediate shaft 5 to indirectly synchronize the gearwheel 16 with the output shaft 2, where the gearwheel 16 is disposed along the intermediate shaft 5.

The transmission 70 includes a driven gearwheel 20, a driven gearwheel 21, a driven gearwheel 22, and a driven gearwheel 23 disposed on the intermediate shaft 3. When the synchronizer 26 is in the neutral position, the driven gearwheel 23 can slide along the intermediate shaft 3, or along a sleeve 31 carried by the intermediate shaft 3, to engage the driving gearwheel 8 to provide a reverse speed ratio. FIG. 1 illustrates a relative position 8a of the driving gearwheel 8 such that driven gearwheel 23 can slide into engagement with driving gearwheel 8. A movement component 46 may be operated to move and keep the driven gear 23 in the desired position. Accordingly, the driving gearwheel 8 acts a reverse-gear driven gearwheel. Because the synchronizer 26 engages the driving gearwheel 12 or the driving gearwheel 13 or allows the driven gearwheel 23 to engage the driving gearwheel 8, the synchronizer 26 is also known as a third-and-fifth-speed-ratio-and-reverse synchronizer.

The transmission 70 also includes a driving gearwheel 24 disposed on the motor shaft 4 coupled to the EM 50. The EM 50 drives the motor shaft 4 and the driving gearwheel 24. The driving gearwheel 24 drives the driven gearwheel 20 on the intermediate shaft 3. The power transmitted to the intermediate shaft 3 is then delivered to other aspects of the transmission 70 as described further herein. As shown in FIG. 1, the driving gearwheel 24 engages the driven gearwheel 20 via a motor drive 20a.

Figure 2:
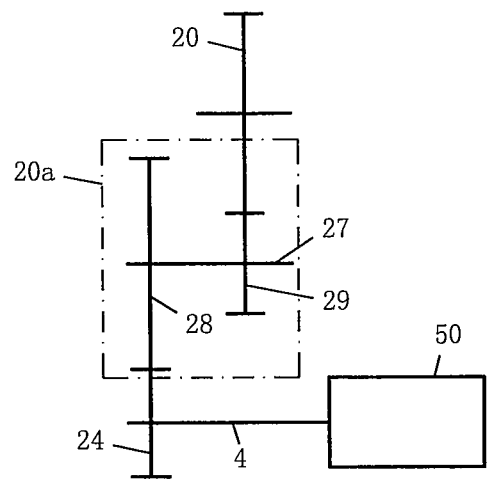
FIG. 2 illustrates example motor drives for the HPDS of FIG. 1 in accordance with the example embodiments.
Figure 2:
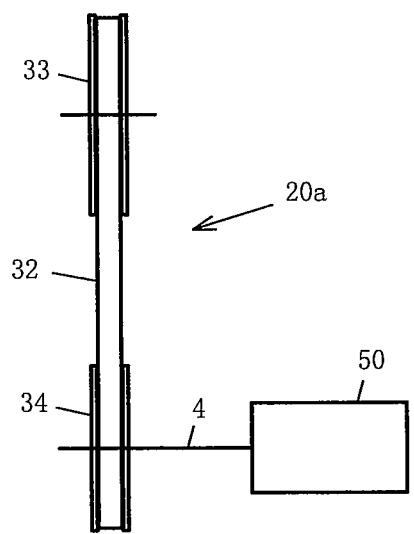

FIG. 2(a) illustrates that the motor drive 20a can be arranged as a gear set for transmitting power or torque from the driving gearwheel 24 to driven gearwheel 20. In this example, the motor drive 20a includes an intermediate shaft 27 as well as a driven gearwheel 28 and a driving gearwheel 29 disposed on the intermediate shaft 27. The intermediate shaft 27 can be spatially arranged parallel to the five transmission shafts. The driving gearwheel 24 engages the driven gearwheel 28 to drive the intermediate shaft 27. The driving gearwheel 29 then engages and drives the driven gearwheel 20.

FIG. 2(b) illustrates that alternatively, the motor drive 20a can be arranged as a linking mechanism 32 with a belt pulley/sprocket 34 and a belt pulley/sprocket 33 substituted for driving gearwheel 24 and driven gearwheel 20, respectively. The linking mechanism 32 can, for example, include a chain (e.g., a steel chain) or a belt (e.g., a rubber-based belt).

The motor shaft 4 can also be configured to rotate, in turn, a mechanical compressor 55 of an air conditioning system or a compressor clutch 57 thereof, if included with the HPDS 110.

Furthermore, the transmission 70 includes a differential 60, which in turn includes a final driven gearwheel 25 and differential half-axles (output shafts) 6a and 6b. The differential 60 can include a pair of carriers 61, 62 fixed to the final driven gearwheel 25, a shaft 63 rotatably carried by the pair of carriers 61, 62, a pair of first gears 64, 65 mounted to the shaft 63, a pair of second gears 66, 67 each meshing with the first gears 64, 65, and the differential half-axles 6a and 6b extending from the second gears 66, 67 respectively. The differential half-axles 6a and 6b can be connected to vehicle wheels. The pair of carriers 61 and 62 can be configured as a single carrier fixed to the final driven gearwheel 25, but is not so limited. Each of the first gears 64 and 65 can be referred to as a spider gear. Each of the second gears 66 and 67 can be referred to as a side gearwheel. The differential 60 can include a differential case (not shown). The final driven gearwheel 25, as well as one or more other components of the differential 60, can be carried by or within the differential case. The power output by the half-axles 6a and 6b for the forward speed ratios can cause the half-axles 6a and 6b, and wheels attached thereto, to turn in a first driving direction (e.g., a forward driving direction). The power output by the half-axles 6a and 6b for the reverse speed ratios can cause the half-axles 6a and 6b, and wheels coupled thereto, to turn in a second driving direction (e.g., a reverse driving direction) opposite the first driving direction. The driven gearwheel 23 is not meshed with the driving gearwheel 8 for the forward speed ratios. As such, using various configurations of the gearwheels, synchronizers, and shafts described above, the transmission 70 delivers power from the ICE 30 and/or the EM 50 to the differential 60 to drive the wheels of the vehicle.

TABLE 1 lists each gearwheel and synchronizer illustrated in FIG. 1 and indicates the gearwheel(s) that each engages or meshes, directly or indirectly (e.g., gearwheels 20 and 24 indirectly mesh by way of motor drive 20*a*).

TABLE 1

| Gearwheel/Synchronizer (Drawing Reference Number) | Engaging/Meshing Gearwheels |
|---|---|
| Synchronizer (7) | 10, 11 |
| Synchronizer (9) | 15, 16 |
| Synchronizer (26) | 12, 13 |
| Driving gearwheel (8) | 23 |
| Driving gearwheel (10) | 15 |
| Driving gearwheel (11) | 16 |
| Driving gearwheel (12) | 18 |
| Driving gearwheel (13) | 19 |
| Speed-reducing gearwheel (14) | 25 |
| Driven gearwheel (15) | 10, 21 |
| Driven gearwheel (16) | 11 |
| Driven gearwheel (17) | 22 |
| Driven gearwheel (18) | 12 |
| Driven gearwheel (19) | 13 |
| Driven gearwheel (20) | 29 |
| Driven gearwheel (21) | 15 |
| Driven gearwheel (22) | 17 |
| Driven gearwheel (23) | 8 |
| Driving gearwheel (24) | 28 |
| Final driven gearwheel (25) | 14 |
| Driving gearwheel (28) | 24 |
| Driving gearwheel (29) | 20 |

Although the gearwheels and synchronizers shown in FIG. 1 are illustrated according to a particular arrangement on the shafts, it is understood that embodiments are not limited to such an arrangement. For example, the gearwheels and synchronizers can be positioned along the shafts according to different sequences and relative positions (e.g., from left to right in FIG. 1), so long as each of the gearwheels is positioned to mesh with the appropriate gearwheel(s) and each of the synchronizers is positioned to engage the appropriate gearwheels.

In summary, the transmission 70 according to example embodiments provides a second-speed-ratio driving gear (gearwheel 10), a third-speed-ratio driving gear (gearwheel 13), a fourth-speed-ratio driving gear (gearwheel 11), a fifth-speed-ratio driving gear (gearwheel 12), a reverse-gear driving gear (gearwheel 8), a second-and-fourth-speed-ratio synchronizer (synchronizer 7), and a third-fifth-speed-ratio-and-reverse synchronizer (synchronizer 26) on the input shaft 1. The third-fifth-speed-ratio-and-reverse synchronizer (synchronizer 26) is integral with the reverse-gear driving gear (gearwheel 8). In addition, the transmission 70 provides a second-speed-ratio driven gear (gearwheel 15), a third-speed-ratio driven gear (gearwheel 19), a fourth-speed-ratio driven gear (gearwheel 16), a fifth-speed-ratio driven gear (gearwheel 18), a reverse-gear driven gear (gearwheel 23), a main speed-reducing gear (gearwheel 14) and a synchronizer (synchronizer 9) on the output shaft 2. Three gears (gearwheels 20, 21, 22) and the reverse-gear driven gear (gearwheel 23) are provided on the intermediate shaft 3. The reverse-gear driven gear (gearwheel 23) is slidably carried by the intermediate shaft 3 via the sleeve 31 or a spline. Two gears (gearwheels 16, 17) are provided on the intermediate shaft 5. A drive gear (gearwheel 24) is provided on the motor shaft 4. A final driven gear (gearwheel 25) and differential half-axles 6*a* and 6*b* are provided on the differential 60 of the transmission 70. The first speed ratio and the sixth speed ratio are achieved by cooperatively adjusting the gearwheels and the synchronizers.

As shown further in FIG. 1, the transmission control system 120 includes a gear shifting actuation module 132 for controlling how the synchronizers 7, 26, and 9 engage the gearwheels in the transmission 70 to achieve selected speed ratios. In addition, the transmission control system 120 also includes a clutch actuation module 142 for controlling the clutch 40. Furthermore, the transmission control system 120 includes a transmission coordinating module 152 that integrally controls the various functions of the transmission 70, including gear shifting by the module 132 and clutch operation by the module 142. In general, the transmission control system 120 coordinates the operation of the synchronizers 7, 9, 26 and the clutch 40 to achieve required transmission functions for the HPDS 110.

The transmission control system 120 may communicate and operate with other control or management systems in the vehicle. For example, the vehicle may include a hybrid power control system 160 that manages the power for the vehicle and may provide the transmission control system 120 with information that indicates what transmission operations (e.g., gear shifts) are desired to power the vehicle. In the processes described below, the transmission control system 120 may signal other control and management systems to operate related components, such as the ICE 30 and the EM 50. For example, the transmission control system 120 may provide signals to an engine management system that controls the ICE 30 (e.g., via fuel injection and ignition) or a motor management system that controls the EM 50 (e.g., via electricity delivery from a battery). In general, however, when referring to the transmission control system 120, it is understood that some or all aspects of other control and management systems may be considered to be part of the transmission control system 120.

Figure 27:
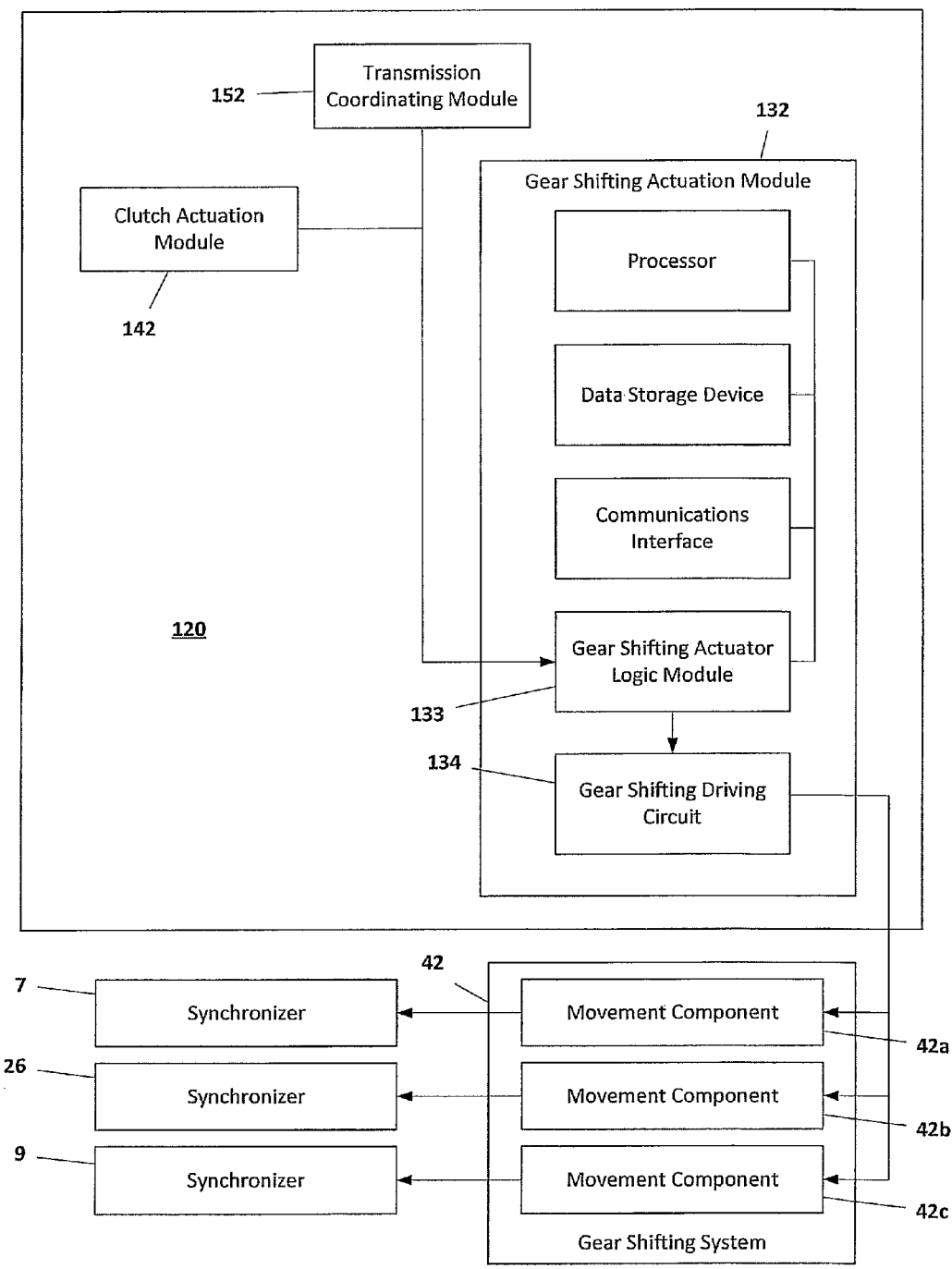
FIG. 27 illustrates aspects of an example gear shifting actuation module for a transmission control system in accordance with the example embodiments.

As shown in FIG. 27, the gear shifting actuation module 132 includes a gear shifting actuator logic module 133 and a driving circuit 134. The gear shifting actuator logic module 133 receives, e.g., from the transmission coordinating module 152, a synchronizer displacement command that indicates a desired gear shift. To achieve the desired gear shift, the gear shifting actuator logic module 133 causes the driving circuit 134 to move the synchronizers 7, 9, and/or 26 to the required positions relative to the gearwheels on the shafts. In some embodiments, the driving circuit 134 drives the solenoid valves of a hydraulic gear shifting system 42, which in turn move the synchronizers 7, 9, and/or 26. Additionally or alternatively, the driving circuit 134 drives the gear shifting motor of a motorized gear shifting system 42, which in turn moves the synchronizers 7, 9, and/or 26.

Figure 28:
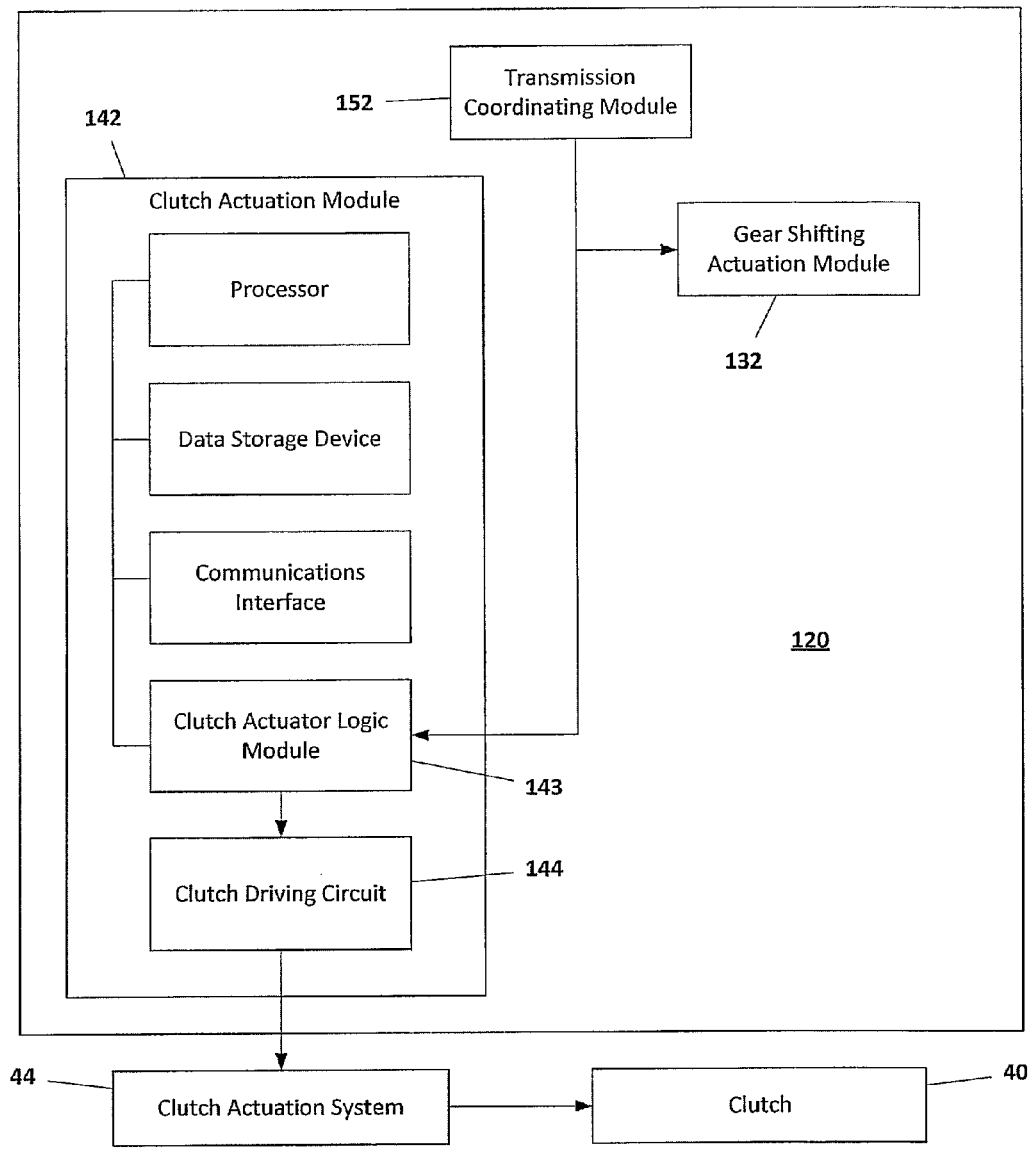
FIG. 28 illustrates aspects of an example clutch actuation module for a transmission control system in accordance with the example embodiments.

As shown in FIG. 28, the clutch actuation module 142 includes a clutch actuator logic module 143 and a driving circuit 144. The clutch actuator logic module 143 receives, e.g., from the transmission coordinating module 152, a clutch torque requirement command that indicates how the clutch 40 should engage or disengage the ICE 30. In response, the clutch actuator logic module 143 causes the driving circuit 144 to engage or disengage the clutch 40, via the clutch actuation system 44, in varying degrees to allow a desired torque to be transferred between the ICE 30 and the clutch 40. As described above, the clutch 40 can be controlled to allow varying amounts of torque between the ICE 30 and the input shaft 1. The driving circuit 144 may include solenoid valves for driving a hydraulic clutch actuation system 44, which in turn causes the clutch 40 to be engaged/disengaged. Additionally or alternatively, the driving circuit 144 drives the motor of a motorized clutch actuation system 44, which in turn causes the clutch 40 to be engaged/disengaged.

The transmission coordinating module 152 receives information on a desired speed ratio from the hybrid power control system 160 or other control system. In response, the transmission coordinating module 152 determines the synchronizer displacement command for the gear shifting actuation module 132 and the clutch torque requirement command for the gear shifting actuation module 142. The transmission coordinating module 152 coordinates such commands to achieve transmission functions, including gear shifting and starting the ICE 30 during PMDM or when the vehicle is in a parked state.

The gear shifting actuation module 132, the clutch actuation module 142, and the transmission coordinating module 152 may be separate and individual modules that exchange data via a vehicle data communication link, such as but not limited to a controller area network (CAN) communication link. Alternatively, two or more of the three modules 132, 142, and 152 may be integrated into common physical controller(s) in which data is exchanged via software interfaces.

In accordance with the example embodiments, the HPDS 110 can include the transmission 70 having common gears that are shared in different speed ratios. As described above, the ICE 30 can provide six forward speed ratios and one reverse speed ratio while the EM 50 can provide four forward speed ratios. The example embodiments can also include a single clutch transmission and a three synchronizer gearbox. The transmission control system 120 controls the clutch 40 and the synchronizers to coordinate power output from the ICE and the EM as the transmission shifts through the speed ratios of the ICE and EM. The HPDS 110 can include synchronizers 7, 9, 26 that are cooperatively switched and gearwheels that are used in multiple speed ratios.

III. Power Transmission Paths for Example HPDS

As described above, the HPDS 110 in the example embodiments can selectively operate in: (i) a pure engine driving mode (PEDM) in which the ICE 30 is the sole acting power source for the HPDS 110, (ii) a pure motor driving mode (PMDM) in which the EM 50 is the sole acting power source for the HPDS 110, and (iii) a hybrid driving mode (HDM) in which both the ICE 30 and the EM 50 are the acting power sources for the HPDS 110. The transmission 70 can provide multiple power transmission paths for each of these driving modes. Examples of these power transmission paths are described below. For each of the power transmission paths of the PEDM and the HDM, the clutch 40 is in an engaged state such that torque from ICE 30 is transmitted to the input shaft 1 by the clutch 40. For each of the power transmission paths of the PMDM, the clutch 40 is in the disengaged state such that any torque available from the ICE 30 is not transmitted to the input shaft 1 by the clutch 40 and/or the ICE 30 is not outputting power. The power transmission paths for the ICE 30 are also referred to herein engine torque transmission paths, while the power transmission paths for the EM 50 are also referred to herein as motor torque transmission paths.

Shifting the transmission 70 from any speed ratio to another speed ratio in the PEDM and HDM can include disengaging the clutch 40 to decouple the ICE 30 from the input shaft 1 so that one or more of the synchronizers 7, 9, 26 can be moved axially to allow for engagement and disengagement (i.e., coupling and uncoupling) of one or more gearwheels as described below. The axial movement of any of the synchronizers described herein to engage a gearwheel can include synchronizing that gearwheel with the shaft on which the synchronizer is carried such that the gearwheel and that shaft rotate at the same speed. To achieve these power transmission paths, the gear shifting actuation module 132 of the transmission control system 120 controls the synchronizers 7, 9, 26, while the clutch actuation module 142 of the transmission control system 120 controls the clutch 40. In particular, the transmission coordinating module 152 determines whether the clutch 40 is in the desired state and whether the synchronizers 7, 9, 26 are in the desired positions. If necessary, the clutch actuation module 142 receives the command(s) to move the clutch 40 into the desired state, and/or the gear shifting actuation module 132 receives the command(s) to move the synchronizers 7, 9, 26 into the desired positions.

A. Power Transmissions Paths—Pure Engine Driving Mode (PEDM)

1. PEDM—First Forward Speed Ratio (ICE1)

Figure 3:
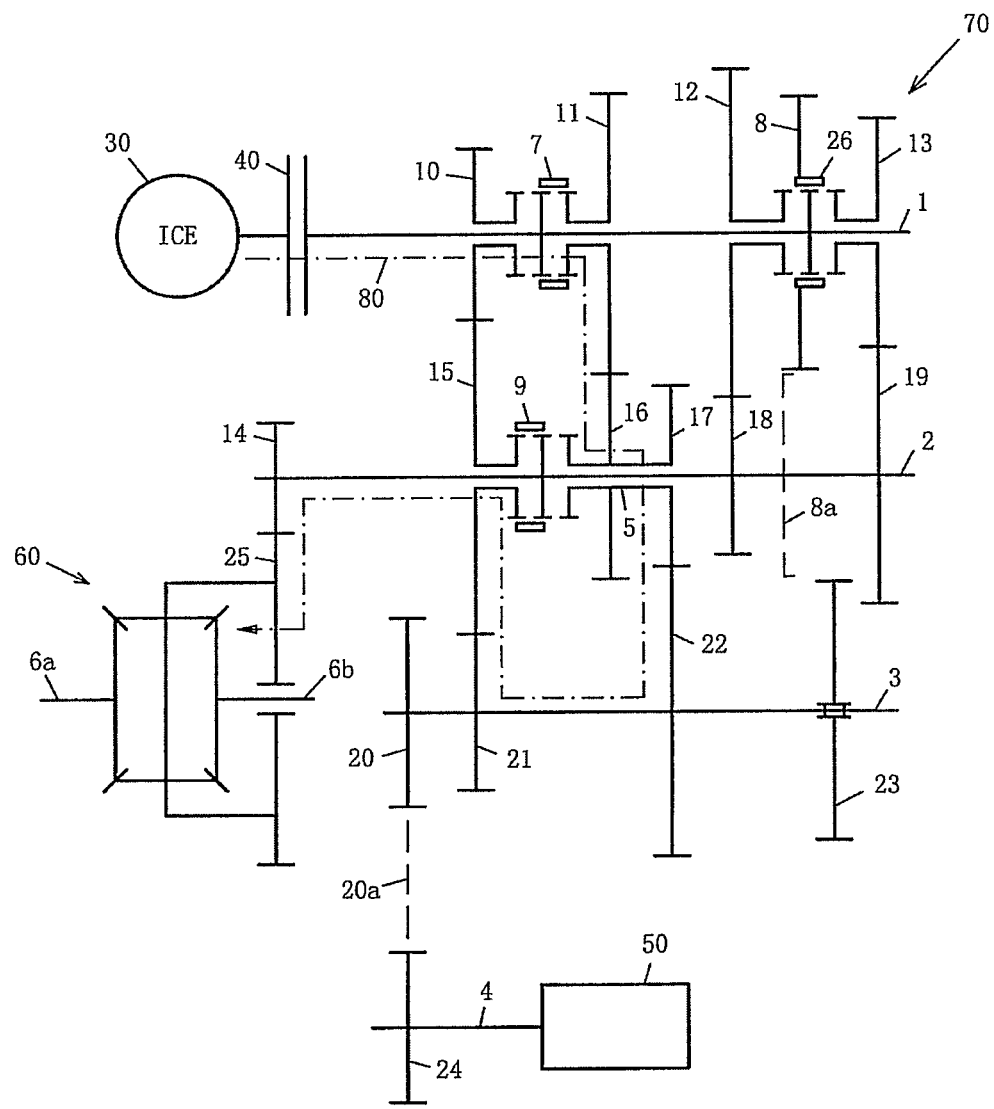
FIGS. 3-9 illustrate example power transmission paths for the HPDS of FIG. 1 when operating in pure engine driving mode (PEDM).

FIG. 3 shows a power transmission path 80 that the HPDS 110 and the transmission 70 can provide for a first forward speed ratio while operating in the PEDM. The power transmission path 80 can be achieved when: (i) the clutch 40 is in an engaged state to couple the ICE 30 to the input shaft 1; (ii) the synchronizer 7 engages the driving gearwheel 11; (iii) the synchronizer 26 is in its neutral position; and (iv) the synchronizer 9 engages the driven gearwheel 15. For the first forward speed ratio in PEDM, the power output from the ICE 30 is transmitted in sequence through the driving gearwheel 11 on the input shaft 1, the driven gearwheel 16 on the intermediate shaft 5, the driven gearwheel 17 on the intermediate shaft 5, the driven gearwheel 22 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

2. PEDM—Second Forward Speed Ratio (ICE2)

Figure 4:
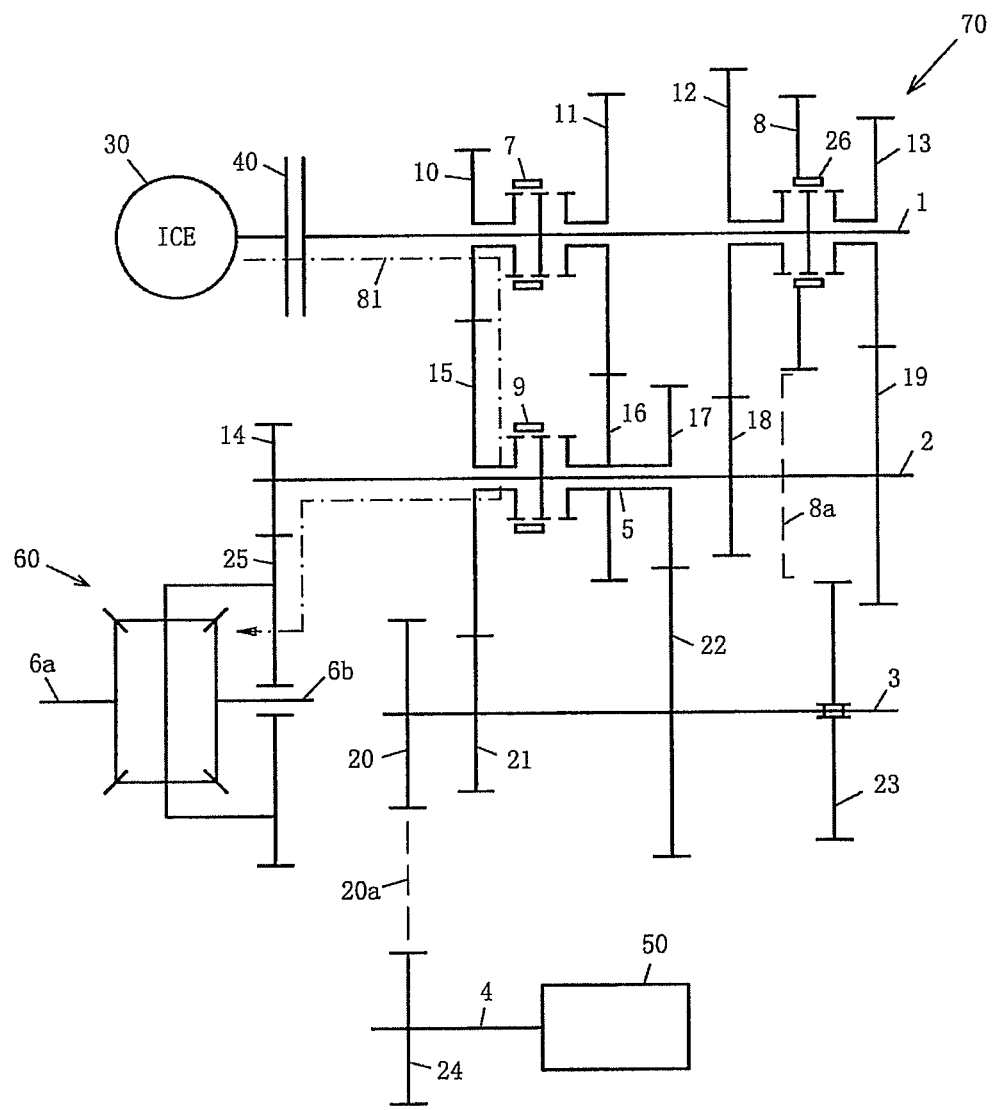

FIG. 4 shows a power transmission path 81 that the HPDS 110 and the transmission 70 can provide for a second forward speed ratio while operating in the PEDM. The power transmission path 81 can be achieved when: (i) the clutch 40 is in an engaged state to couple the ICE 30 to the input shaft 1; (ii) the synchronizer 7 engages the driving gearwheel 10; (iii) the synchronizer 26 is in its neutral position; and (iv) the synchronizer 9 engages the driven gearwheel 15. For the second forward speed ratio in the PEDM, the power output from the ICE 30 is transmitted in sequence through the driving gearwheel 10 on the input shaft 1, the driven gearwheel 15 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

3. PEDM—Third Forward Speed Ratio (ICE3)

Figure 5:
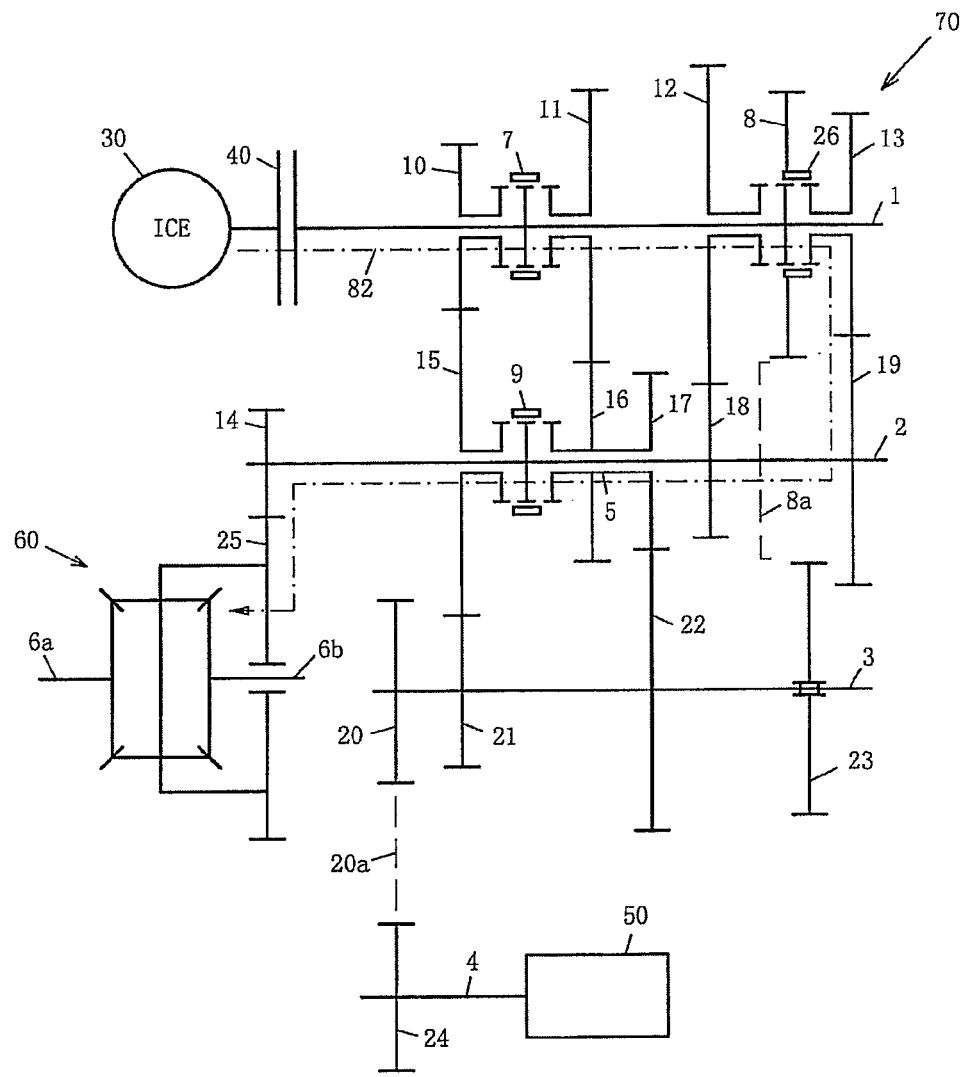

FIG. 5 shows a power transmission path 82 that the HPDS 110 and the transmission 70 can provide for a third forward speed ratio while operating in the PEDM. The power transmission path 82 can be achieved when: (i) the clutch 40 is in an engaged state to couple the ICE 30 to the input shaft 1; (ii) the synchronizer 7 is in its neutral position; (iii) synchronizer 26 engages the driving gearwheel 13; and (iv) the synchronizer 9 is in its neutral position. For the third forward speed ratio in the PEDM, the power output from the ICE 30 is transmitted in sequence through the third-speed-ratio driving gear 13 on the input shaft 1, the third-speed-ratio driven gear 19 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

4. PEDM—Fourth Forward Speed Ratio (ICE4)

Figure 6:
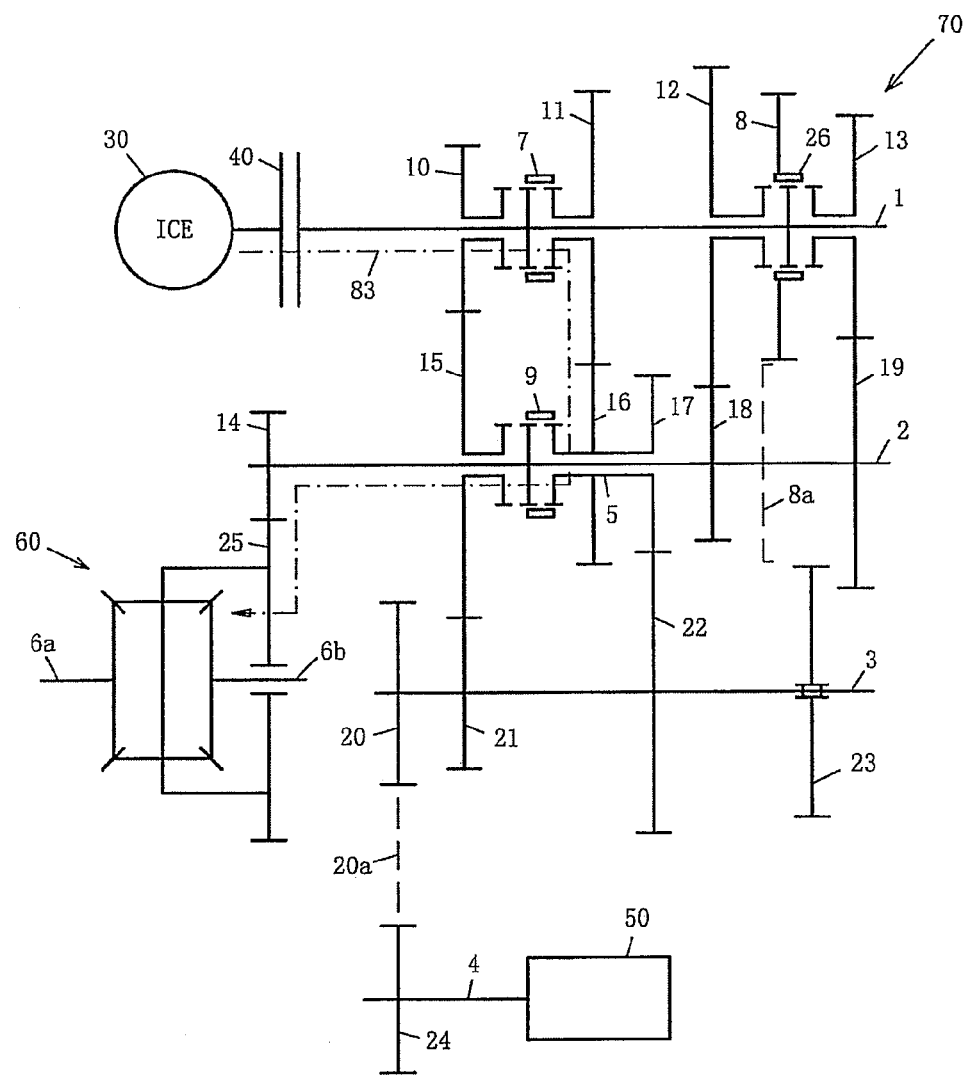

FIG. 6 shows a power transmission path 83 that the HPDS 110 and the transmission 70 can provide for a fourth forward speed ratio while operating in the PEDM. The power transmission path 83 can be achieved when: (i) the clutch 40 is in an engaged state to couple the ICE 30 to the input shaft 1; (ii) the synchronizer 7 engages the driving gearwheel 11; (iii) the synchronizer 26 is in its neutral position; and (iv) the synchronizer 9 engages the driven gearwheel 16. For the fourth forward speed ratio in the PEDM, the power output from the ICE 30 is transmitted in sequence through the driving gearwheel 11 on the input shaft 1, the driven gearwheel 16, the speed-reducing gearwheel 14 on the output shaft 2, and the final driven gearwheel 25 on the differential 60. The power transmitted to the final driven gearwheel 25 is then transmitted through the differential half-axles 6a and 6b.

5. PEDM—Fifth Forward Speed Ratio (ICE5)

Figure 7:
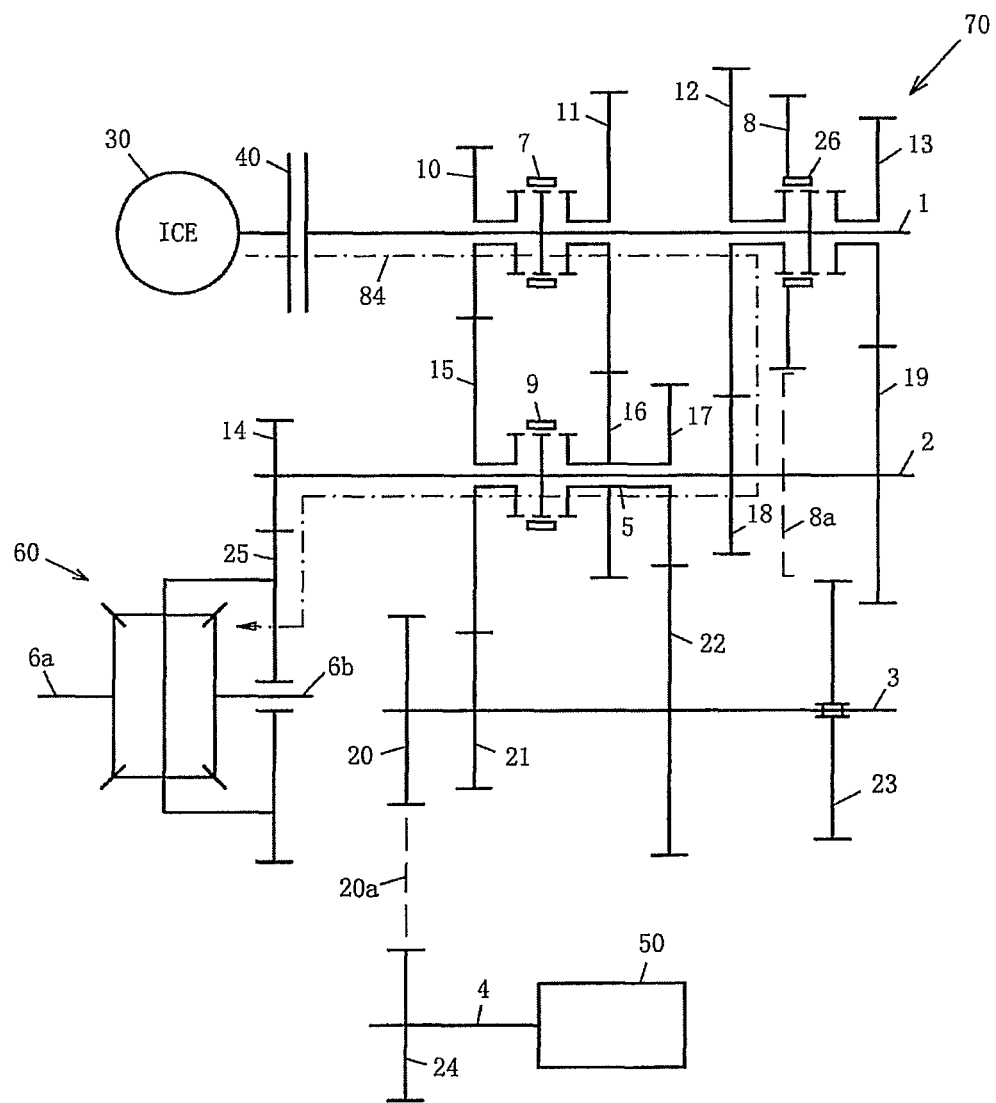

FIG. 7 shows a power transmission path 84 that the HPDS 110 and the transmission 70 can provide for a fifth forward speed ratio while operating in the PEDM. The power transmission path 84 can be achieved when: (i) the clutch 40 is in an engaged state to couple the ICE 30 to the input shaft 1; (ii) the synchronizer 7 is in its neutral position; (iii) the synchronizer 26 engages the driving gearwheel 12; and (iv) the synchronizer 9 is in its neutral position. For the fifth forward speed ratio in the PEDM, the power output from the ICE 30 is transmitted in sequence through the driving gearwheel 12 on the input shaft 1, the driven gearwheel 18 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

6. PEDM—Sixth Forward Speed Ratio (ICE6)

Figure 8:
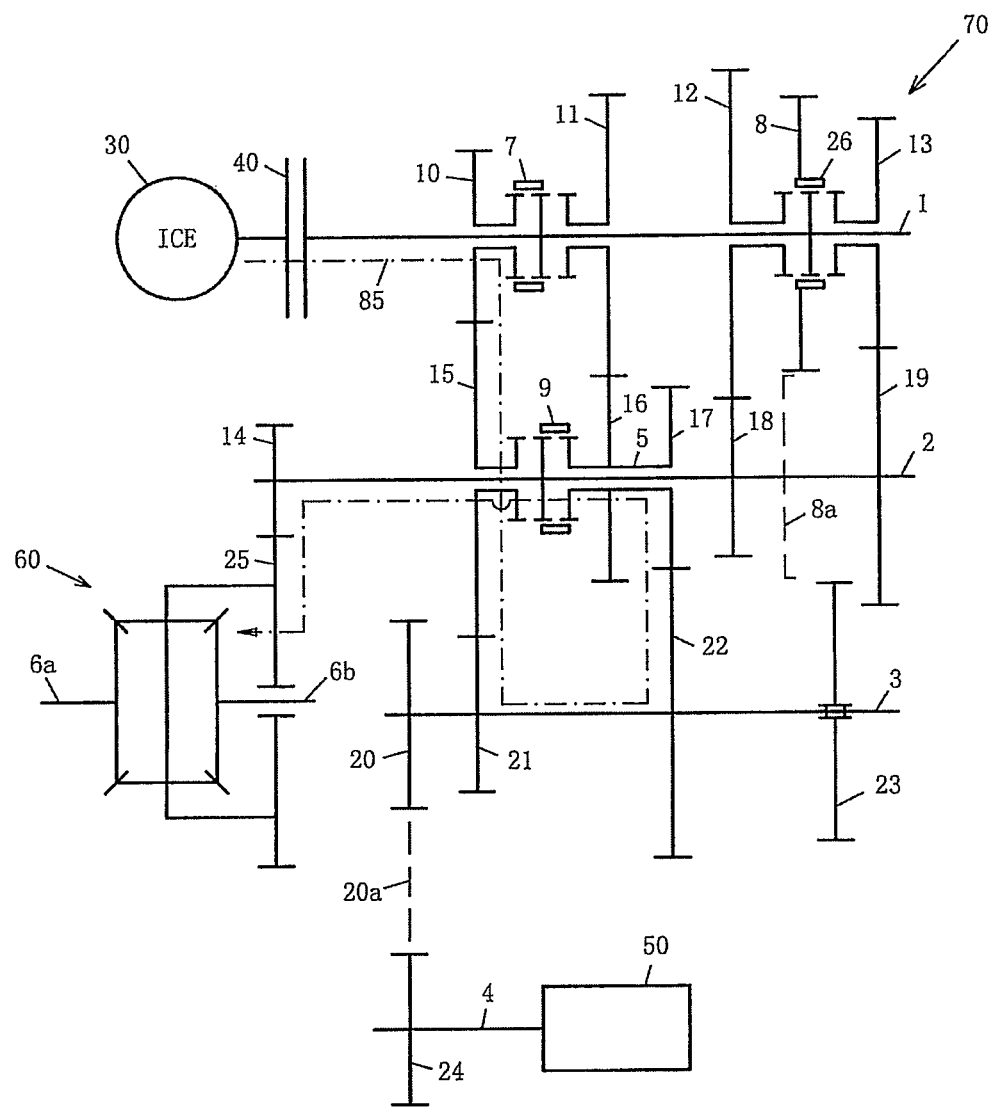

FIG. 8 shows a power transmission path 85 that the HPDS 110 and the transmission 70 can provide for a sixth forward speed ratio while operating in the PEDM. The power transmission path 85 can be achieved when: (i) the clutch 40 is in an engaged state to couple the ICE 30 to the input shaft 1; (ii) the synchronizer 7 engages the driving gearwheel 10; (iii) the synchronizer 26 is in its neutral position; and (iv) the synchronizer 9 engages the driven gearwheel 16. For the sixth forward speed ratio in the PEDM, the power output from the ICE 30 is transmitted in sequence through the driving gearwheel 10 on the input shaft 1, the driven gearwheel 15 on the output shaft 2, the driven gearwheel 21 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 is then transmitted through the differential half-axles 6a and 6b.

7. PEDM—Reverse Speed Ratio (ICEr)

Figure 9:
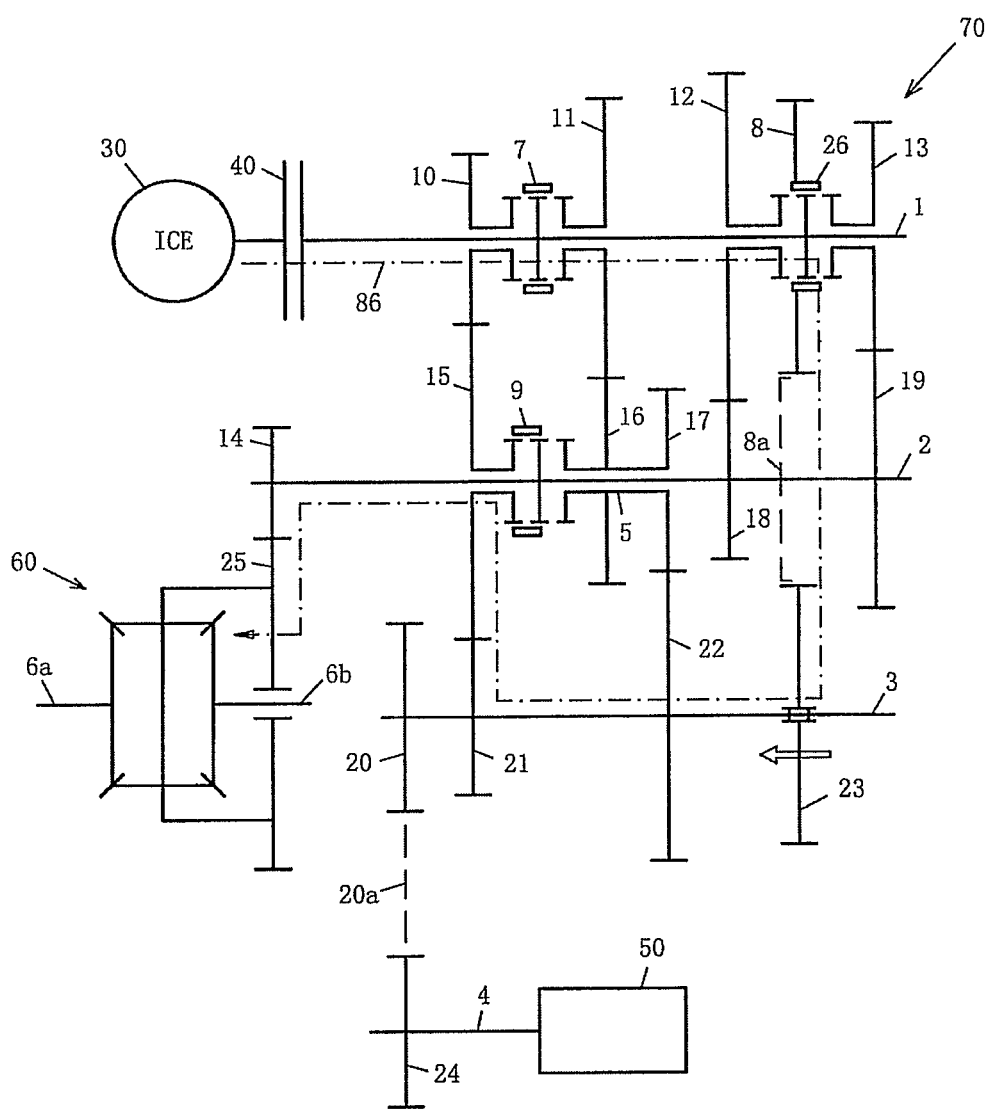

FIG. 9 shows a power transmission path 86 that the HPDS 110 and the transmission 70 can provide for a reverse speed ratio while operating in the PEDM. The power transmission path 86 can be achieved when: (i) the clutch 40 is in an engaged state to couple the ICE 30 to the input shaft 1; (ii) the synchronizer 7 is in its neutral position; (iii) the synchronizer 26 is in its neutral position; (iv) the synchronizer 9 engages the driven gearwheel 15; and (v) the driven gearwheel 23 is slidably engaged with the driving gearwheel 8. For the reverse speed ratio in the PEDM, the power output from the ICE 30 is transmitted in sequence through the driving gearwheel 8 on the synchronizer 26, the driven gearwheel 23 on the intermediate shaft 2, the driven gearwheel 21 on the intermediate shaft 2, the driven gearwheel 15 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

B. Power Transmission Paths—Pure Motor Driving Mode (PMDM)

1. PMDM—First Forward Speed Ratio (EM1)

Figure 10:
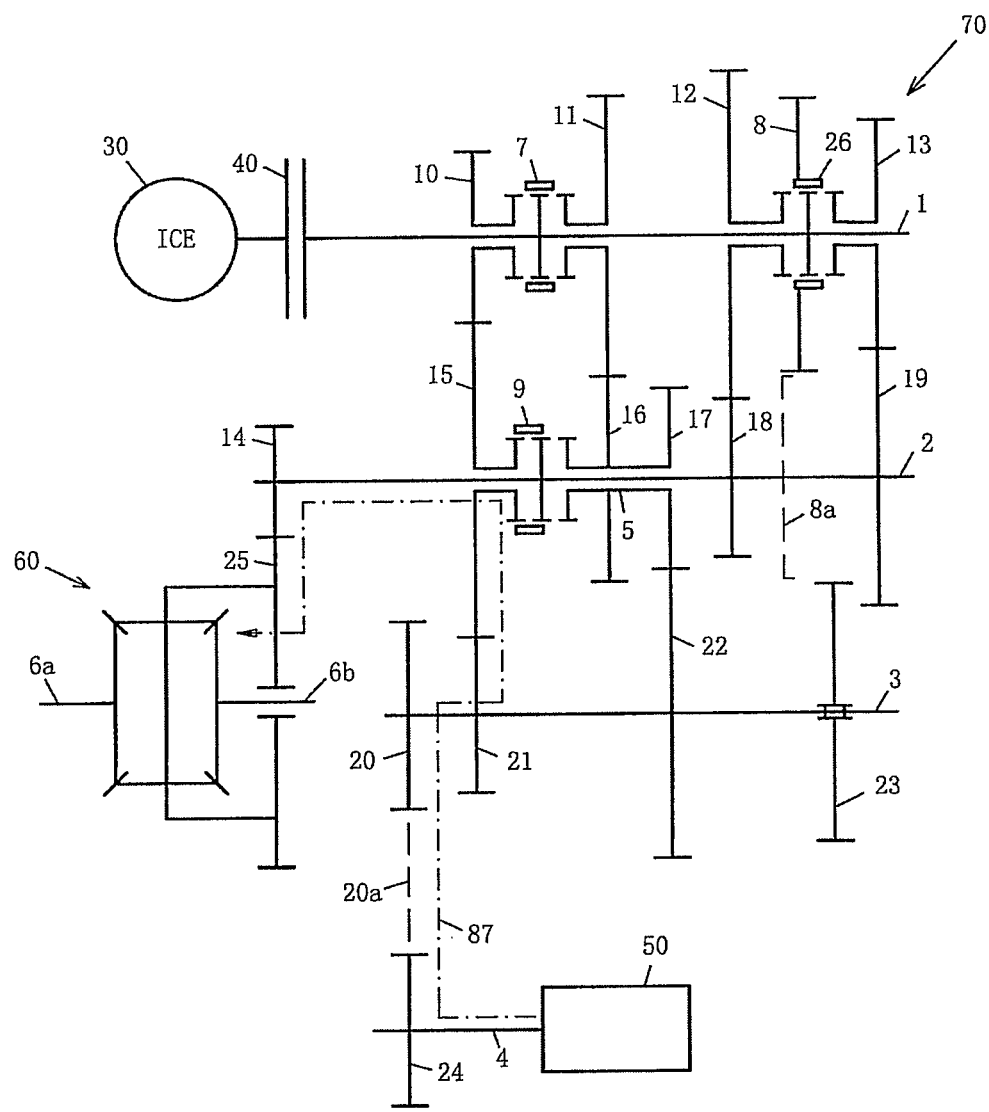
FIGS. 10-13 illustrate example power transmission paths for the HPDS of FIG. 1 when operating in pure motor driving mode (PMDM).

FIG. 10 shows a power transmission path 87 that the HPDS 110 and the transmission 70 can provide for a first forward speed ratio while operating in the PMDM. The power transmission path 87 can be achieved when: (i) the synchronizer 7 is in its neutral position; (ii) the synchronizer 26 is in its neutral position; and (iii) the synchronizer 9 engages the driven gearwheel 15. Furthermore, the clutch 40 can be disengaged such that the ICE 30 is not coupled with the input shaft 1, or the ICE 30 does not output power. For the first forward speed ratio in the PMDM, the power output from the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

2. PMDM—Second Forward Speed Ratio (EM2)

Figure 11:
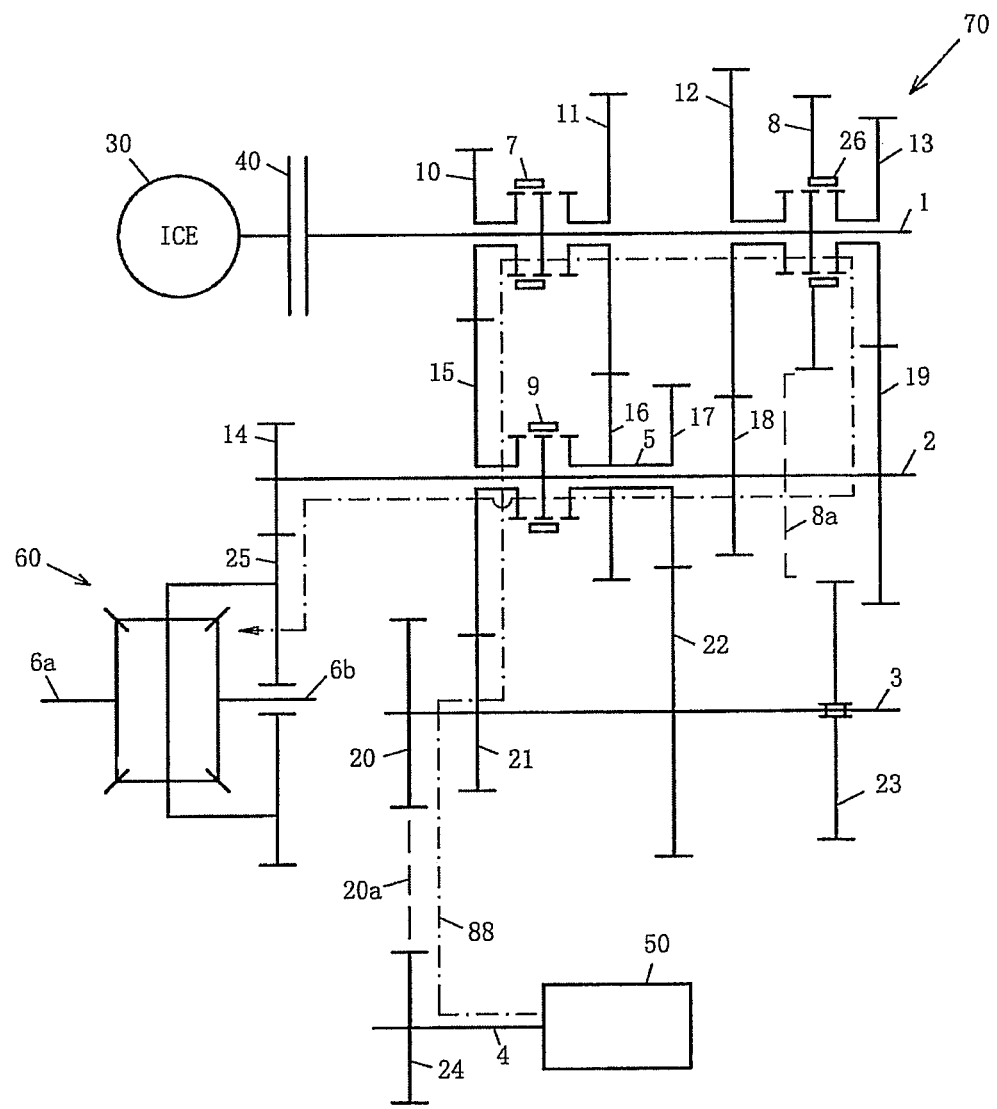

FIG. 11 shows a power transmission path 88 that the HPDS 110 and the transmission 70 can provide for a second forward speed ratio while operating in the PMDM. The power transmission path 88 can be achieved when: (i) the synchronizer 7 engages the driving gearwheel 10; (ii) the synchronizer 26 engages the driving gearwheel 13; and (iii) the synchronizer 9 is in its neutral position. Furthermore, the clutch 40 can be disengaged such that the ICE 30 is not coupled with the input shaft 1, or the ICE 30 does not output power. For the second forward speed ratio in the PMDM, the power output from the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the driving gearwheel 10, the driving gearwheel 13 on the input shaft 1, the driven gearwheel 19 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

3. PMDM—Third Forward Speed Ratio (EM3)

Figure 12:
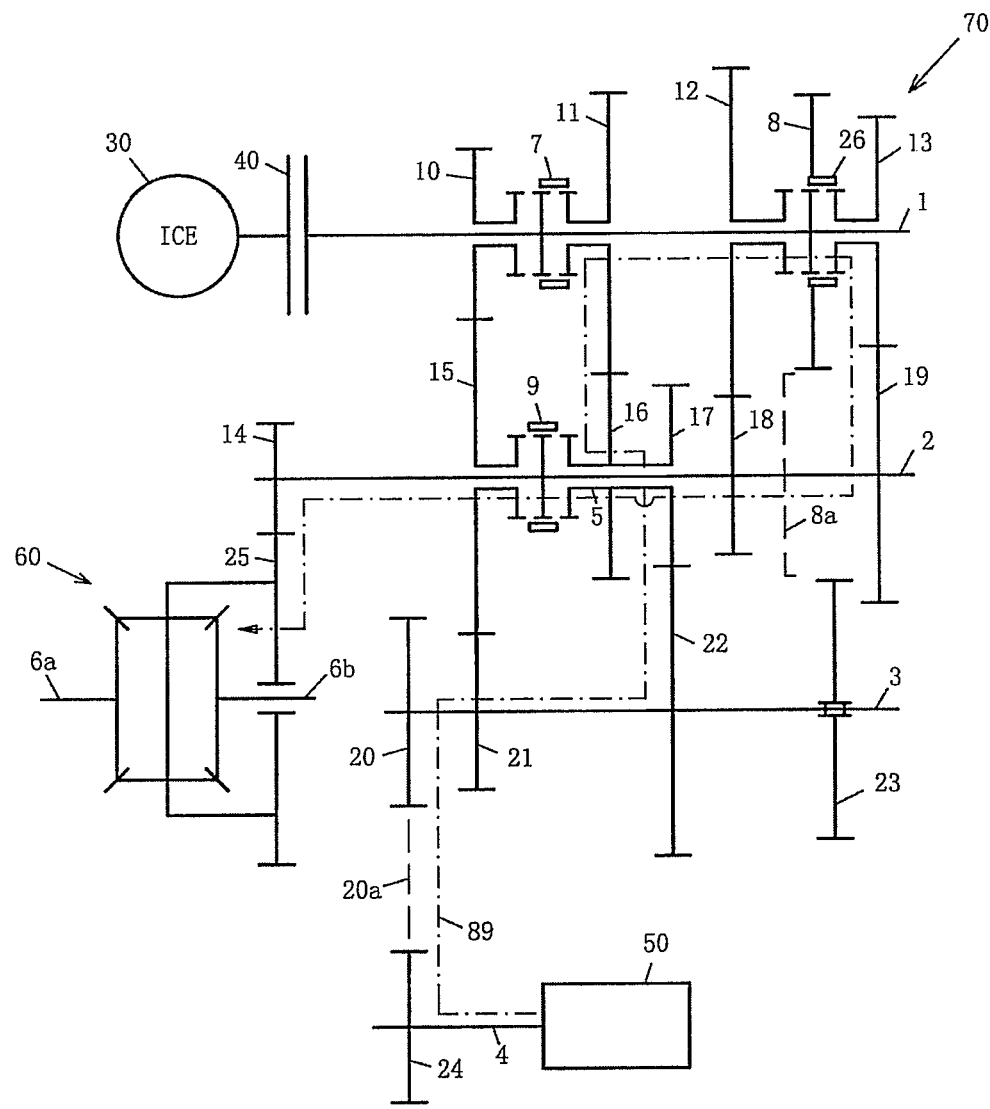

FIG. 12 shows a power transmission path 89 that the HPDS 110 and the transmission 70 can provide for a third forward speed ratio while operating in the PMDM. The power transmission path 89 can be achieved when: (i) the synchronizer 7 engages the driving gearwheel 11; (ii) the synchronizer 26 engages the driving gearwheel 13; and (iii) the synchronizer 9 is in its neutral position. Furthermore, the clutch 40 can be disengaged such that the ICE 30 is not coupled with the input shaft 1, or the ICE 30 does not output power. For the third forward speed ratio in the PMDM, the power output from the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 and the driven gearwheel 16 on the intermediate shaft 5, the driving gearwheel 11 on the input shaft 1, the driving gearwheel 13 on the input shaft 1, the driven gearwheel 19 on the output shaft 2, the speed-reducing gearwheel 14 on the output shaft 2, and the final driven gearwheel 25 on the differential 60. The power transmitted to the final driven gearwheel 25 is then transmitted through the differential half-axles 6a and 6b.

4. PMDM—Fourth Forward Speed Ratio (EM4)

Figure 13:
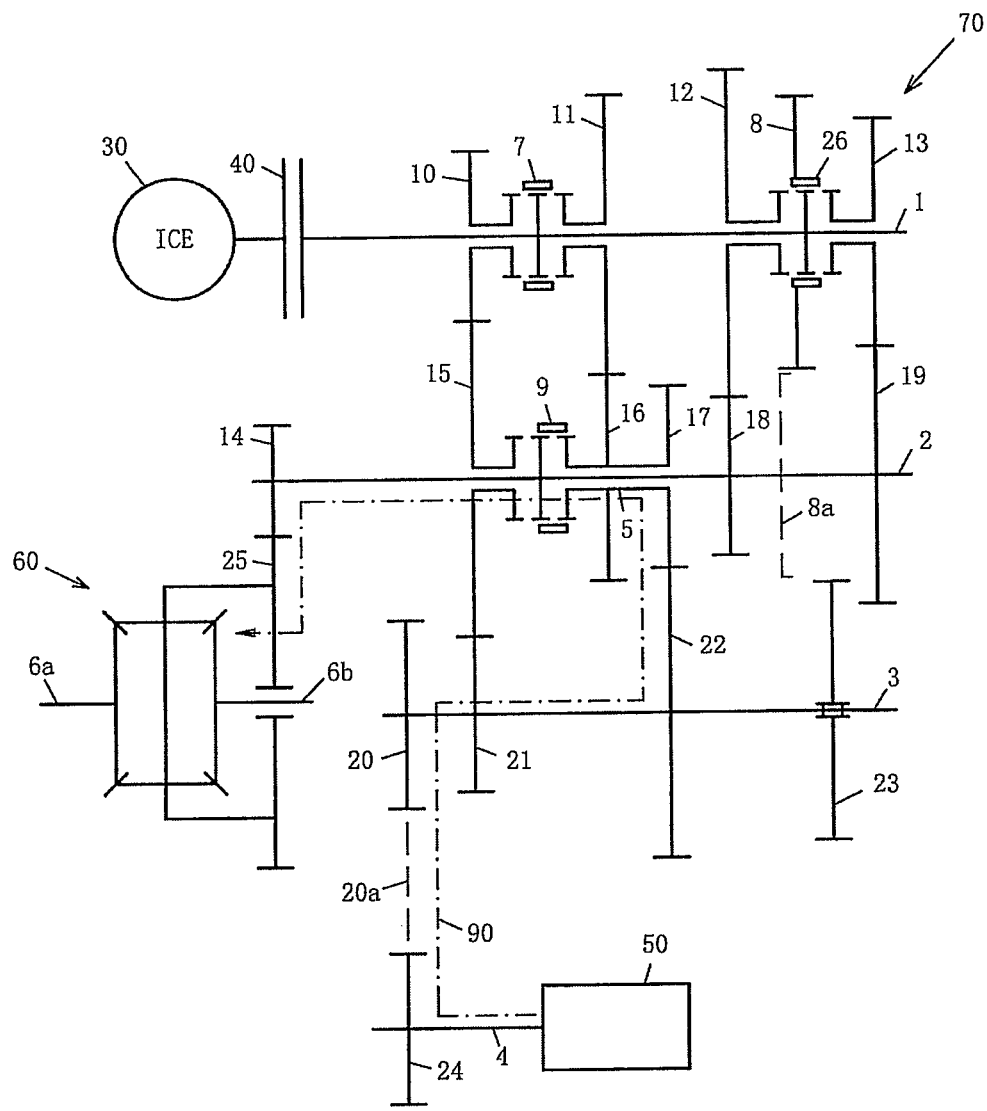

FIG. 13 shows a power transmission path 90 that the HPDS 110 and the transmission 70 can provide for a fourth forward speed ratio while operating in the PMDM. The power transmission path 90 can be achieved when: (i) the synchronizer 7 is in its neutral position; (ii) the synchronizer 26 is in its neutral position; and (iii) the synchronizer 9 engages the driven gearwheel 16. Furthermore, the clutch 40 can be disengaged such that the ICE 30 is not coupled with the input shaft 1, or the ICE 30 does not output power. For the fourth forward speed ratio in the PMDM, the power output from the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. The power transmitted to the final driven gearwheel 25 is then transmitted through the differential half-axles 6a and 6b.

Accordingly, in the example embodiments, the transmission control system 120 achieves six forward speed ratios and one reverse speed ratio of the ICE 30 as well as four forward speed ratios of the EM 50 by controlling the left and right positions of the synchronizers 7, 9, 26. For the transmission paths 80-90 described above, TABLE 2 summarizes the respective relationship between the speed ratios of the ICE 30 and the EM 50 and the synchronizers 7, 9, 26. The marks ("X") indicate the positions occupied by the synchronizers 7, 9, 26.

TABLE 2

| | | Synchronizer | | | | | | | |
|---|---|---|---|---|---|---|---|---|---|
| | | 7 | | | 26 | | | 9 | |
| | | left | neutral | right | left | neutral | right | left | neutral | right |
| ICE1 | Path 80 | | | X | | X | | | X | |
| ICE2 | 81 | X | | | | X | | | X | |
| ICE3 | 82 | | X | | | | X | | | X |
| ICE4 | 83 | | | X | | X | | | | X |
| ICE5 | 84 | | X | | X | | | | | X |

TABLE 2-continued

| | | Synchronizer | | | | | | | |
|---|---|---|---|---|---|---|---|---|---|
| | | 7 | | | 26 | | | 9 | |
| | | left | neutral | right | left | neutral | right | left | neutral | right |
| ICE6 | 85 | X | | | | X | | | | X |
| ICEr | 86 | | X | | | X | | X | | |
| EM1 | 87 | | X | | | X | | X | | |
| EM2 | 88 | X | | | | | X | | X | |
| EM3 | 89 | | | X | | | X | | X | |
| EM4 | 90 | X | | | | X | | | | X |

C. Power Transmission Paths—Hybrid Driving Mode (HDM)

Figure 24A:
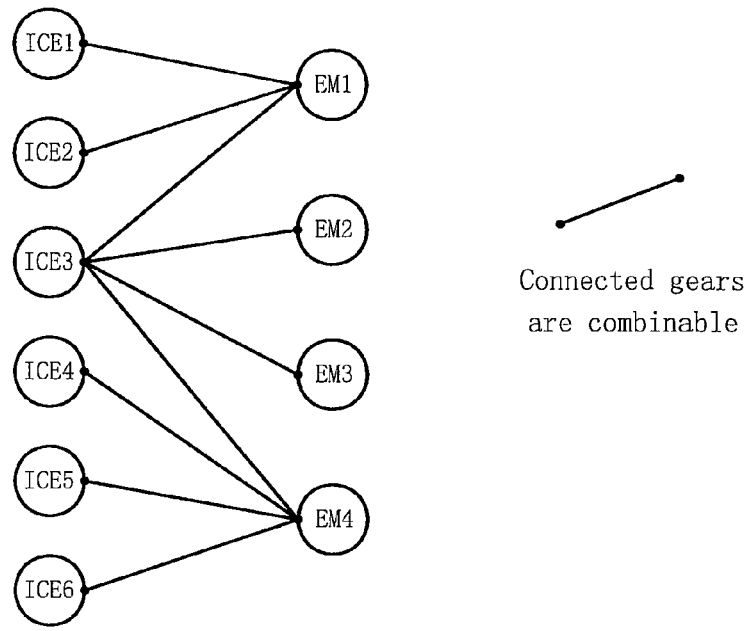
FIGS. 24a, b illustrate possible speed ratio combinations for the HPDS of FIG. 1 when operating in HDM.

In the example embodiments, the transmission 70 can be switched between the PMDM and a hybrid driving mode (HDM) by starting the ICE 30 as described below. The HDM combines the speed ratios provided individually by the ICE 30 (transmission paths 80-86) and EM 50 (transmission paths 87-90). FIG. 24a illustrates possible speed ratio combinations for the HDM. In FIG. 24a, the six forward speed ratios on the left side correspond to the ICE 30, while the four forward speed ratios on the right side correspond to the EM 50. The lines indicate the possible combinations between the speed ratios of the ICE 30 and the speed ratios of the EM 50. For example, the first speed ratio (ICE1) or the second speed ratio (ICE2) for the ICE 30 is combined with the first speed ratio (EM1) for the EM 50. The fourth speed ratio (ICE4), the fifth speed ratio (ICE5), or the sixth speed ratio (ICE5) for the ICE 30 is combined with the fourth speed ratio (EM4) for the EM 50. When the third speed ratio (ICE3) is set for the ICE 30, the second speed ratio (EM2) or the third speed ratio (EM3) can be temporarily set for the EM 50 before the first speed ratio (EM1) or the fourth speed ratio (EM4) is set for the EM 50 based on further gear shift for the ICE 30. In other words, gear shifts from ICE3 to ICE4 involve corresponding shifts from EM1 to EM4, while gear shifts from ICE3 to ICE2 involve include corresponding shifts from EM4 to EM1.

Figure 24B:
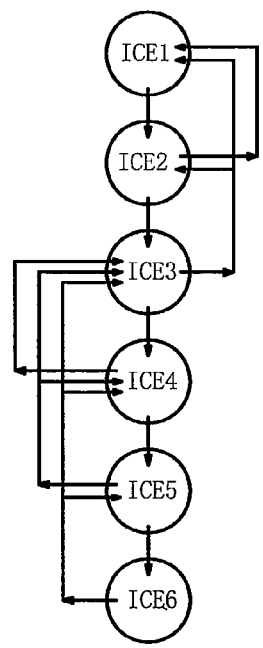

Correspondingly, FIG. 24b illustrates example gear shifts for the ICE 30. As shown in FIG. 24b, the ICE 30 can be upshifted in sequence from: (i) ICE1 to ICE2, (ii) ICE2 to ICE3, (iii) ICE3 to ICE4, (iv) ICE4 to ICE5, or (v) ICE5 to ICE6. The gear shifts can include any portion of this upshift sequence. Furthermore, the ICE 30 can be downshifted (including jumps) from: (i) ICE6 to ICE5, ICE4, or ICE3, (ii) ICE5 to ICE4 or ICE3, (iii) ICE4 to ICE3, (iv) ICE3 to ICE2 or ICE1, or (v) ICE2 to ICE1. The gear shifts shown in FIG. 24b occur with the corresponding speed ratios for the EM 50 shown in FIG. 24a.

Further descriptions of the HDM combinations follow. To achieve the desired HDM combination, the transmission coordinating module 152 determines whether the clutch 40 is in the desired state and whether the synchronizers 7, 9, 26 are in the desired positions. If necessary, the clutch actuation module 142 receives the command to move the clutch 40 into the desired state, and/or the gear shifting actuation module 132 receives the command(s) to move the synchronizers 7, 9, 26 into the desired positions.

1. HDM—First Forward Speed Ratio (ICE1-EM1)

Figure 14:
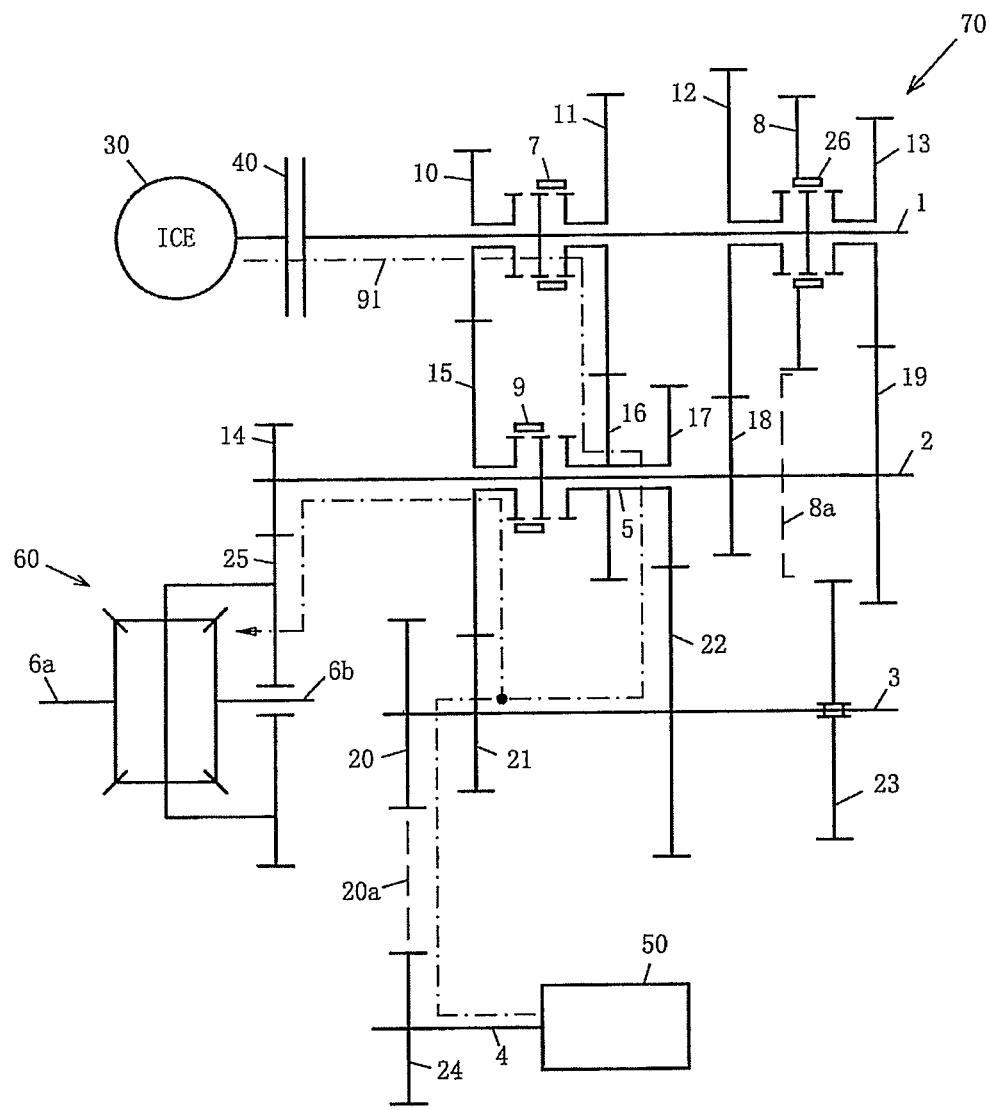
FIGS. 14-23 illustrate example power transmission paths for the HPDS of FIG. 1 when operating in hybrid driving mode (HDM).

FIG. 14 shows a power transmission path 91 that the HPDS 110 and the transmission 70 can provide for a first forward speed ratio while operating in the HDM. The power transmission path 91 can be achieved when: (i) the clutch 40 is in an engaged state to couple the ICE 30 to the input shaft 1; (ii) the synchronizer 7 engages the driving gearwheel 11; (iii) the synchronizer 26 is in its neutral position; and (iv) the synchronizer 9 engages the driven gearwheel 15. For the first forward speed ratio in the HDM, the power output from the ICE 30 is transmitted in sequence through the driving gearwheel 11 on the input shaft 1, the driven gearwheel 16 on the output shaft 2, the driven gearwheel 17 on the intermediate shaft 5, the driven gearwheel 22 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4 via the motor drive 20a, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Stated another way, for the first forward speed ratio in the HDM, the power transmission path for power from the ICE 30 follows the power transmission path 80 and the power from the EM 50 follows the power transmission path 87. The power transmitted to the final driven gearwheel 25 from the ICE 30 and the EM 50 is then transmitted through the differential half-axles 6a and 6b.

2. HDM—Second Forward Speed Ratio (ICE2-EM1)

Figure 15:
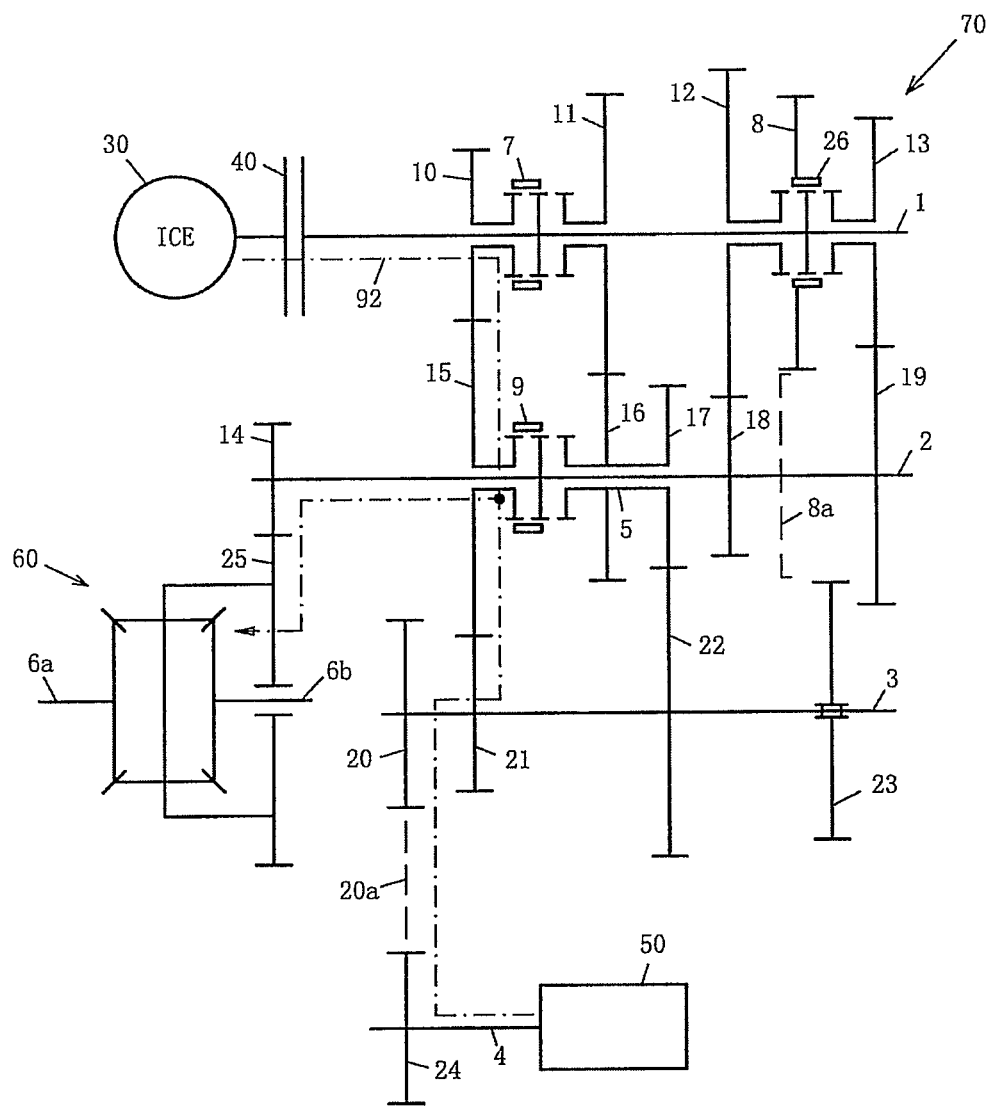

FIG. 15 shows a power transmission path 92 that the HPDS 110 and the transmission 70 can provide for a second forward speed ratio while operating in the HDM. The power transmission path 92 can be achieved when: (i) the clutch 40 is in an engaged state to couple the ICE 30 to the input shaft 1, (ii) the synchronizer 7 engages the driving gearwheel 10; (iii) the synchronizer 26 is in its neutral position; and (iv) the synchronizer 9 engages the driven gearwheel 15. For the second forward speed ratio in the HDM, the power output from the ICE 30 is transmitted in sequence through the driving gearwheel 10 on the input shaft 1, the driven gearwheel 15 on the output shaft 2, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4 via the motor drive 20a, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Stated another way, for the second forward speed ratio in the HDM, the power transmission path for power from the ICE 30 follows the power transmission path 81 and the power from the EM 50 follows the power transmission path 87. The power transmitted to the final driven gearwheel 25 from the ICE 30 and the EM 50 is then transmitted through the differential half-axles 6a and 6b.

3. HDM—First Instance of Third Forward Speed Ratio (ICE3-EM1)

Figure 16:
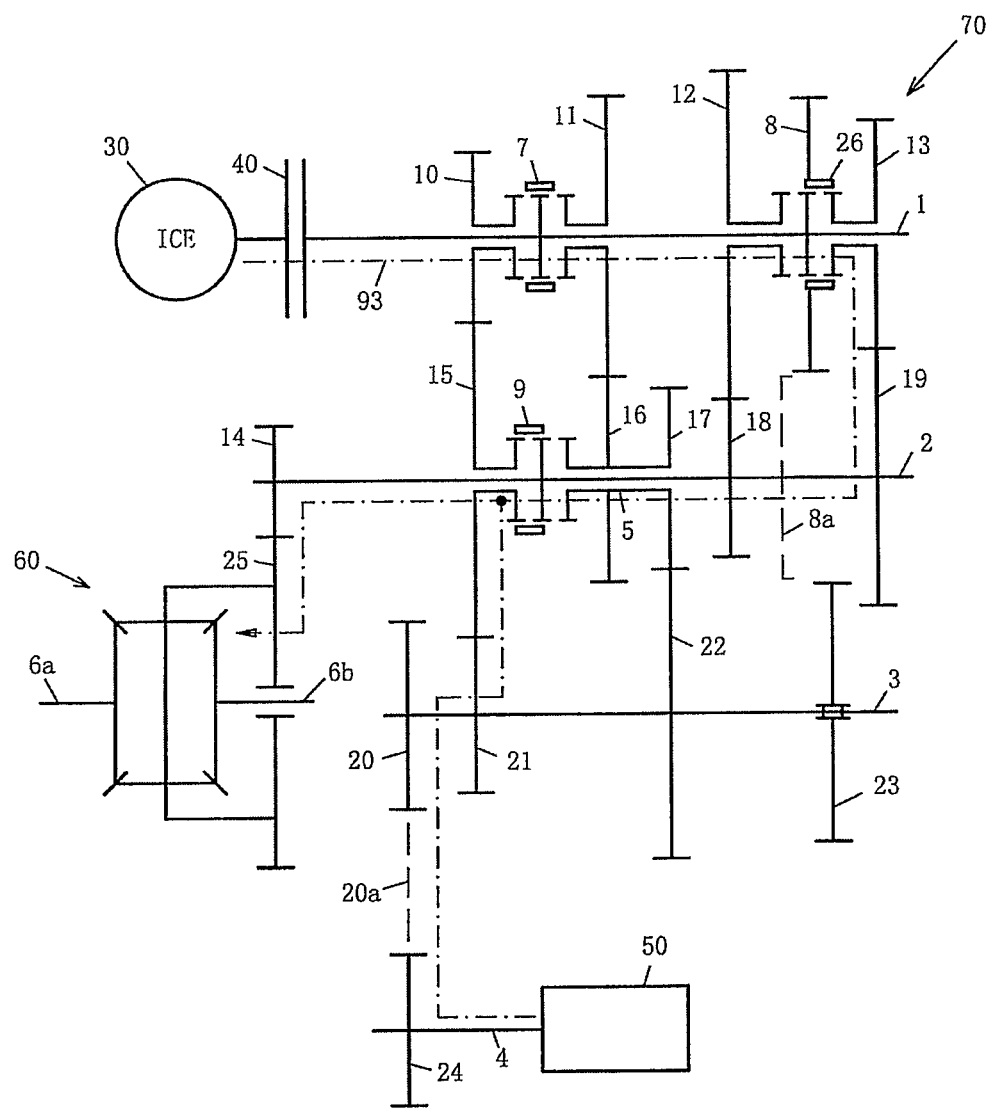

FIG. 16 shows a power transmission path 93 that the HPDS 110 and the transmission 70 can provide for a first instance of a third forward speed ratio while operating in the HDM. The power transmission path 93 can be achieved when: (i) the clutch 40 is in an engaged state to couple the ICE 30 to the input shaft 1; (ii) the synchronizer 7 is in its neutral position; (iii) the synchronizer 26 engages the driving gearwheel 13; and (iv) the synchronizer 9 engages the driven gearwheel 15. For the first instance of the third forward speed ratio in the HDM, the power output from the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output by or from the EM 50 is transmitted in sequence through the driving gearwheel 24 on the motor shaft 4 via the motor drive 20a, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Stated another way, for the first instance of the third forward speed ratio in the HDM, the power transmission path for power from the ICE 30 follows the power transmission path 82 and the power from the EM 50 follows the power transmission path 87. The power transmitted to the final driven gearwheel 25 from the ICE 30 and the EM 50 is then transmitted through the differential half-axles 6a and 6b.

4. HDM—Second Instance of Third Forward Speed Ratio (ICE3-EM2)

Figure 17:
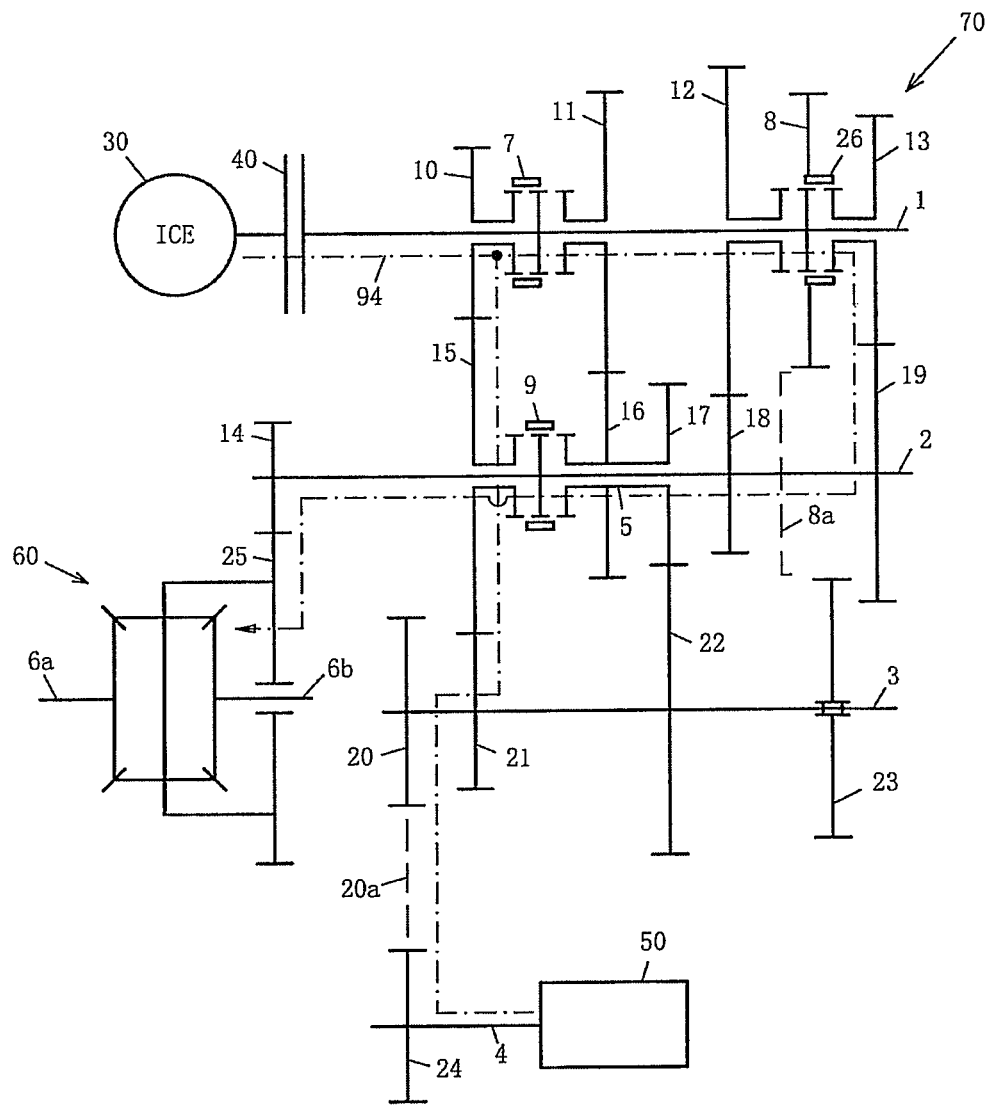

FIG. 17 shows a power transmission path 94 that the HPDS 110 and the transmission 70 can provide for a second instance of a third forward speed ratio while operating in the HDM. The power transmission path 94 can be achieved when: (i) the clutch 40 is in an engaged state to couple the ICE 30 to the input shaft 1; (ii) the synchronizer 7 engages the driving gearwheel 10; (iii) the synchronizer 26 engages the driving gearwheel 13; and (iv) the synchronizer 9 is in its neutral position. For the second instance of the third forward speed ratio in the HDM, the power output from the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4 via the motor drive 20a, the driven gearwheel 20 on the intermediate shaft 3, the driven gearwheel 21 on the intermediate shaft 3, the driven gearwheel 15 on the output shaft 2, the driving gearwheel 10 on the input shaft 1, the driving gearwheel 13 on the input shaft 1, the driven gearwheel 19 on the output shaft 2, the speed-reducing gearwheel 14 on the output shaft 2, and the final driven gearwheel 25 on the differential 60. Stated another way, for the second instance of the third forward speed ratio in the HDM, the power transmission path for power from the ICE 30 follows the power transmission path 82 and the power from the EM 50 follows the power transmission path 88. The power transmitted to the final driven gearwheel 25 from the ICE 30 and the EM 50 is then transmitted through the differential half-axles 6a and 6b.

5. HDM—Third Instance of Third Forward Speed Ratio (ICE3-EM3)

Figure 18:
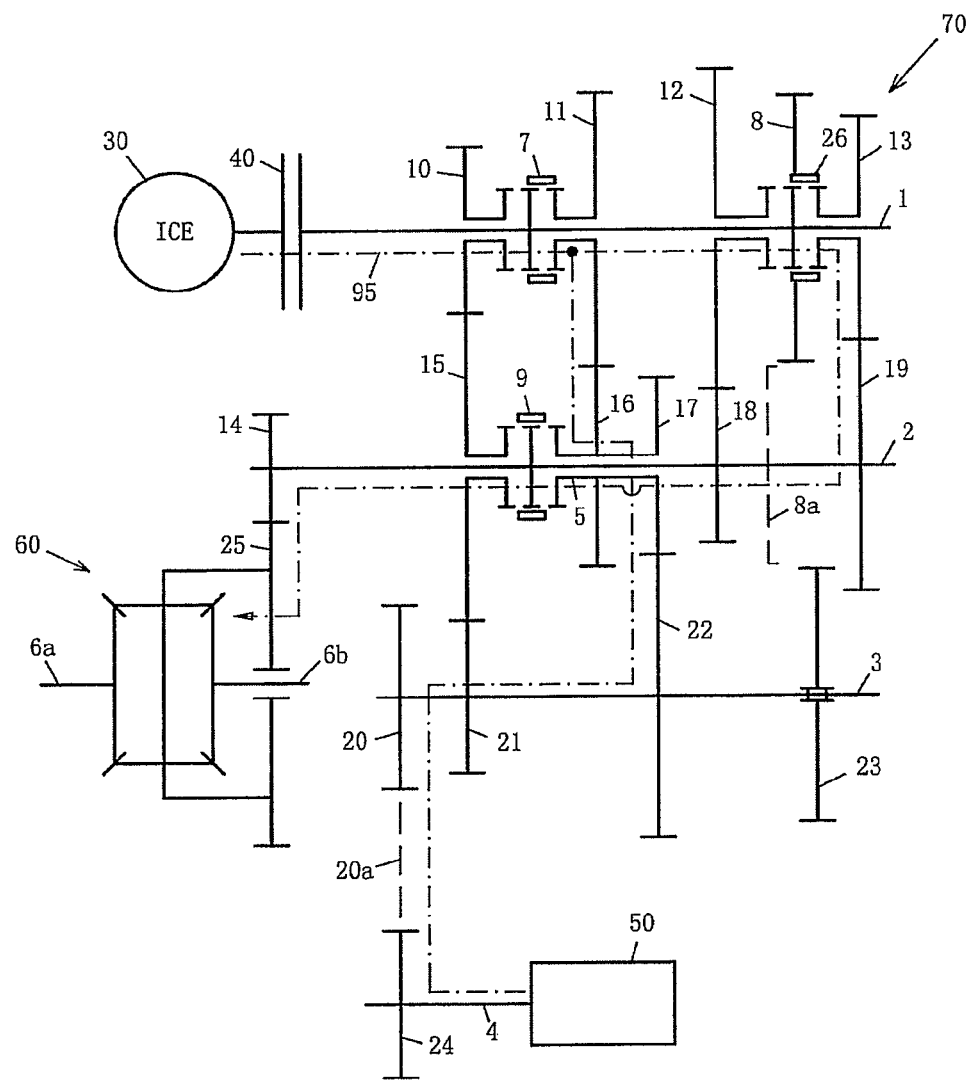

FIG. 18 shows a power transmission path 95 that the HPDS 110 and the transmission 70 can provide for a third instance of a third forward speed ratio while operating in the HDM. The power transmission path 95 can be achieved when: (i) the clutch 40 is in an engaged state to couple the ICE 30 to the input shaft 1; (ii) the synchronizer 7 is engaged with the driving gearwheel 11; (iii) the synchronizer 26 engages the driving gearwheel 13; and (iv) the synchronizer 9 is in its neutral position. For the third instance of the third forward speed ratio in the HDM, the power output from the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4 via the motor drive 20a, the driven gearwheel 20 on the intermediate shaft 3, the driven gearwheel 22 on the intermediate shaft 3, the driven gearwheel 17 and the driven gearwheel 16 on the intermediate shaft 5, the driving gearwheel 11 on the input shaft 1, the driving gearwheel 13 on the input shaft 1, the driven gearwheel 19 on the output shaft 2, the speed-reducing gearwheel 14 on the output shaft 2, and the final driven gearwheel 25 on the differential 60. Stated another way, for the third instance of the third forward speed ratio in the HDM, the power transmission path for power from the ICE 30 follows the power transmission path 82 and the power from the EM 50 follows the power transmission path 89. The power transmitted to the final driven gearwheel 25 from the ICE 30 and the EM 50 is then transmitted through the differential half-axles 6a and 6b.

6. HDM—Fourth Instance of Third Forward Speed Ratio (ICE3-EM4)

Figure 19:
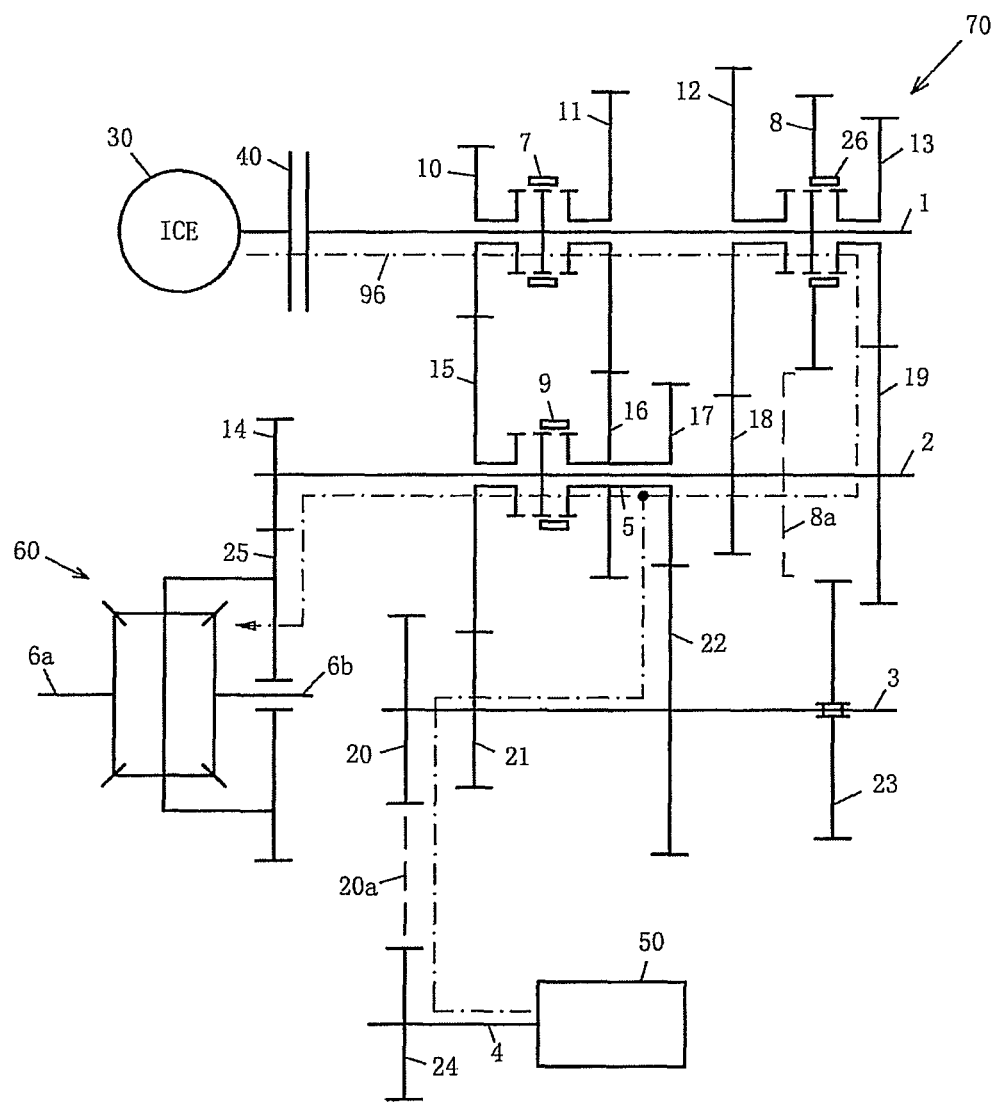

FIG. 19 shows a power transmission path 96 that the HPDS 110 and the transmission 70 can provide for a fourth instance of a third forward speed ratio while operating in the HDM. The power transmission path 96 can be achieved when: (i) the clutch 40 is in an engaged state to couple the ICE 30 to the input shaft 1: (ii) the synchronizer 7 is in its neutral position; (iii) the synchronizer 26 engages the driving gearwheel 13; and (iv) the synchronizer 9 engages the driven gearwheel 16. For the fourth instance of the third forward speed ratio in the HDM, the power output from the ICE 30 is transmitted in sequence through the driving gearwheel 13 on the input shaft 1, the driven gearwheel 19 on the output shaft 2, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4 via the motor drive 20a, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. Stated another way, for the fourth instance of the third forward speed ratio in the HDM, the power transmission path for power from the ICE 30 follows the power transmission path 82 and the power from the EM 50 follows the power transmission path 90. The power transmitted to the final driven gearwheel 25 from the ICE 30 and the EM 50 is then transmitted through the differential half-axles 6a and 6b.

7. HDM—Fourth Forward Speed Ratio (ICE4-EM4)

Figure 20:
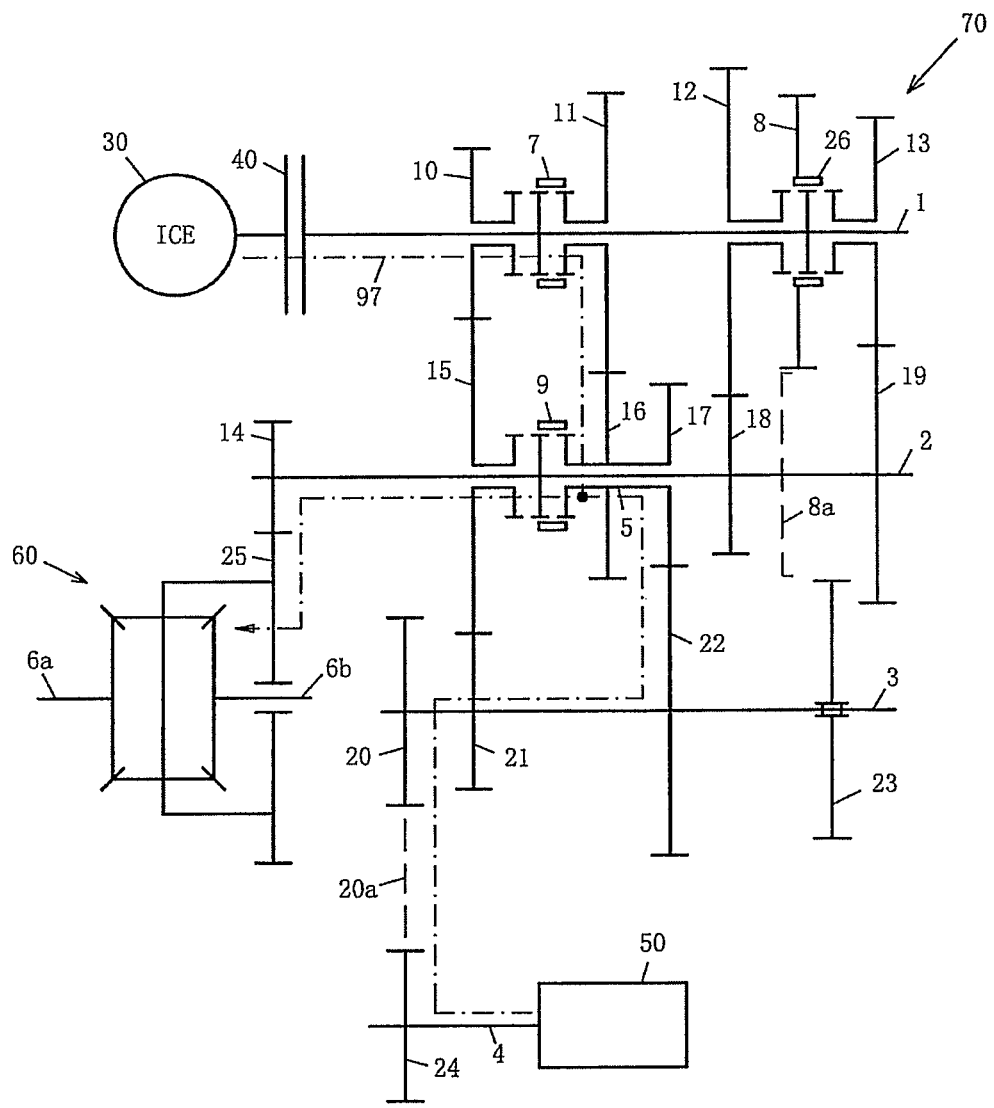

FIG. 20 shows a power transmission path 97 that the HPDS 110 and the transmission 70 can provide for a fourth forward speed ratio while operating in the HDM. The power transmission path 97 can be achieved when: (i) the clutch 40 is in an engaged state to couple the ICE 30 to the input shaft 1; (ii) the synchronizer 7 engages the driving gearwheel 11; (iii) the synchronizer 26 is in its neutral position; and (iv) the synchronizer 9 engages the driven gearwheel 16. For the fourth forward speed ratio in the HDM, the power output from the ICE 30 is transmitted in sequence through the driving gearwheel 11 on the input shaft 1, the driven gearwheel 16 on the intermediate shaft 5, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. Stated another way, for the fourth forward speed ratio in the HDM, the power transmission path for power from the ICE 30 follows the power transmission path 83 and the power from the EM 50 follows the power transmission path 90. The power transmitted to the final driven gearwheel 25 from the ICE 30 and the EM 50 is then transmitted through the differential half-axles 6a and 6b.

8. HDM—Fifth Forward Speed Ratio (ICE5-EM4)

Figure 21:
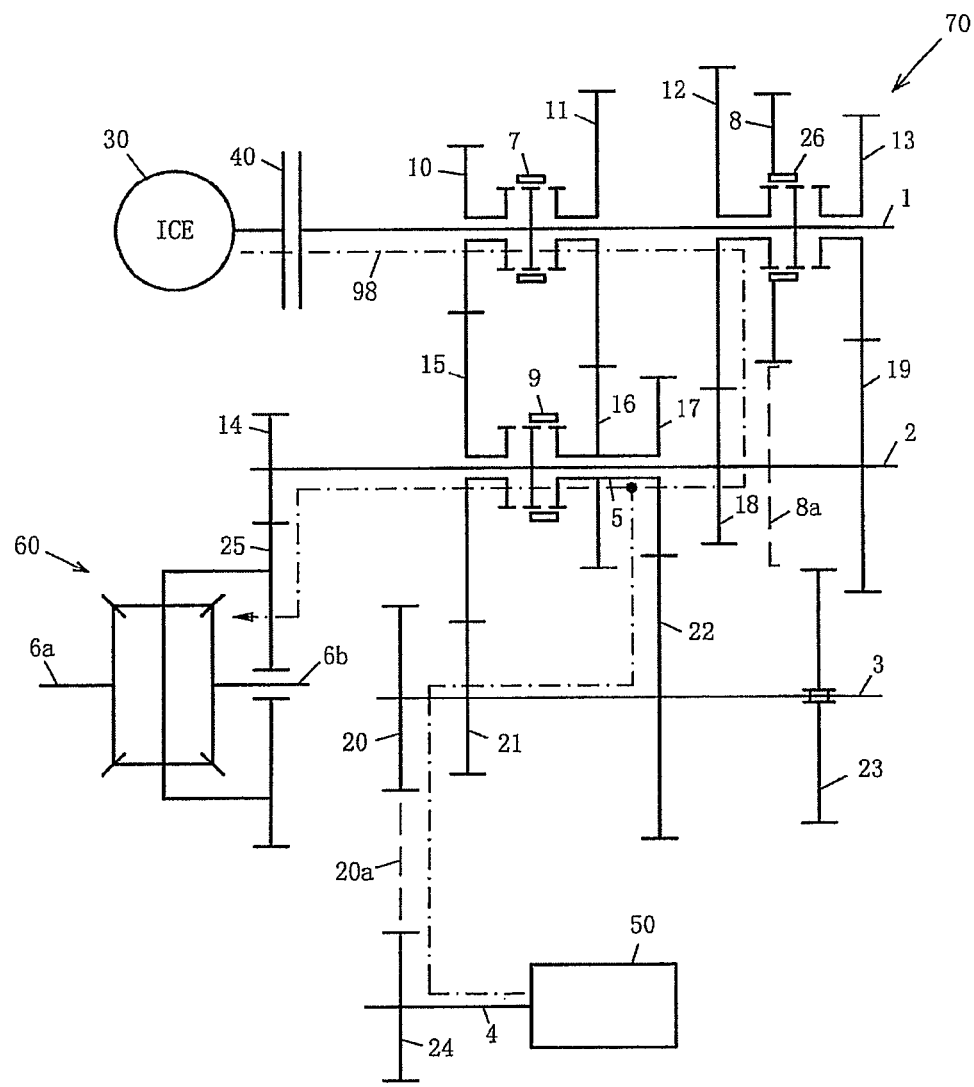

FIG. 21 shows a power transmission path 98 that the HPDS 110 and the transmission 70 can provide for a fifth forward speed ratio while operating in the HDM. The power transmission path 98 can be achieved when: (i) the clutch 40 is in an engaged state to couple the ICE 30 to the input shaft 1; (ii) the synchronizer 7 is in its neutral position; (iii) the synchronizer 26 engages with the driving gearwheel 12, and (iv) the synchronizer 9 is engaged with the driven gearwheel 16. For the fifth forward speed ratio in the HDM, the power output from the ICE 30 is transmitted in sequence through the driving gearwheel 12 on the input shaft 1, the driven gearwheel 18 on the output shaft 2, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. Stated another way, for the fifth forward speed ratio in the HDM, the power transmission path for power from the ICE 30 follows the power transmission path 84 and the power from the EM 50 follows the power transmission path 90. The power transmitted to the final driven gearwheel 25 from the ICE 30 and the EM 50 is then transmitted through the differential half-axles 6a and 6b.

9. HDM—Sixth Forward Speed Ratio (ICE6-EM4)

Figure 22:
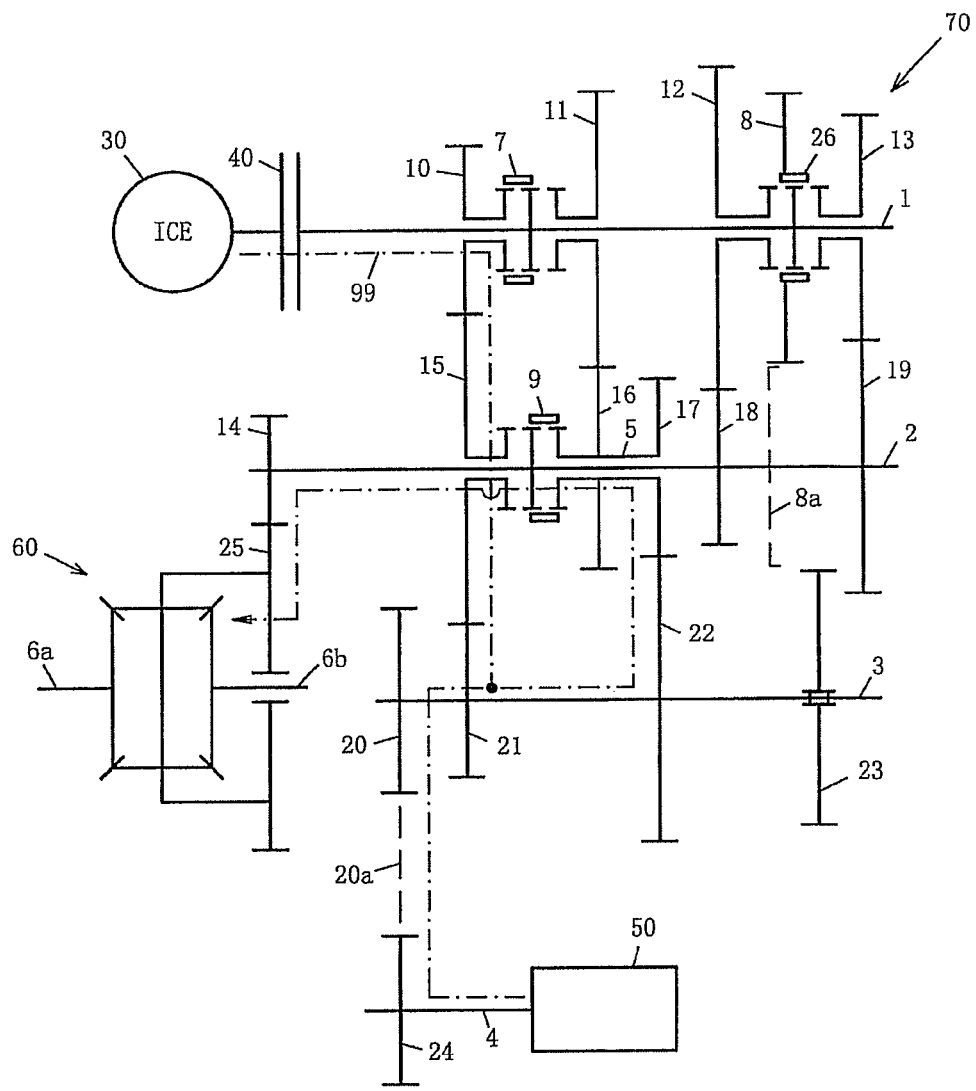

FIG. 22 shows a power transmission path 99 that the HPDS 110 and the transmission 70 can provide for a sixth forward speed ratio while operating in the HDM. The power transmission path 99 can be achieved when: (i) the clutch 40 is in an engaged state to couple the ICE 30 to the input shaft 1; (ii) the synchronizer 7 engages the driving gearwheel 10; (iii) the synchronizer 26 is in its neutral position; and (iv) the synchronizer 9 engages the driven gearwheel 16. For the sixth forward speed ratio in the HDM, the power output from the ICE 30 is transmitted in sequence through the driving gearwheel 10 on the input shaft 1, the driven gearwheel 15 on the output shaft 2, the driven gearwheel 21 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4, the driven gearwheel 20 on the intermediate shaft 3, the driven gearwheel 22 on the intermediate shaft 3, the driven gearwheel 17 on the intermediate shaft 5, the speed-reducing gearwheel 14 on the output shaft 2, and the final driven gearwheel 25 on the differential 60. Stated another way, for the sixth forward speed ratio in the HDM, the power transmission path for power from the ICE 30 follows the power transmission path 85 and the power from the EM 50 follows the power transmission path 90. The power transmitted to the final driven gearwheel 25 from the ICE 30 and the EM 50 is then transmitted through the differential half-axles 6a and 6b.

10. HDM—Reverse Speed Ratio (ICEr-EM1)

Figure 23:
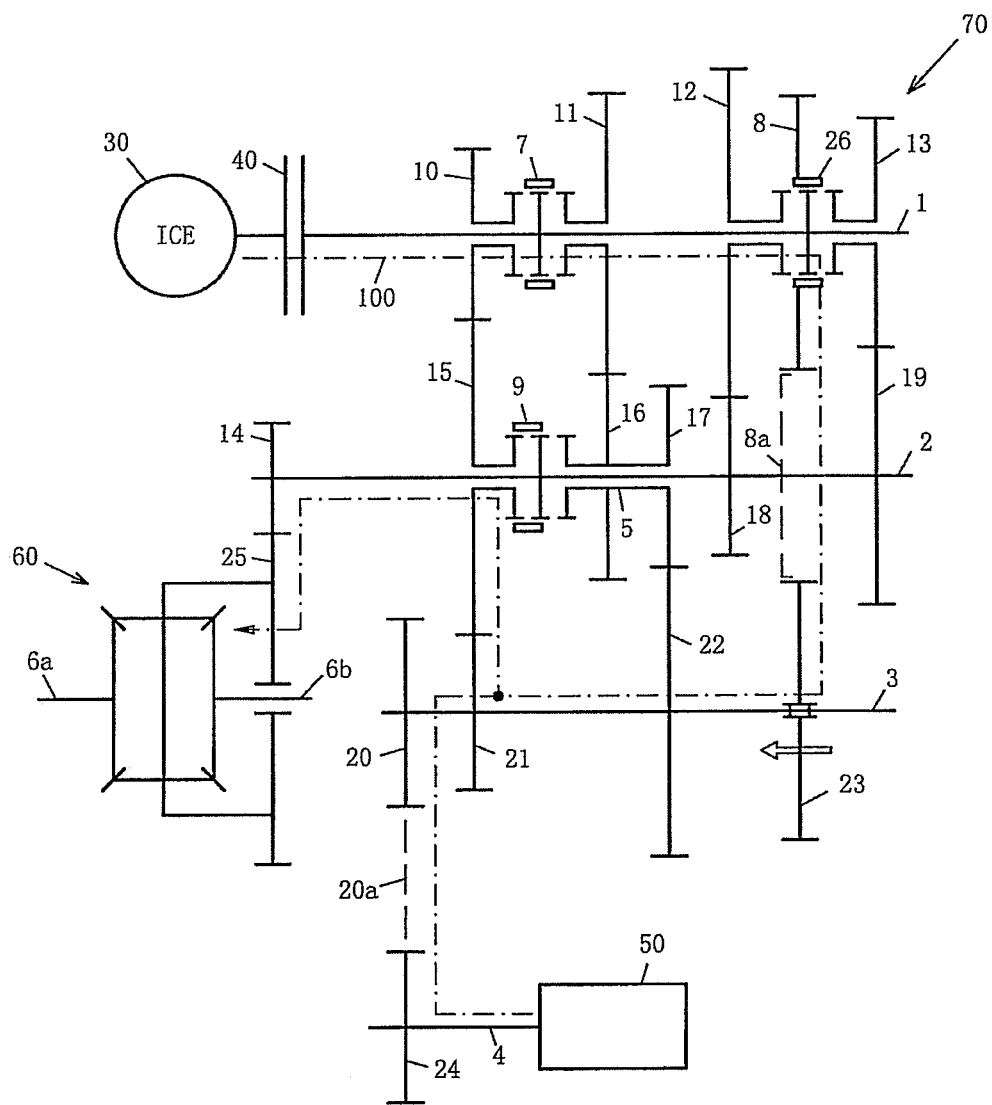

FIG. 23 shows a power transmission path 100 that the HPDS 110 and the transmission 70 can provide for a reverse speed ratio while operating in the HDM. The power transmission path 100 can be achieved when: (i) the clutch 40 is in an engaged state to couple the ICE 30 to the input shaft 1; (ii) the synchronizer 7 is in its neutral position; (iii) the synchronizer 26 is in its neutral position; (iv) the synchronizer 9 engages the driven gearwheel 15; and (v) the driven gearwheel 23 engages the driving gearwheel 8. To achieve the reverse speed ratio in the HDM, the transmission coordinating module 152 determines whether the clutch 40 is in the desired state and whether the synchronizers 7, 9, 26 are in the required positions. If necessary, the clutch actuation module 142 receives the command to move the clutch 40 into the required state, and/or the gear shifting actuation module 132 receives the command(s) to move the synchronizers 7, 9, 26 into the required positions. For this speed ratio, the power output from the ICE 30 is transmitted in sequence through the driving gearwheel 8 on the synchronizer 26, the driven gearwheel 23 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Additionally, the power output from the EM 50 is transmitted in sequence through the driving gearwheel 24 on the motor shaft 4, the driven gearwheel 20 on the intermediate shaft 3, the driven gearwheel 21 on the intermediate shaft 3, the driven gearwheel 15 on the output shaft 2, the speed-reducing gearwheel 14 on the output shaft 2, and the final driven gearwheel 25 on the differential 60. Stated another way, for the reverse speed ratio in the HDM, the power transmission path for power from the ICE 30 follows the power transmission path 86 and the power from the EM 50 follows the power transmission path 87 with the EM 50 turning in a direction opposite the direction the EM turns for the first forward speed ration in the PMDM. The power transmitted to the final driven gearwheel 25 from the ICE 30 and the EM 50 is then transmitted through the differential half-axles 6a and 6b.

For the transmission paths 91-100 described above, TABLE 3 summarizes the respective relationship between the speed ratios of the ICE 30 and the EM 50 and the synchronizers 7, 9, 26 in HDM. The marks ("X") indicate the positions occupied by the synchronizers 7, 9, 26. As described above with reference to FIG. 24b, the gear shifts for the ICE 30 can include upshifts from: (i) ICE1 to ICE2, (ii) ICE2 to ICE3, (iii) ICE3 to ICE4, (iv) ICE4 to ICE5, or (v) ICE5 to ICE6. Furthermore, the gears shifts for the ICE 30 can include downshifts (including jumps) from: (i) ICE6 to ICE5, ICE4, or ICE3, (ii) ICE5 to ICE4 or ICE3, (iii) ICE4 to ICE3, (iv) ICE3 to ICE2 or ICE1, or (v) ICE2 to ICE1. For each gear shift, only one of the synchronizers 7, 9, 26 needs to be repositioned (e.g., to the left or right) to engage another gearwheel, while the other synchronizers remain in the same position or move to their neutral positions.

TABLE 3

| | | | Synchronizer | | | | | | | |
| | | | 7 | | | 26 | | | 9 | | |
| | | | left | neutral | right | left | neutral | right | left | neutral | right |
|---|---|---|---|---|---|---|---|---|---|---|---|
| ICE1 | EM1 | Path 91 | | | X | X | | | X | | |
| ICE2 | EM1 | 92 | X | | | X | | | X | | |
| ICE3 | EM1 | 93 | | X | | | | X | X | | |
| ICE3 | EM2 | 94 | X | | | | | X | | X | |
| ICE3 | EM3 | 95 | | | X | | | X | X | | |
| ICE3 | EM4 | 96 | | X | | | | X | | | X |
| ICE4 | EM4 | 97 | | | X | X | | | | | X |
| ICE5 | EM4 | 98 | | X | | X | | | | | X |
| ICE6 | EM4 | 99 | X | | | | | X | | | X |
| ICEr | EM1 | 100 | | X | | | | X | X | | |

IV. Maintaining Power During Gear Shifting

During gear shifts for one of the power sources (the ICE 30 or the EM 50) in hybrid driving mode (HDM), power output by the transmission 70 can remain uninterrupted if the speed ratio of the other power source remains unchanged. For example, by maintaining its speed ratio, the EM 50 can continue to output power as the gear shifts for the ICE 30 occur. Although the transmission 70 may continue to receive power from one of the power sources, however, there is further need to ensure that the desired level of power can be delivered during gear shifting. Therefore, according to the example embodiments, the transmission control system 120 can actively control aspects of the gear shifting process to maintain sufficient power capacity for the HPDS 110. The gear shifts may include any shift up or down between two HDM speed ratios as described above.

When a gear shift is desired for the ICE 30 in HDM (e.g., a shift from ICE2-EM1 to ICE3-EM1), the engine torque of the ICE 30 is first gradually reduced, e.g., to a level that is just sufficient to match the rotational inertia of the ICE 30. For example, the hybrid power control system 160 may send a signal to the transmission control system 120 requesting the gear shift. In some embodiments, the transmission control system 120 may send a signal to an ICE management system to reduce the engine torque. The motor torque from the EM 50 is increased gradually based on its current speed ratio to compensate for the change in the torque of the output shaft 2, which is caused by the reduction of engine torque from the ICE 30. The transmission control system 120 may send a signal to an EM management system to increase the motor torque.

Figure 25:
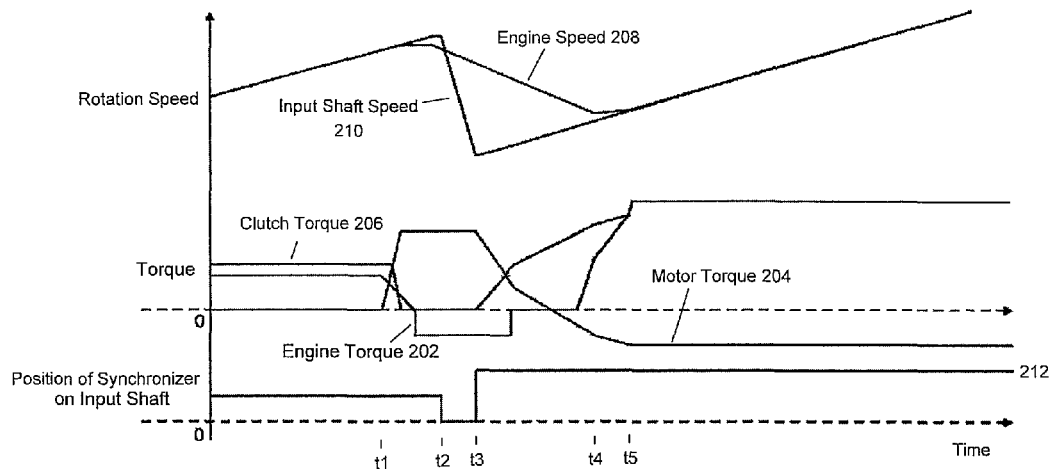
FIG. 25 illustrates a time-based graph for an example gear shifting process in accordance with the example embodiments.

The time-based graph of FIG. 25 illustrates aspects of the gear shifting process for the ICE 30 in HDM. Initially, the engine torque curve 202 for the ICE 30, the motor torque curve 204 for the EM 50, and the clutch torque curve 206 for the clutch 40 remain at constant levels from time=0, before the gear shift is required. During this time, the ICE 30 remains coupled to the input shaft 1, so the engine speed curve 208 corresponds directly to the input shaft speed curve 210. At time=$t_1$, the transmission control system 120 initiates the gear shift process, e.g., in response to information from the hybrid power control system 160. Around this time, the engine torque curve 202 drops gradually and correspondingly the engine speed curve 208 drops when the ICE management system reduces the torque of the ICE 30. To compensate for the changes to the torque received from the ICE 30 by the transmission 70, the motor torque curve 204 rises, e.g., when the motor management system increases the torque of the EM 50.

In some embodiments, additional power may be applied to provide additional torque to achieve the required torque at the output shaft 2. For example, overboost power from the EM 50 may be applied for a short period of peak torque (e.g., 2 seconds) to compensate further for the reduction in engine torque from the ICE 30.

The clutch actuation module 142 of the transmission control system 120 moves the clutch 40 into a disengaged state to decouple the ICE 30 from the input shaft 1. The clutch torque curve 206 and the input shaft speed curve 208 drop when the clutch actuation module 142 disengages the clutch 40. While the clutch remains in the disengaged state and the ICE 30 remains decoupled from the input shaft 1, the fuel supply to the ICE 30 is interrupted (in gear upshifting) or the engine torque of the ICE 30 is increased (in gear downshifting), so that the engine speed approaches the target speed of the input shaft 1. The transmission control system 120 can signal the ICE management system to interrupt the fuel supply or increase the engine torque from the ICE 30. As shown in FIG. 25, the engine speed curve 206 for the ICE 30 begins to change so that it eventually matches the input shaft speed curve 210. At the same time, the gear shifting actuation module 132 of the transmission control system 120 repositions the synchronizer 7 or 26 according to the target speed ratio for the ICE 30, while the synchronizer 9 remains in its current position (i.e., the speed ratio for the EM 50 remains unchanged). As described above, for each gear shift in sequence for the ICE 30, only one of the synchronizers 7 or 26 needs to be repositioned (e.g., to the left or right) to engage another gearwheel. During this stage, the torque required by vehicle continues to be supplied solely by the EM 50. Referring to FIG. 25, the change in the curve 212 representing the synchronizer around time=$t_2$ represents repositioning of the synchronizer to its neutral position and then to engage the required gearwheel (e.g., at the right or left position).

Once the gear shifting actuation module 132 repositions the synchronizer 7 or 26 with the respective movement component 42a or 42b, the clutch actuation module 142 moves the clutch 40 into an engaged state to couple the ICE 30 to the input shaft 1. FIG. 25 illustrates the engine torque curve 202 begins to rise at time=$t_3$ when the clutch 40 begins to engage the ICE 30. The clutch torque of the clutch 40 is controlled by the clutch actuation module 142 and the engine torque of the ICE 30 may be controlled by the ICE management system, so that the engine speed of the ICE 30 further approaches the rotation speed of the input shaft 1. When the difference in speed between the ICE 30 and the input shaft 1 becomes very small, the engine torque of the ICE 30 is further increased gradually to achieve a target torque. This moment is shown at time=$t_4$ in FIG. 25. The transmission control system 120 can signal the ICE management system to increase the engine torque.

As the clutch 40 engages the ICE 40 more fully and the corresponding clutch torque increases, the motor torque of the EM 50 is adjusted based on its current (unchanged) speed ratio and the clutch torque in order to compensate for the effect of the increasing clutch torque on the output shaft 2. The transmission control system 120 may send a signal to the EM management system to decrease the motor torque. As shown in FIG. 25, the motor torque curve 204 drops as the clutch torque curve 206 begins to rise.

When the engine speed of the ICE 30 is synchronized with the shaft speed of the input shaft 1, the engine torque of the ICE 30 reaches the target torque. FIG. 25 shows that at time=$t_5$, the engine speed curve 208 matches the input shaft speed curve 210. In addition, the engine torque curve 202 matches the clutch torque curve 206, while the motor torque curve 204 has now dropped. The ratio of the torque for the ICE 30 to the torque for the EM 50 can be optimized according to energy, efficiency, or other performance considerations for the HPDS 110.

TABLE 4 summarizes an example gear shifting process for the ICE 30, for example, as controlled at least by the transmission control system 120 and executed by different aspects of the vehicle.

TABLE 4

| Step No. | Step | Vehicle or HPDS Component |
| --- | --- | --- |
| 4A | Reduce engine torque gradually to match rotational inertia of ICE 30 | ICE management system |
| 4B | Increase motor torque to compensate for reduced engine torque on output shaft 2 | EM management system |
| 4C | Apply overboost power to provide additional output torque (if requested) | EM management system |
| 4D | Disengage clutch 40 from ICE 30 | Clutch actuation module 142 |
| 4E | Adjust engine speed to meet target speed of input shaft 2 by interrupting engine fuel supply or increasing engine torque | ICE management system |
| 4F | Move synchronizers 7, 26 to provide target speed ratio, i.e., shift gear for ICE 30 | Gear shifting actuation module 132/Gear shifting actuation system 42 |
| 4G | Engage clutch 40 with ICE 30 | Clutch actuation module 142 |
| 4F | Increase engine torque to target torque | ICE management system |
| 4H | Adjust motor torque to account for engine torque on output shaft 2 | EM management system |

As described above, gear shifts from EM1 to EM4 for the EM 50 are required before gear shifts from ICE3 to ICE4 for the ICE 30 can occur. Conversely, gear shifts from EM4 to EM1 for the EM 50 are required before gear shifts from ICE3 to ICE2 can occur. Thus, according to the example embodiments, the transmission control system 120 also controls aspects of the gear shifting process to maintain the desired power capacity during gear shifts for the EM 50.

When the gear shift from ICE3 to ICE4 or from ICE3 to ICE2 is desired, the torque of the EM 50 is adjusted gradually, e.g., at least to a level that is just sufficient to match the rotational inertia of the EM 50. The transmission control system 120 may issue a signal to an EM management system to adjust the motor torque of the EM 50. At the same time, the engine torque of the ICE 30 is adjusted gradually to accommodate the change in the torque at the output shaft 2 resulting from the change in the motor torque. The transmission control system 120 may send a signal to an ICE management system to adjust the engine torque.

In some embodiments, additional turbocharged power may be applied to provide additional torque to maintain the required torque at the output shaft 2. For example, peak turbocharged power may be applied for a short period of time (e.g., 2 seconds) when the engine torque from the ICE 30 may not be sufficient to compensate for the reduction in motor torque from the EM 50.

The gear shifting actuating module 132 moves synchronizer 9 into its neutral position. With the synchronizer 9 in its neutral position, the speed ratios EM2 or EM3 can be temporarily set as described above. As shown in TABLES 2 and 3, when the speed ratio is EM4, the synchronizer 7 is in its neutral position, the synchronizer 26 is set to the right, and the synchronizer 9 is set to the right. When the synchronizer 9 is set to its neutral position, the synchronizer 7 can be set to the right to shift from EM4 to EM3, and then synchronizer 7 can be set to the left to shift from EM3 to EM2 (with synchronizer 26 remaining to the right). On the other hand, when the speed ratio is EM1, the synchronizer 7 is in its neutral position, the synchronizer 26 is set to the right, and the synchronizer 9 is set to the left. When the synchronizer 9 is set to its neutral position, the synchronizer 7 can be set to the left to shift from EM1 to EM2, and then synchronizer 7 can be set to the right to shift from EM2 to EM3 (with synchronizer 26 remaining to the right).

The motor speed of the EM 50 is then controlled to match the eventual speed for the target speed ratio, e.g., EM1 or EM4. The transmission control system 120 may send a signal to an EM management system to adjust the motor speed of the EM 50. The gear shifting actuating module 132 then repositions the synchronizer 9, under zero torque control from the EM 50. As described above, if EM1 is the target speed ratio, the gear shifting actuating module 132 moves the synchronizer 9 to the left to engage the driven gearwheel 15 (with the synchronizer 7 set to its neutral position and the synchronizer 26 remaining to the right). On the other hand, if EM4 is the target speed ratio, the gear shifting actuating module 132 moves the synchronizer 9 to the right to engage the driven gearwheel 16 (with the synchronizer 7 set to its neutral position and the synchronizer 26 remaining to the right). Through this point, the ICE 30 continues to supply the torque required by the vehicle.

After the gear shifting actuating module 132 moves the synchronizer 9 to the desired position, the motor torque of the EM 50 is slowly increased at first, so that the gear shafts in the EM transmission path are pre-tensioned. (In general, such pre-tensioning techniques can be applied to other transmission paths as the transmission 70 initially applies torque to them.) The motor torque is eventually increased to the target torque at a certain speed. In addition, according to the corresponding speed ratio, the engine torque of the ICE 30 is changed gradually to accommodate the change in the torque at the output shaft 2 resulting from the change in the torque of EM 50. Again, the transmission control system 120 may send signals to an EM motor management system and an ICE management system to adjust the torque of the EM 50 and the ICE 30, respectively. Once the gear shift from EM1 to EM4 or from EM4 to EM1 is complete, the gear shift from ICE3 to ICE4 of from ICE3 to ICE2 can be achieved as described above.

TABLE 5 summarizes the gear shifting process for the EM 50, for example, as controlled at least by the transmission control system 120 and executed by different aspects of the vehicle.

TABLE 5

| Step No. | Step | Vehicle or HPDS Component |
| --- | --- | --- |
| 5A | Reduce motor torque gradually to match rotational inertia of EM 50 | EM management system |
| 5B | Increase engine torque to compensate for reduced motor torque on output shaft 2 | ICE management system |
| 5C | Apply turbocharged power to provide additional output torque (if requested) | Turbo management system |
| 5D | Move synchronizer 9 into its neutral position | Gear shifting actuation module 132/Gear shifting actuation system 42 |
| 5E | Adjust motor speed to meet speed of target speed ratio | EM management system |
| 5F | Move synchronizer 9 to provide target speed ratio, i.e., shift gear for EM 50 | Gear shifting actuation module 132/Gear shifting actuation system 42 |
| 5H | Increase motor torque to target torque | EM management system |
| 5I | Adjust engine torque to account for engine torque on output shaft 2 | ICE management system |

V. Engine Start During PMDM

In the example embodiments, the transmission 70 can be switched between the pure motor driving mode (PMDM) and the hybrid driving mode (HDM), where the speed ratios provided by the ICE 30 and EM 50 are combined. To achieve the switch to HDM, the ICE 30 can be started when the vehicle is running in PMDM. Once the ICE 30 is started as described further below, the transmission 70 receives power from both the ICE 30 and the EM 50 to provide the HDM. The transmission control system 120 controls aspects of starting the ICE 30 during PMDM to switch to HDM.

Figure 26:
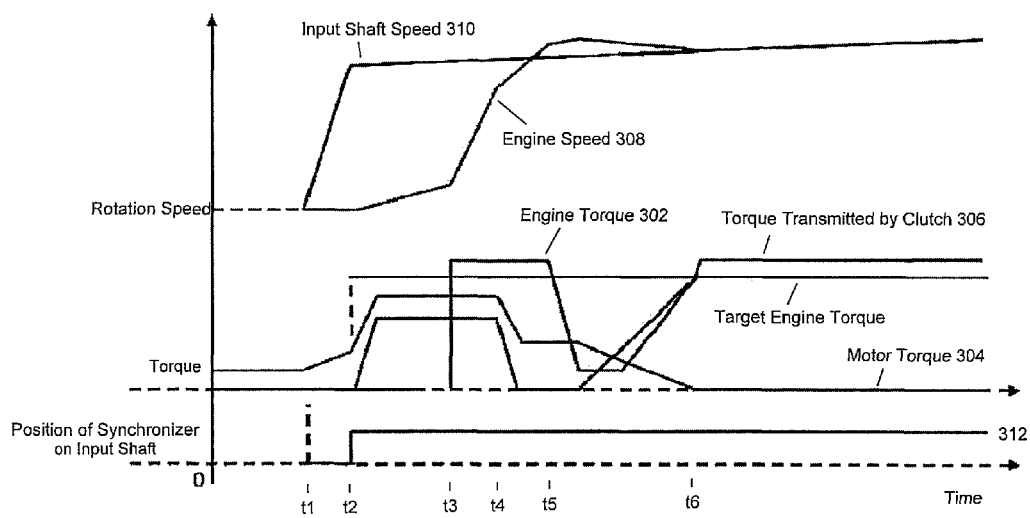
FIG. 26 illustrates a time-based graph for an example process for starting an internal combustion engine (ICE) during PMDM to switch to HDM, in accordance with the example embodiments.

Initially, the HPDS 110 operates in PMDM. The time-based graph of FIG. 26 illustrates aspects of starting the ICE 30 during PMDM. As shown in FIG. 26, from time=0, the motor torque curve 304 indicates that only the EM 50 provides the torque for the vehicle during PMDM.

When the hybrid power control system 160, for example, determines that a switch from PMDM to HDM is desired, the clutch actuation module 142 first ensures that the clutch 40 is in the disengaged state. The gear switching actuation module 132 then moves the synchronizer 7 or 26 to the target position according to the target speed ratio for the ICE 30. For example, the hybrid power control system 160 may also provide instructions to the transmission control system 120 indicating what speed ratio is desired when the ICE 30 starts. Referring to FIG. 26, the curve 312 represents the synchronizer 7 or 26, and at time=$t_1$, the curve 312 represents repositioning of the synchronizer 7 or 26 to its neutral position and then into engagement with required gearwheel (e.g., at the right or left position).

When the synchronizers 7, 26 are moved into the desired positions, the clutch actuation module 132 of the transmission control system 120 moves the clutch 40 into engagement with the ICE 30. The clutch actuation module 132 controls the clutch torque of the clutch 40 by moving the clutch 40 into varying states of engagement with the ICE 30, e.g., partial engagement. In particular, the clutch torque applied to the ICE 30 drives the ICE 30 to reach the lowest possible speed that allows fuel injection and ignition to occur. As shown in FIG. 26, the clutch torque curve 306 begins to rise at time=$t_2$, and the engine speed curve 308 for the ICE 30 correspondingly increases. Here, the power from the EM 50 provides power to the clutch 40, which then applies the corresponding clutch torque to the ICE 30. At the same time, according to the speed ratio of the EM 50 and the clutch torque, the EM 50 compensates for the change in torque for the output shaft 2 resulting from the action of the clutch 40.

When the ICE 30 reaches the required speed to allow fuel injection and ignition, the fuel injection and ignition is initiated, and thus the ICE 30 starts to rotate by itself and the engine speed is increased. The engine management system, for example, may control the fuel injection and ignition for the ICE 30 to generate power from the ICE 30. At time=$t_3$ when the ICE 30 starts, FIG. 26 shows that engine torque curve 302 increases above zero and the engine speed curve 308 increases in rate. The clutch actuation module 132 then moves the clutch to a nearly disengaged state with the ICE 30, thereby reducing the torque applied by the clutch 40. As shown in FIG. 26, this moment occurs at time=$t_4$ when the clutch torque curve 306 drops. According to the speed ratio of the EM 50 and the clutch torque, the EM 50 continues to compensate for the change in torque for the output shaft 2 resulting from the action of the clutch 40.

After the ICE 30 is successfully started, the torque from the ICE 30 is increased so that the speed of the ICE 30 approaches and then becomes higher than the speed of the input shaft 1. As shown in FIG. 26, the engine speed curve 308 increases beyond the input shaft speed curve 310 at time=$t_5$ after the engine torque curve 302 is increased at time=$t_3$. When the speed of the ICE 30 is higher than the speed of the input shaft 1, the clutch actuation module 142 moves the clutch 40 into a fully engaged state with the ICE 30, so that the torque from the ICE 30 is fully applied to the transmission 70. As shown in FIG. 26, the clutch torque curve 306 increases at time=$t_6$ when it engages the ICE 30. According to the speed ratio of the EM 50 and the clutch torque, the EM 50 continues to compensate for the change in torque for the output shaft 2 resulting from the action of the clutch 40. With the power from ICE 30 now delivered to the transmission 70, the HPDS 110 has completed its switch from PMDM to HDM. As FIG. 26 also shows, the engine torque curve 302 and the motor torque curve 306 represent the power contributed by the ICE 30 to the HPDS 110.

TABLE 6 summarizes the process to start the ICE 30 during PMDM, for example, as controlled at least by the transmission control system 120 and executed by different aspects of the vehicle.

TABLE 6

| Step No. | Step | Vehicle or HPDS Component |
|---|---|---|
| 6A | Ensure clutch 40 is disengaged from ICE 30 | Clutch actuation module 142 |
| 6B | Move synchronizer 7, 26 to provide target speed ratio for ICE 30, i.e., shift gear for ICE 30 | Gear shifting actuation module 132/Gear shifting actuation system 42 |
| 6C | Engage clutch 40 with ICE 30, applying clutch torque to ICE 30 to allow ICE 30 to reach sufficient speed for fuel injection and ignition | Clutch actuation module 142 |
| 6D | Adjust motor torque to account for action of clutch 40 on ICE 30 | EM management system |
| 6E | Initiate fuel injection and ignition to generate torque from ICE 30 | ICE management system |
| 6F | Disengage the clutch 40 from ICE 30 | Clutch actuation module 142 |
| 6G | Increase engine torque to increase engine speed beyond input shaft speed | ICE management system |

TABLE 6-continued

| Step No. | Step | Vehicle or HPDS Component |
|---|---|---|
| 6H | Engage clutch 40 fully with ICE 30 to transfer engine torque to input shaft 1 | Clutch actuation module 142 |
| 6I | Adjust motor torque to account for engine torque on output shaft 2 | EM management system |

VI. Engine Start During Parked State

The transmission control system 120 can also control aspects of starting the ICE 30 when the vehicle is in a parked state in order to provide a battery charging mode for the EM 50, for example. First, if the clutch 40 is in an engaged state, the clutch actuation system 40 disengages the clutch 40 from the ICE 30. In addition, if the EM 50 is running, the motor speed is adjusted to 0 RPM. Furthermore, if the synchronizer 9 is engaged with a gearwheel, the gear shifting actuation module 132 moves the synchronizer 9 into its neutral position. The gear shifting actuation module 132 then moves synchronizer 7 to engage the driving gearwheel 10 or 11 to achieve a desired speed ratio for the ICE 30. During operation of the vehicle, the operator typically places the gear shifter in at least the following positions: park, reverse, neutral, drive, or low gear. The gear shifting actuation module 132 can move the synchronizer 7 according to the gear shifter position. If the gear shifter is in a non-drive position (e.g., park, reverse, neutral), the gear shifting actuation module 132 can move the synchronizer 7 to engage gearwheel 10, as the resulting speed ratio allows the EM 50 to rotate faster than the ICE 30 and provide greater efficiency. If, however, the shifter is in the drive position (e.g., drive, low), the gear shifting actuation module 132 can move the synchronizer 7 to engage the gearwheel 11 to allow the vehicle to shift into the first speed ratio more easily for eventual vehicle launch. No further movement of the synchronizer 7 is necessary to achieve the first speed ratio if the synchronizer 7 already engages the gearwheel 11.

Once the synchronizer 7 is engaged with a gearwheel, the clutch actuation module 142 moves the clutch into an engaged state to couple the transmission 70 to the ICE 30. In other words, the clutch actuation module 142 allows the transmission 70 to now apply a clutch torque to the ICE 30. The motor management system controls the EM 50 to provide power to the clutch 40, which then applies the corresponding clutch torque to the ICE 30. The clutch torque causes the ICE 30 to rotate. When the engine speed reaches a speed that allows fuel injection and ignition to occur, the engine management system initiates fuel injection and ignition for the ICE 30. Once the ICE 30 is running, control of the ICE 30 and the EM 50 is returned to the hybrid power control system 160 or other control system.

TABLE 7 summarizes the process to start the ICE 30 while the vehicle is in a parked state, for example, as controlled at least by the transmission control system 120 and executed by different aspects of the vehicle.

TABLE 7

| Step No. | Step | Vehicle or HPDS Component |
|---|---|---|
| 7A | Ensure clutch 40 is disengaged from ICE 30 | Clutch actuation module 142 |

TABLE 7-continued

| Step No. | Step | Vehicle or HPDS Component |
|---|---|---|
| 7B | Adjust motor speed to 0 RPM | EM management system |
| 7C | Move synchronizer 9 into neutral position | Gear shifting actuation module 132/Gear shifting actuation system 42 |
| 7D | Move synchronizer 7 to engage gearwheel 10 or 11 for desired speed ratio | Gear shifting actuation module 132/Gear shifting actuation system 42 |
| 7E | Engage the clutch with the ICE 30 to apply clutch torque to ICE 30 to reach sufficient speed for fuel injection and ignition | Clutch actuation module 142 |
| 7F | Generate power from EM 50 to provide clutch torque | EM management system |
| 7G | Initiate fuel injection and ignition to run ICE 30 | ICE management system |

VII. Additional Example Embodiments

The following examples set out further or alternative aspects of the disclosure. Any reference characters (e.g., numbers or letters) to items in the Figures are for ease of reference only and are not limiting on the scope of the other examples described herein.

Example 1

A hybrid-power driving system comprising:
a transmission (70), including:
a plurality of shafts, including an input shaft (1), a motor shaft (4), and an output shaft (2), wherein:
  (i) the input shaft (1) is coupled to a clutch (40), the clutch (40) being configured to selectively engage an engine (30) to couple the input shaft (1) to the engine (30), the engine (30) being configured to generate an engine torque transferrable to the input shaft (1) via the clutch (40),
  (ii) the motor shaft (4) is coupled to an electric motor (50), the electric motor (50) being configured to generate a motor torque transferrable to the motor shaft (4), and
  (iii) the output shaft (2) delivers an output torque from the transmission (70);
a plurality of gearwheels configured to provide a plurality of combinations of an engine torque transmission path and a motor torque transmission path, one of the combinations being active and including an active engine torque transmission path to transfer the engine torque from the input shaft (1) to the output shaft (2) for the output torque and an active motor torque transmission path to transfer the motor torque from the motor shaft (4) to the output shaft (2) for the output torque; and
a plurality of synchronizers (7, 9, 26) disposed on the plurality of shafts (1, 2) and operable to engage a first set of selected gearwheels, wherein for the first set of selected gearwheels, the active engine torque transmission path is a first engine torque transmission path and the active motor torque transmission path is a first motor torque transmission path; and
a transmission control system (120) including:
a clutch actuation module (142) configured to control the clutch (40); and
a gear shifting actuation module (132) configured to move at least one of the plurality of synchronizers (7, 9, 26) to cause the plurality of synchronizers (7, 9, 26) to engage a second set of selected gearwheels instead of the first set of selected gearwheels, wherein by engaging the second set of selected gearwheels, either:
  (i) the active engine torque transmission path is modified to a second engine torque transmission path, and the active motor torque transmission path remains unmodified, or
  (ii) the active engine torque transmission path remains unmodified, and the active motor torque transmission path is modified to a second motor torque transmission path.

Example 2

The hybrid-power driving system of EXAMPLE 1, wherein the transmission control system (120) causes the electric motor (50) to increase the motor torque to compensate for any loss of engine torque at the output shaft (2) when the active engine torque transmission path is modified to the second engine torque transmission path.

Example 3

The hybrid-power driving system of EXAMPLE 1, wherein the transmission control system (120) causes the engine (30) to increase the engine torque to compensate for any loss of motor torque at the output shaft (2) when the active motor torque transmission path is modified to the second motor torque transmission path.

Example 4

The hybrid-power driving system of EXAMPLE 1, wherein before the active engine torque transmission path is modified to the second engine torque transmission path:
  (i) the transmission control system (120) causes the engine torque to be reduced;
  (ii) the transmission control system (120) causes the motor torque to be increased in response to the reduction in the engine torque;
  (iii) the clutch actuation module (142) disengages the clutch (40) from the engine (30); and
  (iv) the transmission control system (120) causes an engine speed of the engine (30) to meet an input shaft speed of the input shaft (1); and
after the active engine torque transmission path is modified to the second engine torque transmission path:
  (i) the clutch actuation module (142) engages the clutch (40) with the engine (30);
  (ii) the transmission control system (120) causes the engine torque to be increased to a target torque; and
  (iii) the transmission control system (120) causes the motor torque to be adjusted in response to the increase in the engine torque.

Example 5

The hybrid-power driving system of EXAMPLE 4, wherein before the active engine torque transmission path is modified to the second engine torque transmission path, the transmission control system (120) causes overboost power to be added to the output shaft (2) in response to the reduction in the engine torque.

Example 6

The hybrid-power driving system of EXAMPLE 1, wherein before the active motor torque transmission path is modified to the second motor torque transmission path:

(i) the transmission control system (120) causes the motor torque to be reduced;

(ii) the transmission control system (120) causes the engine torque to be increased in response to the reduction in the motor torque;

(iii) the transmission control system (120) causes a motor speed of the electric motor (50) to meet a speed associated with the active motor torque transmission path; and after the active motor torque transmission path is modified to the second motor torque transmission path:

(i) the transmission control system (120) causes the motor torque to be increased to a target torque; and (ii) the transmission control system (120) causes the engine torque to be adjusted in response to the increase in the motor torque.

Example 7

The hybrid-power driving system of EXAMPLE 6, wherein before the active motor torque transmission path is modified to the second motor torque transmission path, the transmission control system (120) causes turbocharged power to be added to the output shaft (2) in response to the reduction in the motor torque.

Example 8

The hybrid-power driving system of EXAMPLE 1, wherein:

(i) the gear shifting actuation module (132) moves at least one of the plurality of synchronizers (7, 9, 26) to cause the plurality of synchronizers (7, 9, 26) to engage the second set of selected gearwheels instead of the first set of selected gearwheels, and as a result, the active engine torque transmission path is modified to the second engine torque transmission path while the active motor torque transmission path remains unmodified;

(ii) the gear shifting actuation module (132) moves at least one of the plurality of synchronizers (7, 9, 26) to cause the plurality of synchronizers (7, 9, 26) to engage a third set of selected gearwheels instead of the second set of selected gearwheels, and as a result, the active motor torque transmission path is modified to the second motor torque transmission path while the active engine torque transmission path remains unmodified; and (iii) the gear shifting actuation module (132) moves at least one of the plurality of synchronizers (7, 9, 26) to cause the plurality of synchronizers (7, 9, 26) to engage a fourth set of selected gearwheels instead of the third set of selected gearwheels, and as a result, the active engine torque transmission path is modified to a third engine torque transmission path while the active motor torque transmission path remains unmodified.

Example 9

The hybrid-power driving system of any of EXAMPLES 1-8, wherein:

(i) when the active engine torque transmission path is modified to the second engine torque transmission path to provide a first engine speed ratio or a second speed ratio, the active motor torque transmission path provides a first motor speed ratio, (ii) when the active engine torque transmission path is modified to the second engine torque transmission path to provide a fourth engine speed ratio, a fifth engine speed ratio, or a sixth engine speed ratio, the active motor torque transmission path provides a fourth motor speed ratio, (iii) when the active engine torque transmission path is modified to the second engine torque transmission path to provide a third engine speed ratio, the active motor torque transmission path provides the first motor speed ratio or the fourth motor speed ratio, and (iv) when the active motor torque transmission path is modified to the second motor torque transmission path to provide a second motor speed ratio or a third motor speed ratio, the active engine torque transmission path provides the third engine speed ratio.

Example 10

The hybrid-power driving system of any of EXAMPLES 1-9, wherein the transmission (70) includes at least one of the engine (30) or the electric motor (50).

Example 11

The hybrid-power driving system of any of EXAMPLES 1-10, wherein the transmission (70) includes a differential (60) coupled to the output shaft (2) to deliver the output torque from the transmission (70).

Example 12

The hybrid-power driving system of any of EXAMPLES 1-11, wherein the transmission (70) includes one or more intermediate shafts (3) to further transfer at least one of the engine torque or the motor torque.

Example 13

A hybrid-power driving system comprising:
a transmission (70), including:
a plurality of shafts, including an input shaft (1), a motor shaft (4), and an output shaft (2), wherein:
(i) the input shaft (1) is coupled to a clutch (40), the clutch (40) being configured to selectively engage an engine (30) to couple the input shaft (1) to the engine (30), the engine (30) being configured to generate an engine torque transferrable to the input shaft (1) via the clutch (40),
(ii) the motor shaft (4) is coupled to an electric motor (50), the electric motor (50) being configured to generate a motor torque transferrable to the motor shaft (4), and
(iii) the output shaft (2) delivers an output torque from the transmission (70);
a plurality of gearwheels configured to provide a plurality of torque transmission paths, one of the torque transmission paths being active to transfer the engine torque and the motor torque to the output shaft (2) to provide the output torque; and
a plurality of synchronizers (7, 9, 26) disposed on the plurality of shafts (1, 2) and operable to engage a first set of selected gearwheels, wherein according to the first set of selected gearwheels, the active torque transmission path is a first torque transmission path; and
a transmission control system (120) including:
a clutch actuation module (142) configured to control the clutch (40); and a gear shifting actuation module (132) configured to move at least one of the plurality of synchronizers (7, 9, 26) to cause the plurality of synchronizers (7, 9, 26) to engage a second set of selected gearwheels instead of the first set of selected gearwheels and to modify the active torque transmission path to a second torque transmission path, wherein either:
  (i) the transmission control system (120) causes the electric motor (50) to increase the motor torque to compensate for any loss of engine torque at the output shaft (2) when the active torque transmission path is modified to the second torque transmission path, or
  (ii) the transmission control system (120) causes the engine (30) to increase the engine torque to compensate for any loss of motor torque at the output shaft (2) when the active torque transmission path is modified to the second torque transmission path.

Example 14

The hybrid-power driving system of EXAMPLE 13, wherein:
  (i) the transmission control system (120) causes the engine torque to be reduced;
  (ii) the clutch actuation module (142) disengages the clutch (40) from the engine (30) resulting in the loss of engine torque at the output shaft (2);
  (iii) with the clutch disengaged, the transmission control system (120) causes an engine speed of the engine (30) to meet an input shaft speed of the input shaft (1) before the active torque transmission path is modified to the second torque transmission path;
  (iv) in response to the active torque transmission path being modified to the second torque transmission path, the clutch actuation module (142) re-engages the clutch (40) with the engine (30);
  (v) with the clutch (40) re-engaged, the transmission control system (120) causes the engine torque to be increased to a target torque; and
  (vi) the transmission control system (120) causes the motor torque to be adjusted in response to the increase in the engine torque.

Example 15

The hybrid-power driving system of EXAMPLE 14, wherein before the active torque transmission path is modified to the second torque transmission path, the transmission control system (120) causes overboost power to be added to the output shaft (2) in response to the reduction in the engine torque.

Example 16

The hybrid-power driving system of EXAMPLE 13, wherein:
  (i) the transmission control system (120) causes the motor torque to be reduced, resulting in the loss of motor torque at the output shaft (2);
  (ii) the transmission control system (120) causes a motor speed of the electric motor (50) to meet a speed associated with the active torque transmission path before the active torque transmission path is modified to the second torque transmission path;
  (iii) in response to the active torque transmission path being modified to the second torque transmission path, the transmission control system (120) causes the motor torque to be increased to a target torque; and
  (iii) the transmission control system (120) causes the engine torque to be adjusted in response to the increase in the motor torque.

Example 17

The hybrid-power driving system of EXAMPLE 16, wherein before the active torque transmission path is modified to the second torque transmission path, the transmission control system (120) causes turbocharged power to be added to the output shaft (2) in response to the reduction in the motor torque.

Example 18

The hybrid-power driving system of any of EXAMPLES 13-17, wherein the transmission (70) includes at least one of the engine (30) or the electric motor (50).

Example 19

The hybrid-power driving system of any of EXAMPLES 13-18, wherein the transmission (70) includes a differential (60) coupled to the output shaft (2) to deliver the output torque from the transmission (70).

Example 20

The hybrid-power driving system of any of EXAMPLES 13-19, wherein the transmission (70) includes one or more intermediate shafts (3) to further transfer at least one of the engine torque or the motor torque.

Example 21

A method for a hybrid-power driving system, the hybrid-power driving system including:
  a transmission (70), including:
    a plurality of shafts, including an input shaft (1), a motor shaft (4), and an output shaft (2), wherein:
      (i) the input shaft (1) is coupled to a clutch (40), the clutch (40) being configured to selectively engage an engine (30) to couple the input shaft (1) to the engine (30), the engine (30) being configured to generate an engine torque transferrable to the input shaft (1) via the clutch (40),
      (ii) the motor shaft (4) is coupled to an electric motor (50), the electric motor (50) being configured to generate a motor torque transferrable to the motor shaft (4), and
      (iii) the output shaft (2) delivers an output torque from the transmission (70);
    a plurality of gearwheels configured to provide a plurality of combinations of an engine torque transmission path and a motor torque transmission path, one of the combinations being active and including an active engine torque transmission path to transfer the engine torque from the input shaft (1) to the output shaft (2) for the output torque and an active motor torque transmission path to transfer the motor torque from the motor shaft (4) to the output shaft (2) for the output torque; and a plurality of synchronizers (7, 9, 26) disposed on the plurality of shafts (1, 2) and operable to engage a first set of selected gearwheels, wherein for the first set of selected gearwheels, the active engine torque transmission path is a first engine torque transmission path and the active motor torque transmission path is a first motor torque transmission path, the method comprising:

determining a desired speed ratio for the engine or the motor;

determining a second set of selected gearwheels corresponding to the desired speed ratio; and moving, via a transmission control system, at least one of the plurality of synchronizers (7, 9, 26) to cause the plurality of synchronizers (7, 9, 26) to engage the second set of selected gearwheels instead of the first set of selected gearwheels, wherein by engaging the second set of selected gearwheels, either:
- (i) the active engine torque transmission path is modified to a second engine torque transmission path, and the active motor torque transmission path remains unmodified, or
- (ii) the active engine torque transmission path remains unmodified, and the active motor torque transmission path is modified to a second motor torque transmission path.

Example 22

The method of EXAMPLE 21, further comprising increasing the motor torque from the electric motor to compensate for any loss of engine torque at the output shaft (2) when the active engine torque transmission path is modified to the second engine torque transmission path.

Example 23

The method of EXAMPLE 21, further comprising increasing the engine torque to compensate for any loss of motor torque at the output shaft (2) when the active motor torque transmission path is modified to the second motor torque transmission path.

Example 24

The method of EXAMPLE 21, further comprising:

before the active engine torque transmission path is modified to the second engine torque transmission path:
- (i) reducing the engine torque;
- (ii) causing the motor torque to be increased in response to the reduction in the engine torque;
- (iii) disengaging the clutch (40) from the engine (30); and
- (iv) adjusting an engine speed of the engine (30) to meet an input shaft speed of the input shaft (1); and after the active engine torque transmission path is modified to the second engine torque transmission path:
- (i) engaging the clutch (40) with the engine (30);
- (ii) increasing the engine torque to a target torque; and
- (iii) adjusting the motor torque in response to the increase in the engine torque.

Example 25

The method of EXAMPLE 25, further comprising, before the active engine torque transmission path is modified to the second engine torque transmission path, adding overboost power to the output shaft (2) in response to the reduction in the engine torque.

Example 26

The method of EXAMPLE 21, further comprising:

before the active motor torque transmission path is modified to the second motor torque transmission path:
- (i) reducing the motor torque;
- (ii) increasing the engine torque in response to the reduction in the motor torque; and
- (iii) adjusting a motor speed of the electric motor (50) to meet a speed associated with the active motor torque transmission path; and after the active motor torque transmission path is modified to the second motor torque transmission path:
- (i) increasing the motor torque to a target torque; and
- (ii) adjusting the engine torque in response to the increase in the motor torque.

Example 27

The method of EXAMPLE 26, further comprising, before the active motor torque transmission path is modified to the second motor torque transmission path, adding turbocharged power to the output shaft (2) in response to the reduction in the motor torque.

Example 28

The method of EXAMPLE 21, wherein as a result of moving at least one of the plurality of synchronizers (7, 9, 26) to cause the plurality of synchronizers (7, 9, 26) to engage the second set of selected gearwheels instead of the first set of selected gearwheels, the active engine torque transmission path is modified to the second engine torque transmission path while the active motor torque transmission path remains unmodified, and the method further comprises:
- (i) moving at least one of the plurality of synchronizers (7, 9, 26) to cause the plurality of synchronizers (7, 9, 26) to engage a third set of selected gearwheels instead of the second set of selected gearwheels, and as a result, the active motor torque transmission path is modified to the second motor torque transmission path while the active engine torque transmission path remains unmodified; and
- (ii) moving at least one of the plurality of synchronizers (7, 9, 26) to cause the plurality of synchronizers (7, 9, 26) to engage a fourth set of selected gearwheels instead of the third set of selected gearwheels, and as a result, the active engine torque transmission path is modified to a third engine torque transmission path while the active motor torque transmission path remains unmodified.

Example 29

The method of any of EXAMPLES 21-28, wherein:
- (i) when the active engine torque transmission path is modified to the second engine torque transmission path to provide a first engine speed ratio or a second speed ratio, the active motor torque transmission path provides a first motor speed ratio,
- (ii) when the active engine torque transmission path is modified to the second engine torque transmission path to provide a fourth engine speed ratio, a fifth engine speed ratio, or a sixth engine speed ratio, the active motor torque transmission path provides a fourth motor speed ratio, (iii) when the active engine torque transmission path is modified to the second engine torque transmission path to provide a third engine speed ratio, the active motor torque transmission path provides the first motor speed ratio or the fourth motor speed ratio, and (iv) when the active motor torque transmission path is modified to the second motor torque transmission path to provide a second motor speed ratio or a third motor speed ratio, the active engine torque transmission path provides the third engine speed ratio.

Example 30

The method of any of EXAMPLES 21-29, wherein the transmission control system (120) includes:
a clutch actuation module (142) configured to control the clutch (40); and
a gear shifting actuation module (132) configured to move at least one of the plurality of synchronizers (7, 9, 26) to cause the plurality of synchronizers (7, 9, 26) to engage the second set of selected gearwheels instead of the first set of selected gearwheels.

Example 31

A method for a hybrid-power driving system, the hybrid-power system including:
a transmission (70), including:
a plurality of shafts, including an input shaft (1), a motor shaft (4), and an output shaft (2), wherein:
(i) the input shaft (1) is coupled to a clutch (40), the clutch (40) being configured to selectively engage an engine (30) to couple the input shaft (1) to the engine (30), the engine (30) being configured to generate an engine torque transferrable to the input shaft (1) via the clutch (40),
(ii) the motor shaft (4) is coupled to an electric motor (50), the electric motor (50) being configured to generate a motor torque transferrable to the motor shaft (4), and
(iii) the output shaft (2) delivers an output torque from the transmission (70);
a plurality of gearwheels configured to provide a plurality of torque transmission paths, one of the torque transmission paths being active to transfer the engine torque and the motor torque to the output shaft (2) to provide the output torque; and
a plurality of synchronizers (7, 9, 26) disposed on the plurality of shafts (1, 2) and operable to engage a first set of selected gearwheels, wherein according to the first set of selected gearwheels, the active torque transmission path is a first torque transmission path;
the method comprising:
determining a desired speed ratio for the engine or the motor;
determining a second set of selected gearwheels corresponding to the desired speed ratio;
moving, via a transmission control system, at least one of the plurality of synchronizers (7, 9, 26) to cause the plurality of synchronizers (7, 9, 26) to engage the second set of selected gearwheels instead of the first set of selected gearwheels and to modify the active torque transmission path to a second torque transmission path; and increasing the motor torque from the electric motor (50) to compensate for any loss of engine torque at the output shaft (2) when the active torque transmission path is modified to the second torque transmission path, or increasing the engine torque from the engine (30) to compensate for any loss of motor torque at the output shaft (2) when the active torque transmission path is modified to the second torque transmission path.

Example 32

The method of EXAMPLE 31, further comprising:
(i) reducing the engine torque;
(ii) disengaging the clutch (40) from the engine (30) thereby resulting in the loss of engine torque at the output shaft (2);
(iii) with the clutch disengaged, adjusting an engine speed of the engine (30) to meet an input shaft speed of the input shaft (1) before the active torque transmission path is modified to the second torque transmission path;
(iv) in response to the active torque transmission path being modified to the second torque transmission path, re-engaging the clutch (40) with the engine (30);
(v) with the clutch (40) re-engaged, increasing the engine torque to a target torque; and
(vi) adjusting the motor torque in response to the increase in the engine torque.

Example 33

The method system of EXAMPLE 32, further comprising, before the active torque transmission path is modified to the second torque transmission path, adding overboost power to the output shaft (2) in response to the reduction in the engine torque.

Example 34

The method of EXAMPLE 31, further comprising:
(i) reducing the motor torque from the electric motor, thereby resulting in the loss of motor torque at the output shaft (2);
(ii) adjusting a motor speed of the electric motor (50) to meet a speed associated with the active torque transmission path before the active torque transmission path is modified to the second torque transmission path;
(iii) in response to the active torque transmission path being modified to the second torque transmission path, increasing the motor torque to a target torque; and
(iii) adjusting the engine torque in response to the increase in the motor torque.

Example 35

The method of EXAMPLE 34, further comprising, before the active torque transmission path is modified to the second torque transmission path, adding turbocharged power to the output shaft (2) in response to the reduction in the motor torque.

Example 36

The method of any of EXAMPLE 31-35, wherein the transmission control system (120) includes:
a clutch actuation module (142) configured to control the clutch (40); and a gear shifting actuation module (132) configured to move at least one of the plurality of synchronizers (7, 9, 26) to cause the plurality of synchronizers (7, 9, 26) to engage the second set of selected gearwheels instead of the first set of selected gearwheels.

Example 37

The hybrid-power driving system of any of EXAMPLES 1-20,
wherein the plurality of synchronizers (7, 9, 26) includes three synchronizers, and
wherein the hybrid-power driving system provides six forward engine speed ratios and four forward motor speed ratios by shifting the plurality of gearwheels with the three synchronizers.

Example 38

The hybrid-power driving system of any of EXAMPLES 1-9 and 13-17, wherein the transmission (70) includes:
at least one of the engine (30);
the electric motor (50);
a differential (60) coupled to the output shaft (2) to deliver the output torque from the transmission (70); or
one or more intermediate shafts (3) to further transfer the engine torque or the motor torque.

Example 39

The method of any of EXAMPLES 21-36,
wherein the plurality of synchronizers (7, 9, 26) includes three synchronizers, and
wherein the hybrid-power driving system provides six forward engine speed ratios and four forward motor speed ratios by shifting the plurality of gearwheels with the three synchronizers.

It is appreciated that one or more common gearwheels may be shared in the first to fourth sets of selected gearwheels in the examples above. Of course, these sets are different from each other by the constitution of gearwheels.

VIII. Conclusion

In view of the forgoing, example embodiments employ a transmission control system to control aspects of a hybrid-power driving system to improve power capacity as well as fuel efficiency. For example, the transmission control system includes at least a gear shifting actuation module to control engagement of specific gearwheels and a clutch actuation module to control a clutch that couples the ICE to the transmission. During operation of the HPDS, gear shifts are required for each of the ICE and the EM. The transmission control system minimizes power loss when a gear shift is occurring for the ICE or the EM. By selectively controlling the clutch and engagement of specific gearwheels, power loss associated with a gear shift for one of these power sources (e.g., the ICE) can be directly offset by using the other power source (e.g., the EM). As such, the gear shifting process is more direct and stable when compared with the clutch-to-clutch gear shifting process of traditional transmissions, and thus the quality of gear shifting of the example embodiments is better than that of traditional transmissions.

Furthermore, by selectively controlling the clutch and engagement of specific gearwheels, the transmission control system can start the ICE when the vehicle is initially powered by the electric motor alone. Starting the internal combustion engine in this case switches the vehicle from a pure motor driving mode (PMDM) to a hybrid driving mode (HDM). Additionally, the transmission control system can start the ICE when the vehicle is in a parked state, for example, to put the vehicle in a battery charging mode for the EM.

Example embodiments have been described above. Those skilled in the art will understand that changes and modifications can be made to the described embodiments without departing from the true scope and spirit of the present invention, which is defined by the claims. The diagrams and power transmission paths shown in the figures are provided merely as examples and are not intended to be limiting. Those skilled in the art will appreciate that other arrangements of the elements shown in the figures can be used instead.

The example embodiments include various control systems, management systems, controllers, and/or modules for processing/communicating information and/or controlling various aspects of the example embodiments (e.g., the transmission control system 120, the gear shifting actuation module 132, the clutch actuation module 142, and the transmission coordinating module 152). Generally, control systems, management systems, controllers, and/or modules may be implemented as a combination of hardware and software elements. The hardware aspects may include combinations of operatively coupled hardware components including processors (e.g., microprocessors), communication/networking ports, digital filters, memory, or logical circuitry. The hardware components may be adapted to perform operations specified by a computer-executable code, which may be stored on a computer readable medium. The control systems, management systems, controllers, and/or modules may be implemented in any device, system, or subsystem to provide functionality and operation according to aspects of the example embodiments.

Physical processors and/or machines employed by the example embodiments for any processing or evaluation may include one or more networked or non-networked general purpose computer systems, microprocessors, field programmable gate arrays (FPGA's), digital signal processors (DSP's), micro-controllers, and the like, programmed according to the teachings of the example embodiments, as is appreciated by those skilled in the computer and software arts. Appropriate software can be readily prepared by programmers of ordinary skill based on the teachings of the exemplary embodiments, as is appreciated by those skilled in the software art. In addition, the devices and subsystems of the example embodiments can be implemented by the preparation of application-specific integrated circuits or by interconnecting an appropriate network of conventional component circuits, as is appreciated by those skilled in the electrical art(s). Thus, the exemplary embodiments are not limited to any specific combination of hardware circuitry and/or software.

Stored on any one or on a combination of computer readable media, control systems and/or modules may employ software for controlling the devices and subsystems of the example embodiments, for driving the devices and subsystems of the example embodiments, for enabling the devices and subsystems of the exemplary embodiments to interact with a human user, and the like. Such software can include, but is not limited to, device drivers, firmware, operating systems, development tools, applications software, and the like. Such computer readable media can include the computer program product of an embodiment of the present disclosure for performing all or a portion (if processing is distributed) of the processing performed in implementations. Computer code devices of the example embodiments of the present disclosure can include any suitable interpretable or executable code mechanism, including but not limited to scripts, interpretable programs, dynamic link libraries (DLLs), complete executable programs, and the like. Some forms of computer-readable media may include, for example, a hard disk, other suitable magnetic medium, a CD-ROM, CDRW, DVD, any other suitable optical medium, a RAM, a PROM, an EPROM, a FLASH-EPROM, any other suitable memory chip or cartridge, a carrier wave or any other suitable medium from which a computer can read.

Within this description, the articles "a," "an," and "the" are used to introduce elements of the example embodiments. The intent of using those articles is that there is one or more of the elements. The intent of using the conjunction "or" within a list of at least two terms in this description is to indicate any of the listed terms or any combination of the listed terms. For example, in a list of terms recited as "A, B, or C," the combinations indicated by that list of terms include "A and B," "A and C," "B, and C," and "A, B, and C." The use of ordinal numbers such as "first," "second," "third," and so on in the description is to distinguish respective elements rather than to denote a particular order of those elements unless the context of using those terms explicitly indicates otherwise.

We claim:

1. A hybrid-power driving system comprising:
   a transmission, including:
      a plurality of shafts, including an input shaft, a motor shaft, and an output shaft, wherein:
         (i) the input shaft is coupled to a clutch, the clutch being configured to selectively engage an engine to couple the input shaft to the engine, the engine being configured to generate an engine torque transferrable to the input shaft via the clutch,
         (ii) the motor shaft is coupled to an electric motor, the electric motor being configured to generate a motor torque transferrable to the motor shaft, and
         (iii) the output shaft delivers an output torque from the transmission;
      a plurality of gearwheels configured to provide a plurality of combinations of an engine torque transmission path and a motor torque transmission path, one of the combinations being active and including an active engine torque transmission path to transfer the engine torque from the input shaft to the output shaft for the output torque and an active motor torque transmission path to transfer the motor torque from the motor shaft to the output shaft for the output torque; and
      a plurality of synchronizers disposed on the plurality of shafts and operable to engage a first set of selected gearwheels, wherein for the first set of selected gearwheels, the active engine torque transmission path is a first engine torque transmission path and the active motor torque transmission path is a first motor torque transmission path; and
   a transmission control system including:
      a clutch actuation module configured to control the clutch; and
      a gear shifting actuation module configured to move at least one of the plurality of synchronizers to cause the plurality of synchronizers to engage a second set of selected gearwheels instead of the first set of selected gearwheels, wherein by engaging the second set of selected gearwheels, either:
         (i) the active engine torque transmission path is modified to a second engine torque transmission path, and the active motor torque transmission path remains unmodified, or
         (ii) the active engine torque transmission path remains unmodified, and the active motor torque transmission path is modified to a second motor torque transmission path.

2. The hybrid-power driving system of claim 1, wherein the transmission control system causes the electric motor to increase the motor torque to compensate for any loss of engine torque at the output shaft when the active engine torque transmission path is modified to the second engine torque transmission path.

3. The hybrid-power driving system of claim 1, wherein the transmission control system causes the engine to increase the engine torque to compensate for any loss of motor torque at the output shaft when the active motor torque transmission path is modified to the second motor torque transmission path.

4. The hybrid-power driving system of claim 1, wherein before the active engine torque transmission path is modified to the second engine torque transmission path:
   (i) the transmission control system causes the engine torque to be reduced;
   (ii) the transmission control system causes the motor torque to be increased in response to the reduction in the engine torque;
   (iii) the clutch actuation module disengages the clutch from the engine; and
   (iv) the transmission control system causes an engine speed of the engine to meet an input shaft speed of the input shaft; and
after the active engine torque transmission path is modified to the second engine torque transmission path:
   (i) the clutch actuation module engages the clutch with the engine;
   (ii) the transmission control system causes the engine torque to be increased to a target torque; and
   (iii) the transmission control system causes the motor torque to be adjusted in response to the increase in the engine torque.

5. The hybrid-power driving system of claim 4, wherein before the active engine torque transmission path is modified to the second engine torque transmission path, the transmission control system causes overboost power to be added to the output shaft in response to the reduction in the engine torque.

6. The hybrid-power driving system of claim 1, wherein before the active motor torque transmission path is modified to the second motor torque transmission path:
   (i) the transmission control system causes the motor torque to be reduced;
   (ii) the transmission control system causes the engine torque to be increased in response to the reduction in the motor torque;
   (iii) the transmission control system causes a motor speed of the electric motor to meet a speed associated with the active motor torque transmission path; and
after the active motor torque transmission path is modified to the second motor torque transmission path:
   (i) the transmission control system causes the motor torque to be increased to a target torque; and (ii) the transmission control system causes the engine torque to be adjusted in response to the increase in the motor torque.

7. The hybrid-power driving system of claim 6, wherein before the active motor torque transmission path is modified to the second motor torque transmission path, the transmission control system causes turbocharged power to be added to the output shaft in response to the reduction in the motor torque.

8. The hybrid-power driving system of claim 1, wherein:
   (i) the gear shifting actuation module moves at least one of the plurality of synchronizers to cause the plurality of synchronizers to engage the second set of selected gearwheels instead of the first set of selected gearwheels, and as a result, the active engine torque transmission path is modified to the second engine torque transmission path while the active motor torque transmission path remains unmodified;
   (ii) the gear shifting actuation module moves at least one of the plurality of synchronizers to cause the plurality of synchronizers to engage a third set of selected gearwheels instead of the second set of selected gearwheels, and as a result, the active motor torque transmission path is modified to the second motor torque transmission path while the active engine torque transmission path remains unmodified; and
   (iii) the gear shifting actuation module moves at least one of the plurality of synchronizers to cause the plurality of synchronizers to engage a fourth set of selected gearwheels instead of the third set of selected gearwheels, and as a result, the active engine torque transmission path is modified to a third engine torque transmission path while the active motor torque transmission path remains unmodified.

9. The hybrid-power driving system of claim 1, wherein:
   (i) when the active engine torque transmission path is modified to the second engine torque transmission path to provide a first engine speed ratio or a second speed ratio, the active motor torque transmission path provides a first motor speed ratio,
   (ii) when the active engine torque transmission path is modified to the second engine torque transmission path to provide a fourth engine speed ratio, a fifth engine speed ratio, or a sixth engine speed ratio, the active motor torque transmission path provides a fourth motor speed ratio,
   (iii) when the active engine torque transmission path is modified to the second engine torque transmission path to provide a third engine speed ratio, the active motor torque transmission path provides the first motor speed ratio or the fourth motor speed ratio, and
   (iv) when the active motor torque transmission path is modified to the second motor torque transmission path to provide a second motor speed ratio or a third motor speed ratio, the active engine torque transmission path provides the third engine speed ratio.

10. The hybrid-power driving system of claim 1, wherein the transmission includes at least one of:
   the engine;
   the electric motor;
   a differential coupled to the output shaft to deliver the output torque from the transmission; or
   one or more intermediate shafts to further transfer at least one of the engine torque or the motor torque.

11. The hybrid-power driving system of claim 1, wherein the plurality of synchronizers includes three synchronizers, and wherein the hybrid-power driving system provides six forward engine speed ratios and four forward motor speed ratios by shifting the plurality of gearwheels with the three synchronizers.

12. A hybrid-power driving system comprising:
   a transmission, including:
      a plurality of shafts, including an input shaft, a motor shaft, and an output shaft, wherein:
         (i) the input shaft is coupled to a clutch, the clutch being configured to selectively engage an engine to couple the input shaft to the engine, the engine being configured to generate an engine torque transferrable to the input shaft via the clutch,
         (ii) the motor shaft is coupled to an electric motor, the electric motor being configured to generate a motor torque transferrable to the motor shaft, and
         (iii) the output shaft delivers an output torque from the transmission;
      a plurality of gearwheels configured to provide a plurality of torque transmission paths, one of the torque transmission paths being active to transfer the engine torque and the motor torque to the output shaft to provide the output torque; and
      a plurality of synchronizers disposed on the plurality of shafts and operable to engage a first set of selected gearwheels, wherein according to the first set of selected gearwheels, the active torque transmission path is a first torque transmission path; and
   a transmission control system including:
      a clutch actuation module configured to control the clutch; and
      a gear shifting actuation module configured to move at least one of the plurality of synchronizers to cause the plurality of synchronizers to engage a second set of selected gearwheels instead of the first set of selected gearwheels and to modify the active torque transmission path to a second torque transmission path, wherein either:
         (i) the transmission control system causes the electric motor to increase the motor torque to compensate for any loss of engine torque at the output shaft when the active torque transmission path is modified to the second torque transmission path, or
         (ii) the transmission control system causes the engine to increase the engine torque to compensate for any loss of motor torque at the output shaft when the active torque transmission path is modified to the second torque transmission path.

13. The hybrid-power driving system of claim 12, wherein:
   (i) the transmission control system causes the engine torque to be reduced;
   (ii) the clutch actuation module disengages the clutch from the engine resulting in the loss of engine torque at the output shaft;
   (iii) with the clutch disengaged, the transmission control system causes an engine speed of the engine to meet an input shaft speed of the input shaft before the active torque transmission path is modified to the second torque transmission path;
   (iv) in response to the active torque transmission path being modified to the second torque transmission path, the clutch actuation module re-engages the clutch with the engine;
   (v) with the clutch re-engaged, the transmission control system causes the engine torque to be increased to a target torque; and (vi) the transmission control system causes the motor torque to be adjusted in response to the increase in the engine torque.

14. The hybrid-power driving system of claim 13, wherein before the active torque transmission path is modified to the second torque transmission path, the transmission control system causes overboost power to be added to the output shaft in response to the reduction in the engine torque.

15. The hybrid-power driving system of claim 12, wherein:
   (i) the transmission control system causes the motor torque to be reduced, resulting in the loss of motor torque at the output shaft;
   (ii) the transmission control system causes a motor speed of the electric motor to meet a speed associated with the active torque transmission path before the active torque transmission path is modified to the second torque transmission path;
   (iii) in response to the active torque transmission path being modified to the second torque transmission path, the transmission control system causes the motor torque to be increased to a target torque; and
   (iii) the transmission control system causes the engine torque to be adjusted in response to the increase in the motor torque.

16. The hybrid-power driving system of claim 15, wherein before the active torque transmission path is modified to the second torque transmission path, the transmission control system causes turbocharged power to be added to the output shaft in response to the reduction in the motor torque.

17. The hybrid-power driving system of claim 12, wherein the transmission includes at least one of:
   the engine;
   the electric motor
   a differential coupled to the output shaft to deliver the output torque from the transmission; or
   one or more intermediate shafts to further transfer at least one of the engine torque or the motor torque.

18. The hybrid-power driving system of claim 12,
   wherein the plurality of synchronizers includes three synchronizers, and
   wherein the hybrid-power driving system provides six forward engine speed ratios and four forward motor speed ratios by shifting the plurality of gearwheels with the three synchronizers.

19. A method for a hybrid-power driving system, the hybrid-power driving system including:
   a transmission, including:
      a plurality of shafts, including an input shaft, a motor shaft, and an output shaft, wherein:
         (i) the input shaft is coupled to a clutch, the clutch being configured to selectively engage an engine to couple the input shaft to the engine, the engine being configured to generate an engine torque transferrable to the input shaft via the clutch,
         (ii) the motor shaft is coupled to an electric motor, the electric motor being configured to generate a motor torque transferrable to the motor shaft, and
         (iii) the output shaft delivers an output torque from the transmission;
      a plurality of gearwheels configured to provide a plurality of combinations of an engine torque transmission path and a motor torque transmission path, one of the combinations being active and including an active engine torque transmission path to transfer the engine torque from the input shaft to the output shaft for the output torque and an active motor torque transmission path to transfer the motor torque from the motor shaft to the output shaft for the output torque; and
      a plurality of synchronizers disposed on the plurality of shafts and operable to engage a first set of selected gearwheels, wherein for the first set of selected gearwheels, the active engine torque transmission path is a first engine torque transmission path and the active motor torque transmission path is a first motor torque transmission path,
   the method comprising:
      determining a desired speed ratio for the engine or the motor;
      determining a second set of selected gearwheels corresponding to the desired speed ratio; and
      moving, via a transmission control system, at least one of the plurality of synchronizers to cause the plurality of synchronizers to engage the second set of selected gearwheels instead of the first set of selected gearwheels, wherein by engaging the second set of selected gearwheels, either:
         (i) the active engine torque transmission path is modified to a second engine torque transmission path, and the active motor torque transmission path remains unmodified, or
         (ii) the active engine torque transmission path remains unmodified, and the active motor torque transmission path is modified to a second motor torque transmission path.

20. The method of claim 19, further comprising increasing the motor torque from the electric motor to compensate for any loss of engine torque at the output shaft when the active engine torque transmission path is modified to the second engine torque transmission path.

21. The method of claim 19, further comprising increasing the engine torque to compensate for any loss of motor torque at the output shaft when the active motor torque transmission path is modified to the second motor torque transmission path.

22. The method of claim 19, further comprising:
   before the active engine torque transmission path is modified to the second engine torque transmission path:
      (i) reducing the engine torque;
      (ii) causing the motor torque to be increased in response to the reduction in the engine torque;
      (iii) disengaging the clutch from the engine; and
      (iv) adjusting an engine speed of the engine to meet an input shaft speed of the input shaft; and
   after the active engine torque transmission path is modified to the second engine torque transmission path:
      (i) engaging the clutch with the engine;
      (ii) increasing the engine torque to a target torque; and
      (iii) adjusting the motor torque in response to the increase in the engine torque.

23. The method of claim 22, further comprising, before the active engine torque transmission path is modified to the second engine torque transmission path, adding overboost power to the output shaft in response to the reduction in the engine torque.

24. The method of claim 19, further comprising:
   before the active motor torque transmission path is modified to the second motor torque transmission path:
      (i) reducing the motor torque;
      (ii) increasing the engine torque in response to the reduction in the motor torque; and (iii) adjusting a motor speed of the electric motor to meet a speed associated with the active motor torque transmission path; and after the active motor torque transmission path is modified to the second motor torque transmission path:
(i) increasing the motor torque to a target torque; and
(ii) adjusting the engine torque in response to the increase in the motor torque.

25. The method of claim 24, further comprising, before the active motor torque transmission path is modified to the second motor torque transmission path, adding turbocharged torque to the output shaft in response to the reduction in the motor torque.

26. The method of claim 19, wherein as a result of moving at least one of the plurality of synchronizers to cause the plurality of synchronizers to engage the second set of selected gearwheels instead of the first set of selected gearwheels, the active engine torque transmission path is modified to the second engine torque transmission path while the active motor torque transmission path remains unmodified, and the method further comprises:
(i) moving at least one of the synchronizers to cause the plurality of synchronizers to engage a third set of selected gearwheels instead of the second set of selected gearwheels, and as a result, the active motor torque transmission path is modified to the second motor torque transmission path while the active engine torque transmission path remains unmodified; and
(ii) moving at least one of the synchronizers to cause the plurality of synchronizers to engage a fourth set of selected gearwheels instead of the third set of selected gearwheels, and as a result, the active engine torque transmission path is modified to a third engine torque transmission path while the active motor torque transmission path remains unmodified.

27. The method of claim 19, wherein:
(i) when the active engine torque transmission path is modified to the second engine torque transmission path to provide a first engine speed ratio or a second speed ratio, the active motor torque transmission path provides a first motor speed ratio,
(ii) when the active engine torque transmission path is modified to the second engine torque transmission path to provide a fourth engine speed ratio, a fifth engine speed ratio, or a sixth engine speed ratio, the active motor torque transmission path provides a fourth motor speed ratio,
(iii) when the active engine torque transmission path is modified to the second engine torque transmission path to provide a third engine speed ratio, the active motor torque transmission path provides the first motor speed ratio or the fourth motor speed ratio, and
(iv) when the active motor torque transmission path is modified to the second motor torque transmission path to provide a second motor speed ratio or a third motor speed ratio, the active engine torque transmission path provides the third engine speed ratio.

28. The method of claim 19, wherein the transmission control system includes:
a clutch actuation module configured to control the clutch; and
a gear shifting actuation module configured to move at least one of the plurality of synchronizers cause the plurality of synchronizers to engage the second set of selected gearwheels instead of the first set of selected gearwheels.

29. The method of claim 19,
wherein the plurality of synchronizers includes three synchronizers, and
wherein the hybrid-power driving system provides six forward engine speed ratios and four forward motor speed ratios by shifting the plurality of gearwheels with the three synchronizers.

30. A method for a hybrid-power driving system, the hybrid-power system including:
a transmission, including:
a plurality of shafts, including an input shaft, a motor shaft, and an output shaft, wherein:
(i) the input shaft is coupled to a clutch, the clutch being configured to selectively engage an engine to couple the input shaft to the engine, the engine being configured to generate an engine torque transferrable to the input shaft via the clutch,
(ii) the motor shaft is coupled to an electric motor, the electric motor being configured to generate a motor torque transferrable to the motor shaft, and
(iii) the output shaft delivers an output torque from the transmission;
a plurality of gearwheels configured to provide a plurality of torque transmission paths, one of the torque transmission paths being active to transfer the engine torque and the motor torque to the output shaft to provide the output torque; and
a plurality of synchronizers disposed on the plurality of shafts and operable to engage a first set of selected gearwheels, wherein according to the first set of selected gearwheels, the active torque transmission path is a first torque transmission path;
the method comprising:
determining a desired speed ratio for the engine or the motor;
determining a second set of selected gearwheels corresponding to the desired speed ratio;
moving, via a transmission control system, at least one of the plurality of synchronizers to cause the plurality of synchronizers to engage the second set of selected gearwheels instead of the first set of selected gearwheels and to modify the active torque transmission path to a second torque transmission path; and
increasing the motor torque from the electric motor to compensate for any loss of engine torque at the output shaft when the active torque transmission path is modified to the second torque transmission path, or increasing the engine torque from the engine to compensate for any loss of motor torque at the output shaft when the active torque transmission path is modified to the second torque transmission path.

31. The method of claim 30, further comprising:
(i) reducing the engine torque;
(ii) disengaging the clutch from the engine thereby resulting in the loss of engine torque at the output shaft;
(iii) with the clutch disengaged, adjusting an engine speed of the engine to meet an input shaft speed of the input shaft before the active torque transmission path is modified to the second torque transmission path;
(iv) in response to the active torque transmission path being modified to the second torque transmission path, re-engaging the clutch with the engine;
(v) with the clutch re-engaged, increasing the engine torque to a target torque; and
(vi) adjusting the motor torque in response to the increase in the engine torque.

32. The method system of claim 31, further comprising, before the active torque transmission path is modified to the second torque transmission path, adding overboost power to the output shaft in response to the reduction in the engine torque.

33. The method of claim 30, further comprising:
   (i) reducing the motor torque from the electric motor, thereby resulting in the loss of motor torque at the output shaft;
   (ii) adjusting a motor speed of the electric motor to meet a speed associated with the active torque transmission path before the active torque transmission path is modified to the second torque transmission path;
   (iii) in response to the active torque transmission path being modified to the second torque transmission path, increasing the motor torque to a target torque; and
   (iii) adjusting the engine torque in response to the increase in the motor torque.

34. The method of claim 33, further comprising, before the active torque transmission path is modified to the second torque transmission path, adding turbocharged torque to the output shaft in response to the reduction in the motor torque.

35. The method of claim 31, wherein the transmission control system includes:
   a clutch actuation module configured to control the clutch; and
   a gear shifting actuation module configured to move at least one of the plurality of synchronizers to cause the plurality of synchronizers to engage the second set of selected gearwheels instead of the first set of selected gearwheels.

36. The method of claim 30,
   wherein the plurality of synchronizers includes three synchronizers, and
   wherein the hybrid-power driving system provides six forward engine speed ratios and four forward motor speed ratios by shifting the plurality of gearwheels with the three synchronizers.

\* \* \* \* \*